(12) United States Patent
Hara et al.

(10) Patent No.: US 8,732,252 B2
(45) Date of Patent: May 20, 2014

(54) COOPERATING SYSTEM, CHAT SERVER, PROGRAM, AND COOPERATING METHOD

(75) Inventors: Masahiro Hara, Kawasaki (JP); Tatsuro Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1265 days.

(21) Appl. No.: 12/409,251

(22) Filed: Mar. 23, 2009

(65) Prior Publication Data

US 2009/0248818 A1 Oct. 1, 2009

(30) Foreign Application Priority Data

Mar. 25, 2008 (JP) ................................. 2008-078833

(51) Int. Cl.
 G06F 15/16 (2006.01)
 G06Q 10/10 (2012.01)
 H04L 29/06 (2006.01)

(52) U.S. Cl.
 CPC ........ *G06Q 10/107* (2013.01); *H04L 29/06047* (2013.01)
 USPC .......................................... 709/206; 709/203

(58) Field of Classification Search
 CPC .................. H29L 29/06047; G06Q 10/107
 USPC ........................................ 709/203, 206–207
 See application file for complete search history.

(56) References Cited

U.S. PATENT DOCUMENTS

| 7,111,043 B2 | 9/2006 | Kihara et al. |
| 8,024,408 B1 * | 9/2011 | Wang Baldonado et al. . 709/206 |
| 8,260,909 B2 * | 9/2012 | Schuba et al. ................ 709/224 |
| 2005/0021624 A1 | 1/2005 | Herf et al. |
| 2006/0195532 A1 | 8/2006 | Zlateff et al. |
| 2006/0284744 A1 * | 12/2006 | Shotland ......................... 341/50 |

(Continued)

FOREIGN PATENT DOCUMENTS

| JP | 2000-330913 | 11/2000 |
| JP | 2005-250826 A | 9/2005 |

(Continued)

OTHER PUBLICATIONS

Tanaka et al., "Consideration of Implementing and Applying Web-Based IM Services", collected papers (4) of lectures of the 66th (2004) national convention, Interface, computer, and human society, Information Processing Society of Japan, Mar. 9, 2004, pp. 4-333 to 4-334. (Pursuant to MPEP §609, in fulfillment of the requirement under 37 CFR §1.98(a)(3)(i) for a concise explanation of relevance regarding this cited reference, the Office's attention is directed to the Partial English-language translation of the official action mailed by the JPO as listed and described below in this section of form SB08.).

(Continued)

*Primary Examiner* — Patrice Winder
(74) *Attorney, Agent, or Firm* — Fujitsu Patent Center

(57) ABSTRACT

A cooperating system includes a chat server and a blog server, the chat server includes an extracting part for, when detecting a URL related to a blog in a message received from outside, extracting the received message, an acquiring part for acquiring a trackback URL from a blog server based on the detected URL, and a storage part for storing a message and the trackback URL extracted by the extracting part in association with a newly created URL; and the blog server including a receiving part for receiving the created URL transmitted based on storage of trackback URL to the storage part with the storage part.

10 Claims, 46 Drawing Sheets

(56) References Cited

U.S. PATENT DOCUMENTS

2007/0031806 A1* 2/2007 Lam et al. .................. 434/350
2007/0192127 A1* 8/2007 McInnis ....................... 705/1
2009/0094345 A1* 4/2009 Kang et al. .................. 709/217

FOREIGN PATENT DOCUMENTS

| JP | 2006-244494 | 9/2006 |
| JP | 2007-140749 | 6/2007 |
| JP | 2007-518146 | 7/2007 |
| WO | WO-00/41080 A1 | 7/2000 |

OTHER PUBLICATIONS

Japanese Office Action mailed May 14, 2013 for corresponding Japanese Application No. 2008-078833, with Partial English-language Translation.

* cited by examiner

FIG. 5

CHAT LOG FILE

| CHAT ROOM | GLOBAL WARMING | HOBBY | CAR | ... |

153

| TIME AND DATE | EVENT | USER ID | MESSAGE | MESSAGE ID |
|---|---|---|---|---|
| 02/28/2008 10:00:00 | ENTER | A | — | — |
| 02/28/2008 10:00:05 | ENTER | B | — | — |
| 02/28/2008 10:00:10 | COMMENT | A | CURRENTLY, GLOBAL WARMING IS A PROBLEM. | M01 |
| 02/28/2008 10:00:15 | COMMENT | B | THE FOLLOWING BLOG SERVES AS A REFERENCE. | M02 |
| 02/28/2008 10:00:18 | COMMENT | B | http://blog.sample.com/001234 | M03 |
| ... | ... | ... | ... | ... |

FIG. 14

WEB PAGE FILE

| CREATED URL | USER ID | MESSAGE COMMENT |
|---|---|---|
| http://chatlog.sample.com/log01.html | — | — |
| | A | CURRENTLY, GLOBAL WARMING IS A PROBLEM. |
| | B | THE FOLLOWING BLOG SERVES AS A REFERENCE. |
| | B | http://blog.sample.com/001234 |
| | | I AM C. CURRENTLY, THE FOLLOWING SOLUTION ... |
| ... | ... | ... |

551

| TRACK BACK URL |
|---|
| http://blog.sample.com/tb?id=001234 |
| ... |

FIG. 19

| User-Agent |
|---|
| Mozilla/4.0 (compatible;MSIE7.0;WindowsNT5.1) |
| Mozilla/5.0 (Windows; U; Windows NT 5.1; ja; rv:1.8.0.3) Gecko/20060426Firefox/1.5.0.3 |
| . . . |

FIG. 22

WEB PAGE FILE ~551

| CREATED URL | USER ID | MESSAGE COMMENT |
|---|---|---|
| http://chatlog.sample.com/log01.html | — | — |
| | A | CURRENTLY, GLOBAL WARMING IS A PROBLEM. |
| | B | THE FOLLOWING BLOG SERVES AS A REFERENCE. |
| | B | http://blog.sample.com/001234 |
| ... | ... | ... |

| TRACK BACK URL | LOGIN RATE (%) |
|---|---|
| http://blog.sample.com/tb?id=001234 | 100 |
| ... | ... |

FIG. 28

ADDRESS FILE — 154

| USER ID | E-MAIL ADDRESS | IP ADDRESS | STATE |
|---|---|---|---|
| A | AA@ ... | 10. ... | ENTER CHAT ROOM "GLOBAL WARMING". |
| B | BB@ ... | — | ENTER CHAT ROOM "GLOBAL WARMING". |
| D | CC@ ... | 10. ... | LOG OUT |
| E | DD@ ... | 10. ... | LOG IN |
| ... | ... | ... | ... |

FIG. 40

HISTORY FILE

| TIME AND DATE | CHAT ROOM NAME | CREATED URL/TRACK BACK URL | USER ID | MESSAGE |
|---|---|---|---|---|
| 02/28/2008 10:00:18 | GLOBAL WARMING | http://chatlog.sample.com/log01.html<br>http://blog.sample.com/tb?id=001234 | A | CURRENTLY, GLOBAL WARMING IS A PROBLEM... |
| | | | B | BY THE WAY, ... |
| | | | D | I SEE. ... |
| | | | A | IN THE NEWSPAPER, ... |
| | | | B | THE FOLLOWING BLOG SERVES AS A REFERENCE... |
| | | | B | http://blog.sample.com/eco/001234 |
| 03/12/2008 12:00:10 | GLOBAL WARMING | http://chatlog.sample.com/log02.html<br>http://blog.sample.com/tb?id=001235 | A | IT'S BEEN A LONG TIME. ... |
| | | | B | BY THE WAY, ... |
| | | | B | AN IDEA IS IN THE FOLLOWING BLOG. |
| | | | B | http://blog.sample.com/eco/001235 |
| ... | ... | ... | ... | ... |

152

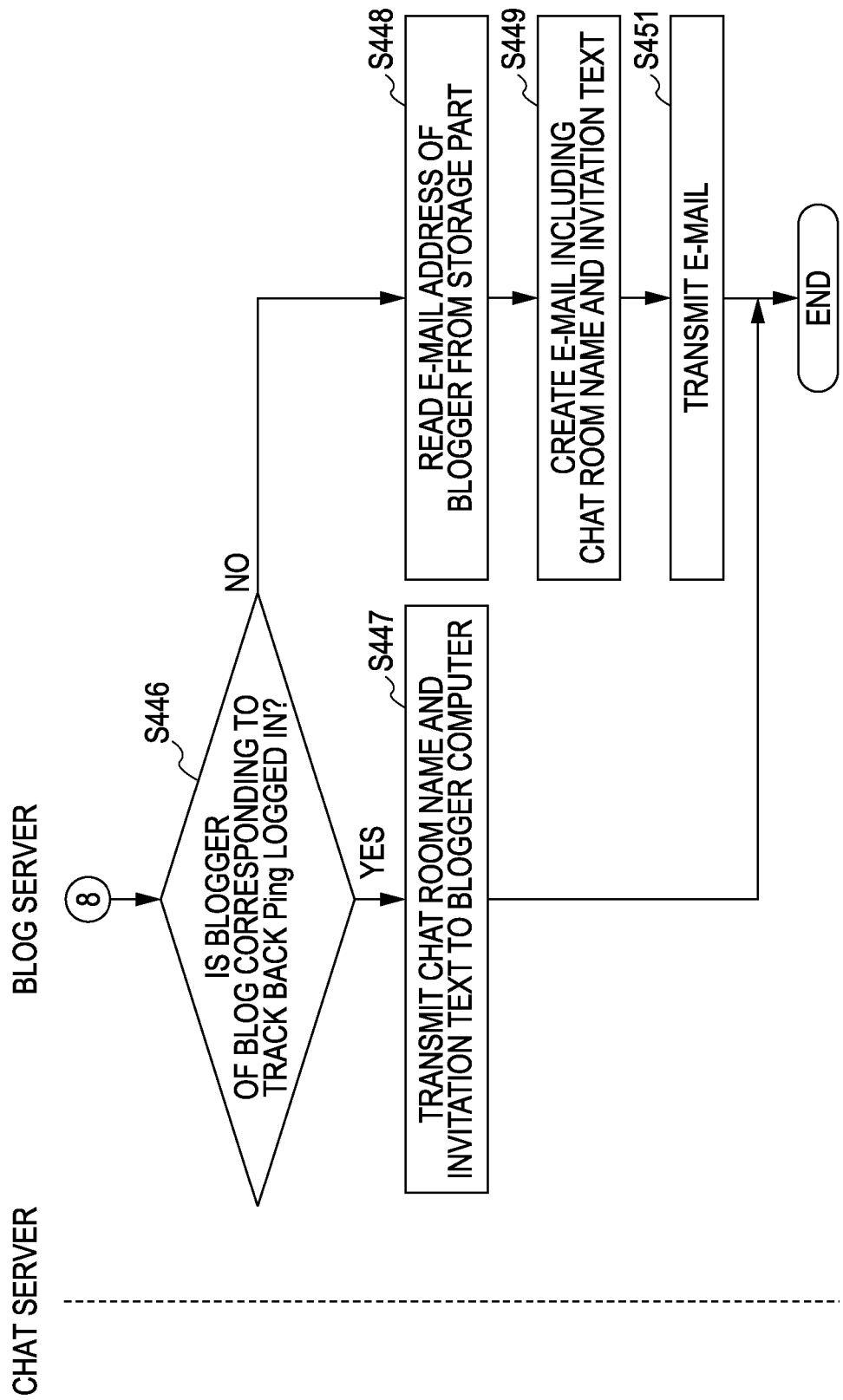

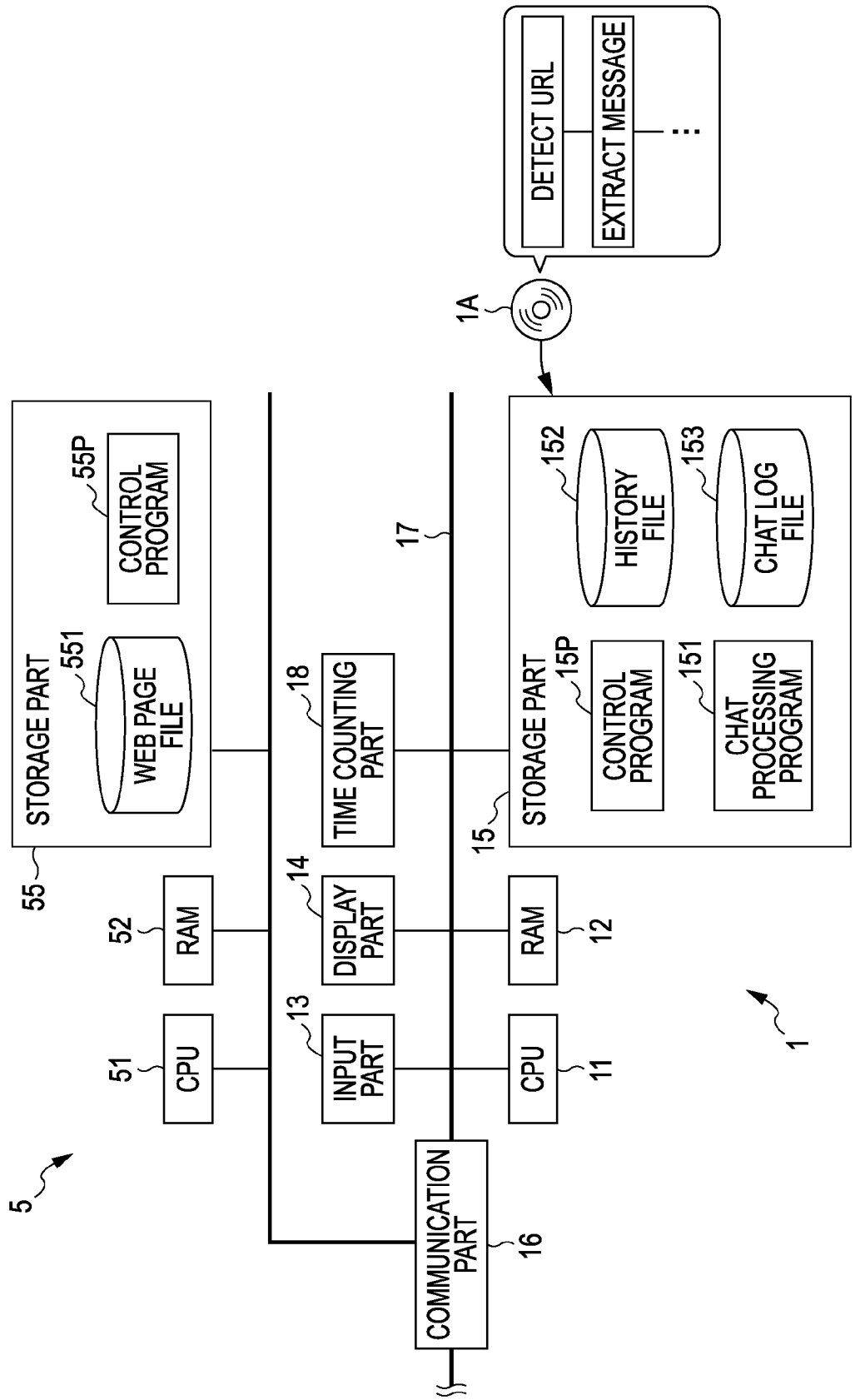

COOPERATING SYSTEM, CHAT SERVER, PROGRAM, AND COOPERATING METHOD

CROSS-REFERENCE TO RELATED APPLICATIONS

This application is based upon and claims the benefit of priority of the prior Japanese Patent Application No. 2008-078833, filed on Mar. 25, 2008, the entire contents of which are incorporated herein by reference.

FIELD

The embodiments discussed herein are related to a cooperating system using a blog server and a chat server, a chat server, a program, and a cooperating method

BACKGROUND

In recent years, blogs, which is short for a "Web Log", have been widely used in the Internet. Blogs are updated periodically by users and have a function for accepting comments from third parities and a function for accepting trackback from other blogs. In blogs, people have a lively exchange of views using comments from third parties and trackbacks between blogs. In a chat, users who log into a chat room may have a lively exchange of views in real time. Examples of these techniques are described in Japanese Patent Application Laid-Open Nos. 2006-244494 and 2007-140749

SUMMARY

According to an aspect of the invention, a cooperating system that uses a blog server and a chat server includes an extracting part for, when detecting a URL related to a blog in a message received from an outside source, extracting a received message; an acquiring part for acquiring a trackback URL from a blog server based on the detected URL; and a storage part for storing a message and the trackback URL extracted by the extracting part in association with a newly created URL (URL created with a chat history such as Permalink). The blog server includes a receiving part for receiving the created URL transmitted to the storage part based on storage of a trackback URL.

According to an aspect of the invention, in a cooperating system, when detecting a URL related to the blog in the message received from the outside, the extracting section of the chat server extracts the received message. The acquiring section acquires trackback URL from the blog server based on the detected URL. When the trackback URL is acquired, the chat server newly creates a URL. The message and the trackback URL extracted from the storage section are stored in association with the created URL. The receiving section of the blog server receives the created URL transmitted based on the storage of the trackback URL in the storage section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a record layout of a chat log file;
FIG. 14 illustrates a record layout of a Web page file after comments are added;
FIG. 19 illustrates a list of User-Agents stored in a storage part in advance;
FIG. 22 illustrates a record layout of a Web page file according to a second embodiment;
FIG. 28 illustrates a record layout of an address file;
FIG. 40 illustrates a record layout of a history file according to a sixth embodiment.

FIG. 45 illustrates a flow chart of the inviting process; and

FIG. 46 illustrates a structure of a chat server according to an eighth embodiment.

DESCRIPTION OF EMBODIMENT(S)

First Embodiment

Figure 1:
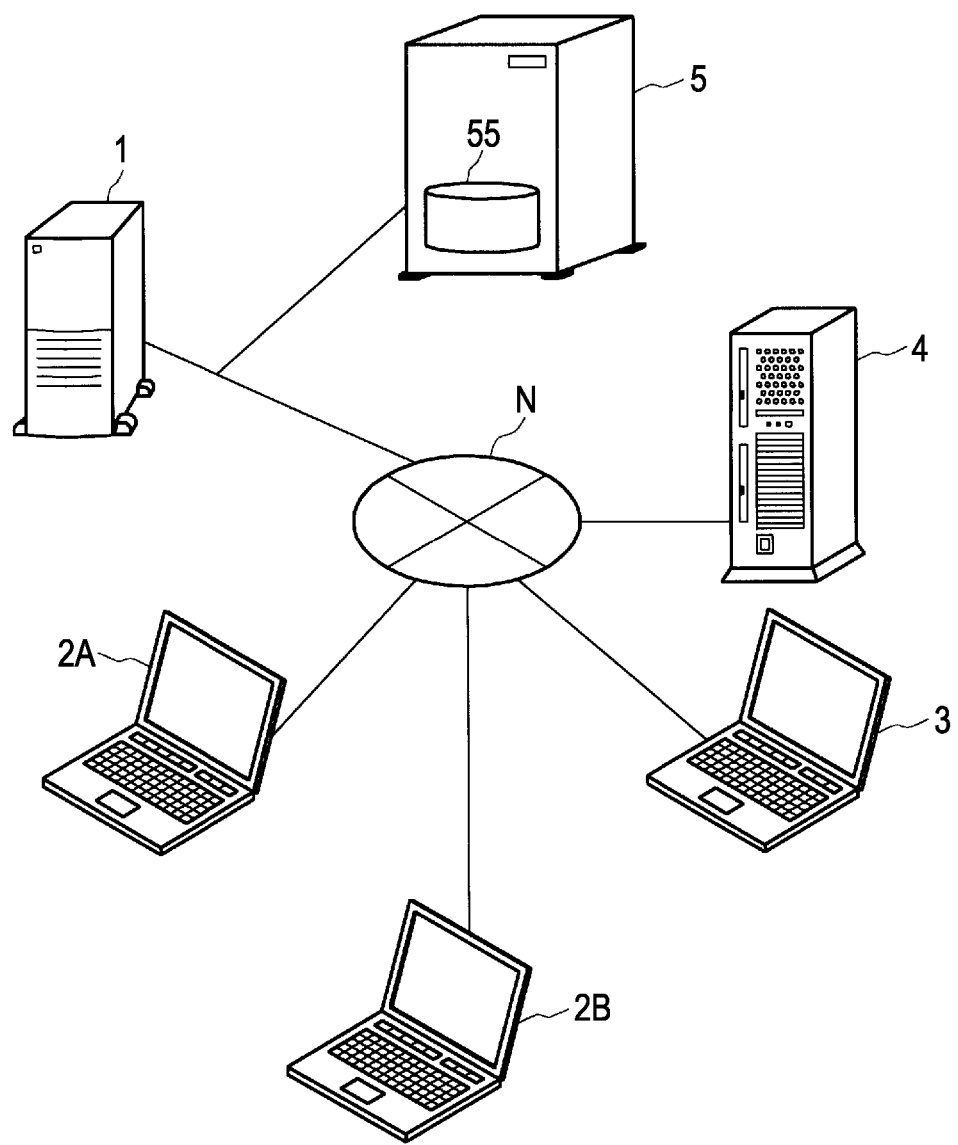
FIG. 1 illustrates an outline of a cooperating system.

FIG. 1 is a pattern diagram illustrating an outline of a cooperating system. The cooperating system includes a chat server 1, information processing apparatuses 2A, 2B, and 3, a Web server 5, a storage part 55, and a blog server 4. The chat server 1, the information processing apparatuses 2A, 2B, and 3, the Web server 5, the storage part 55, and the blog server 4 are connected to each other via a communication network N such as the Internet or a mobile telephone, and transmit and receive necessary information using a protocol such as HTTP (Hyper Text Transfer Protocol).

The information processing apparatus 2A is an apparatus which is used by a chat user A. The information processing apparatus 2B is an apparatus which is used by a chat user B. The information processing apparatus 3 is an apparatus which is used by a blogger C. Examples of the information processing apparatuses 2A, 2B, and 3 include a personal computer, mobile telephone, and PDA (Personal Digital Assistant). The information processing apparatuses 2A and 2B are described as personal computers 2A and 2B (in some cases, represented by 2), and the information processing apparatus 3 is described as a blogger computer 3.

The personal computers 2A and 2B download a client program for a chat session, and access a chat server so as to exchange messages in real time via the communication network N, namely, to conduct a chat session. In the first embodiment, for easy description, two users A and B chat, but more users may be involved. On the other hand, the blog server 4 stores a blog created by the blogger C, and transmits the blog to the personal computer 2A blog may be in a diary format which is managed by an individual or a group consisting of two or more people, and may include an information providing function, an opinion exchanging (comment) function, and a trackback function.

An outline of the present invention will be described below. The chat server 1 monitors messages transmitted from the personal computer 2. When a URL related to the blog is detected in a message, the message is extracted and a new created URL is created. The chat server 1 acquires a trackback URL (trackback Ping URL) of the blog from the blog server 4 based on the detected URL. The chat server 1 correlates a message and a trackback URLs with the created URL and stores the correlated message and the URLs in an internal storage part or the storage part 55 of the Web server 5 illustrated in FIG. 1. Upon the storage of the trackback URL, a trackback Ping including the created URL is transmitted from the chat server 1 or the Web server 5 to the blog server 4.

When the blogger computer 3 accesses the blog server 4, the blogger C can recognize a trackback URL including the created URL in the blogger's own blog. The blogger C accesses the chat server 1 or the Web server 5 using the created URL in the trackback URL so as to be capable of browsing messages or transmitting comments on the messages. Its details will be described below.

Figure 2:
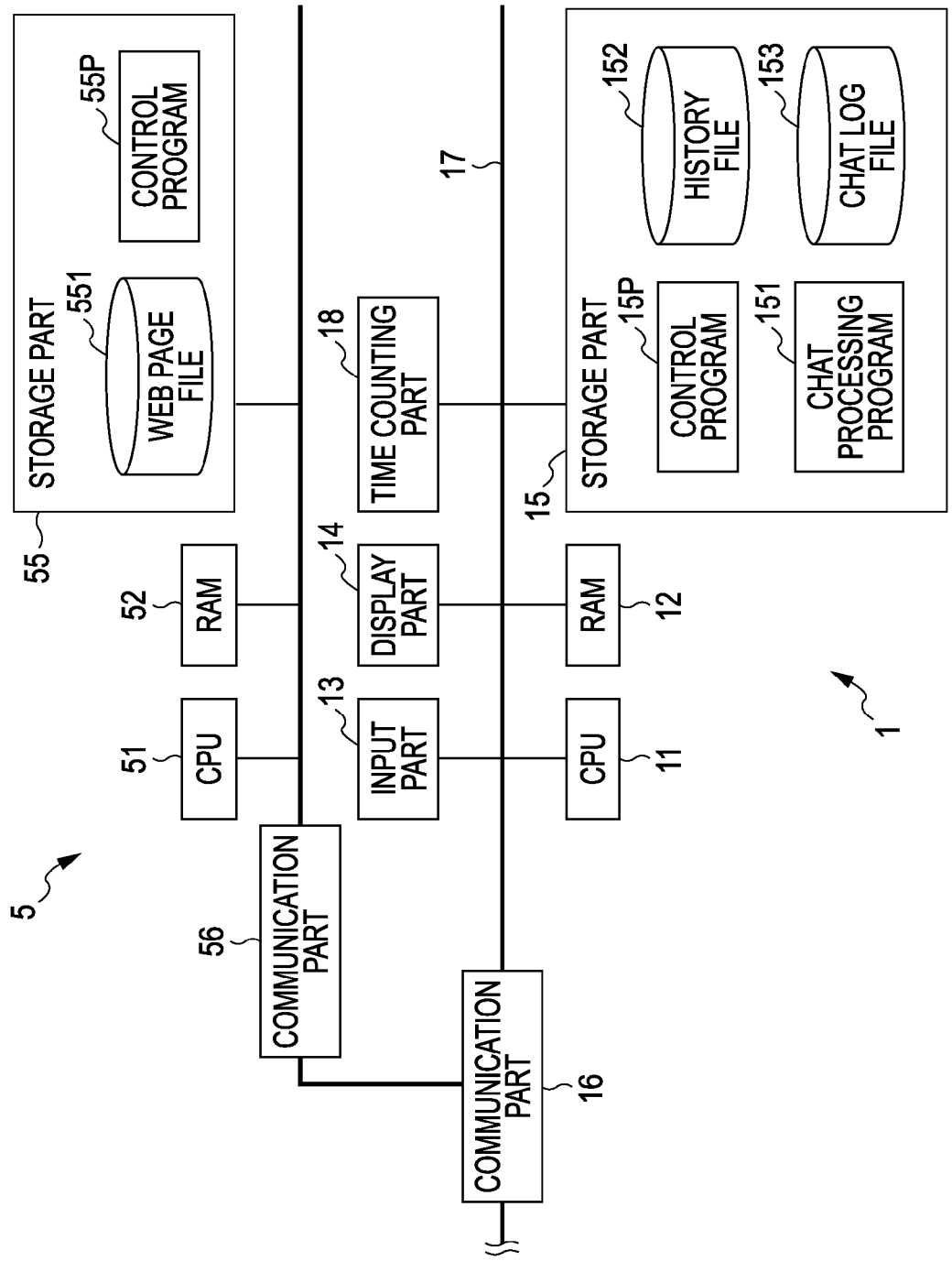
FIG. 2 illustrates a hardware structure of a chat server and a Web server.

FIG. 2 is a block diagram illustrating a hardware structure of the chat server 1 and the Web server 5. The following describes a first embodiment in which the storage part 55 is provided in the Web server 5 outside the chat server 1, and the Web server 5 transmits a Web page related to the created URL stored in the storage part 55. However, the chat server 1 may house the storage part 55 and the chat server 1 may transmit the Web page related to the created URL stored in the storage part 55 similarly to the Web server 5.

The chat server 1 includes a CPU (Central Processing Unit) 11 as a control part, a RAM (Random Access Memory) 12, a communication part 16, an input part 13, a display part 14, a time counting part 18, and a storage part 15. The CPU 11 is connected to respective parts of the chat server 1 via a bus 17 and executes various software functions according to a control program 15P stored in the storage part 15.

The communication part 16 may be a gateway or the like which fulfills a function as a firewall. The display part 14 may be a liquid crystal display or the like. The input part 13 may be a keyboard and a mouse. The time counting part 18 outputs counted time information to the CPU 11. The storage part 15 may be a hard disc or the like. A chat processing program 151 for executing a chat process, a history file 152, and a chat log file 153 as well as the above control program 15P are stored in the storage part 15. The CPU 11 is connected to the personal computers 2A and 2B via a communication part, and when entering a chat room, the CPU 11 executes various chat processes according to the chat processing program.

Specifically, when a message is transmitted from the personal computer 2A, the message is transmitted to another user currently in the chat room, such as the personal computer 2B. The CPU 11 communicates in a scheme, in which field keys of the history file 152 and the chat log file 153 are correlated with each other, using SQL (Structured Query Language), so as to store or search for desirable information.

The Web server 5 is composed of hardware which is substantially the same as the blog server 4. Specifically, the Web server 5 includes a CPU 51, a RAM 52, and a storage part 55. The CPU 51 is connected to the hardware and a communication part 56, and executes various processes according to a control program 55P in the storage part 55. The storage part 55 stores a Web page file 551. The Web page file 551, the history file 152, and the chat log file 153 will be described later.

Figure 3:
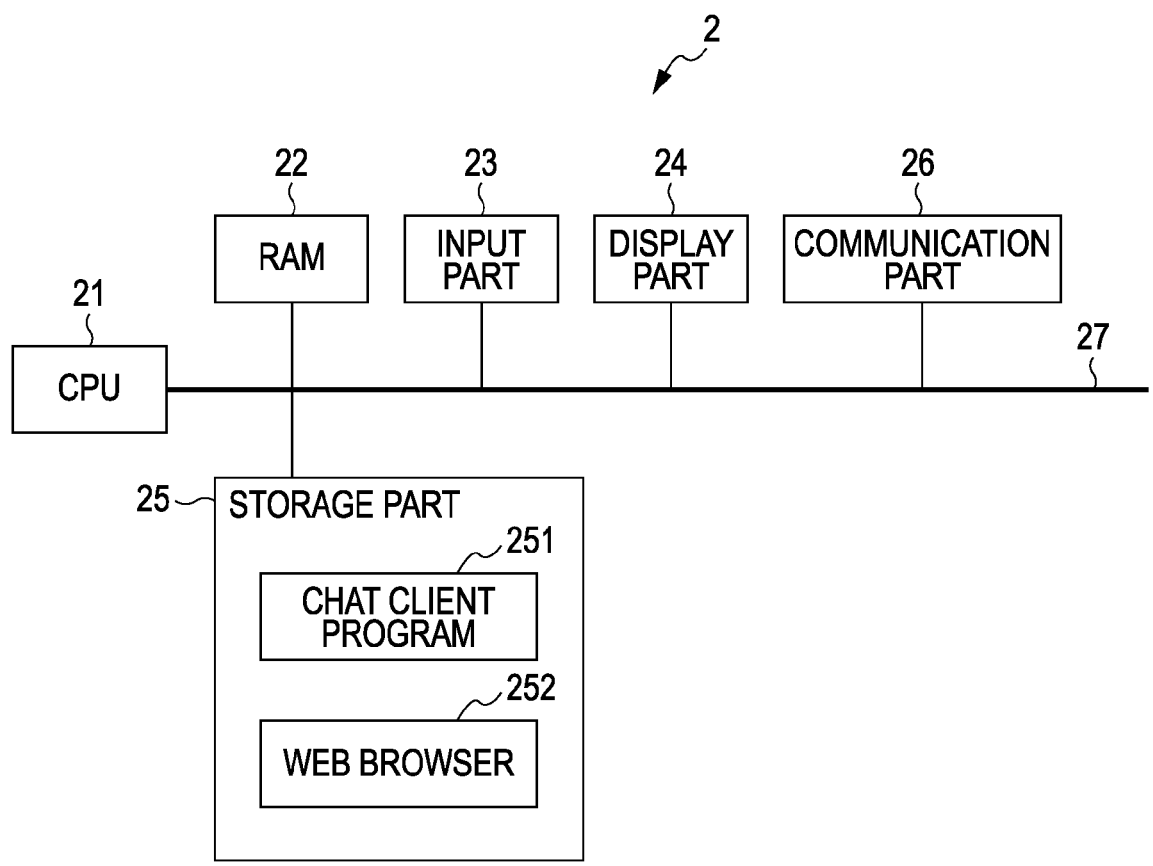
FIG. 3 illustrates a hardware structure of a personal computer.

The personal computer 2 will be described below. FIG. 3 is a block diagram illustrating a hardware structure of the personal computer 2. The personal computer 2 includes a CPU 21 as a control part, a RAM 22, an input part 23, a display part 24, a communication part 26, and a storage part 25. The CPU 21 is connected to the respective parts of the personal computer 2 via a bus 27. A chat client program 251, which is downloaded from the chat server 1, is stored in the storage part 25.

The display part 24 may be, for example, a liquid crystal display. The input part 23 may be a keyboard and a mouse. The communication part 26 may be a modem or an LAN card. The communication part 26 transmits/receives information to/from the chat server 1, the Web server 5, and the blog server 4 according to a protocol such as HTTP. The storage part 25 may be a hard disc or a large capacity memory. A web browser 252 such as Internet Explorer (registered trade name) is stored in the storage part 25. The CPU 21 actuates the Web browser 252 according to an instruction from the input part 23. When a chat session is started, the CPU 21 actuates the chat client program 251 based on an instruction from the input part 23.

The CPU 21 establishes communication with the chat server 1 via the communication part 26. After establishing communication with the chat server 1, the CPU 21 accepts selection of a chat room to be entered according to an instruction from the input part 23. The CPU 21 transmits information about the chat room to the chat server 1. The CPU 11 of the chat server 1 permits the personal computer 2 to enter the chat room according to the chat processing program 151. The CPU 21 of the personal computer 2 accepts an input of a message from the input part 23, and transmits the accepted message to the chat server 1. The CPU 11 of the chat server 1 transmits the accepted message to the personal computer 2 related to a user currently in the chat room.

Figure 4:
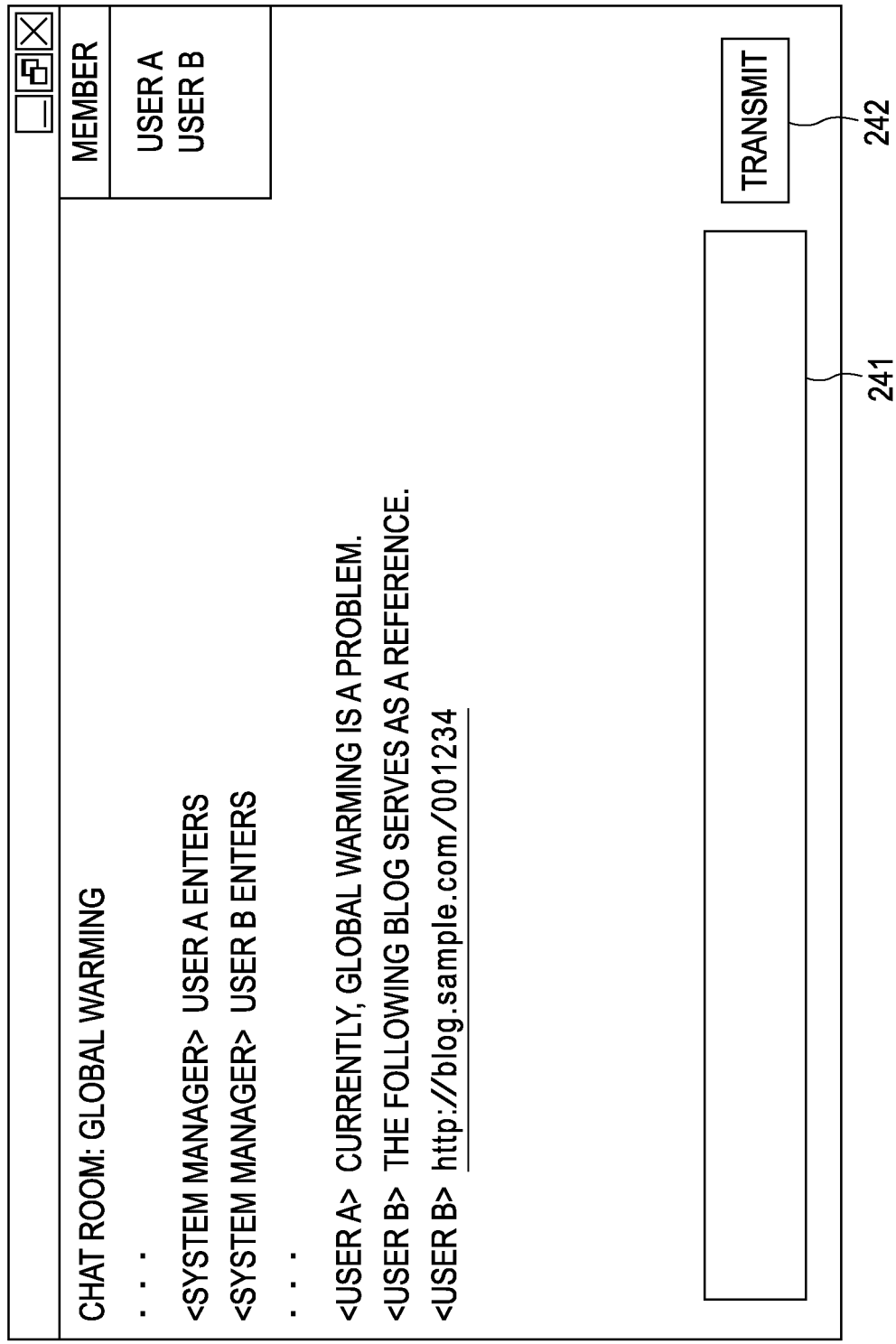
FIG. 4 illustrates an image of a chat.

FIG. 4 is an explanatory diagram illustrating an image of chat. A screen shown in FIG. 4 is displayed on the display part 24 of the personal computer 2B of the user B. In the example of FIG. 4, the name of the chat room is "Global warming", and the screen indicates that two users A and B are currently in the chat room. The user B inputs "the following blog serves as a reference" from the input part 23 into an input box 241 as a response to a message of the user A in order to introduce a blog of the blogger C which is recognized by the user B. When the CPU 21 accepts an operational input of a transmission button 242 from the input part 23, the CPU 21 transmits the message input into the input box 241 to the chat server 1.

The user B pastes the URL "http://blog.sample.com/001234" of the introduced blogger C's blog into the input box 241 using, for example, the cut & paste function. When the CPU 21 accepts the operational input of the transmission button 242 from the input part 23, the CPU 21 transmits the URL input into the input box 241 to the chat server 1. The CPU 11 of the chat server 1 transmits the input message to the personal computers 2 of the users A and B. The URL of the blog shown in FIG. 4 is displayed on the display part 24 of the personal computer 2. The CPU 11 of the chat server 1 executes the control program 15P as well as the chat processing program 151 for executing the above process, and monitors the received message. The CPU 11 stores a history related to the chat in the chat log file 153.

FIG. 5 is an explanatory diagram illustrating a record layout of the chat log file 153. The chat log file 153 stores dates and messages of respective chat rooms as history. Chat rooms are, for example, "Global warming", "hobby" and "car", and in this example, the history of the "Global warming" is displayed. The chat log file 153 includes a time and date field, an event field, a user ID field, a message field, and a message ID field. The time and date at which each event is executed are stored in the time and date field based on time and date information output from the time counting part 18. Events correlated with the time and date are stored in the event field. "Enter" in the event field indicates that the personal computer 2 enters the chat room. "Comment" in the event field indicates that a message from the personal computer 2 is received.

Transmitter identification information (hereinafter, user ID) for specifying people who transmit messages, which are correlated with the time and date and the events, is stored in the user ID field. In an example of FIG. 5, two user IDs "A" and "B" are stored. Messages transmitted from the personal computer 2 are correlated with the time and date and the user IDs so as to be stored as text data into the message field. IDs for specifying messages, which are correlated with the messages, are stored in the message ID field.

In this example, the user A makes a comment "Currently, Global warming is a problem" at 10:00:10, and the user B makes a comment "the following blog serves as a reference" 5 seconds after that. The user B transmits a message "http://blog.sample.com/001234" 3 seconds after that. When the CPU 11 of the chat server 1 determines that a URL is present in the received message, the CPU 11 detects the URL. The CPU 11 acquires a trackback URL from the blog server 4 based on the detected URL. Details of the process for acquiring a trackback URL will be described later.

Figure 6:
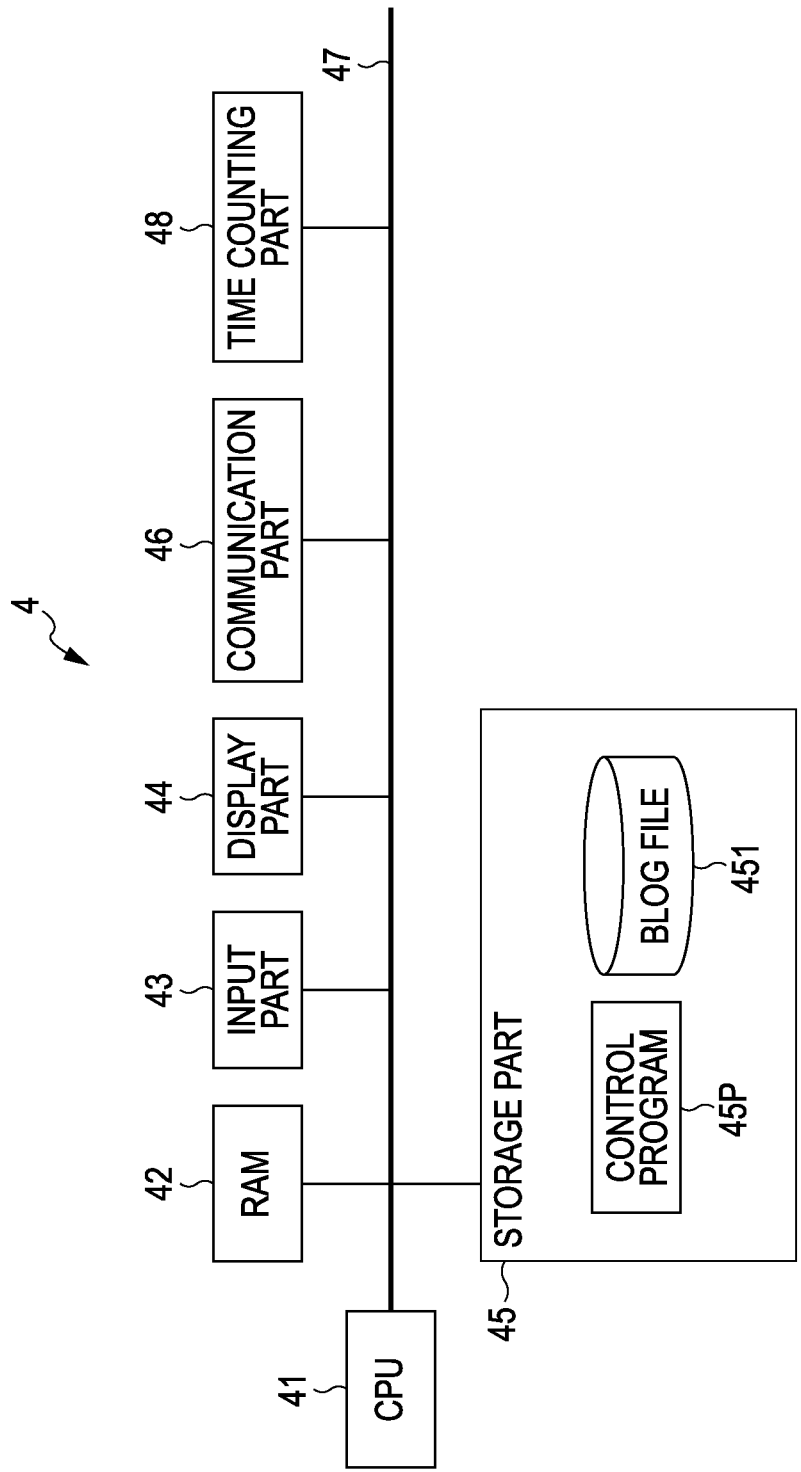
FIG. 6 illustrates a hardware structure of a blog server.

FIG. 6 is a block diagram illustrating a hardware structure of the blog server 4. The blog server 4 includes a CPU 41 as a control part, a RAM 42, a communication part 46, an input part 43, a display part 44, a time counting part 48, and a storage part 45. The CPU 41 is connected to the respective hardware parts of the blog server 4 via the bus 47, so as to execute various software functions according to a control program 45P stored in the storage part 45. Description about details of the hardware is omitted. A blog file 451 is stored in the storage part 45. The blog file 451 stores various data about the blog transmitted from the blogger computer 3.

Figure 7:
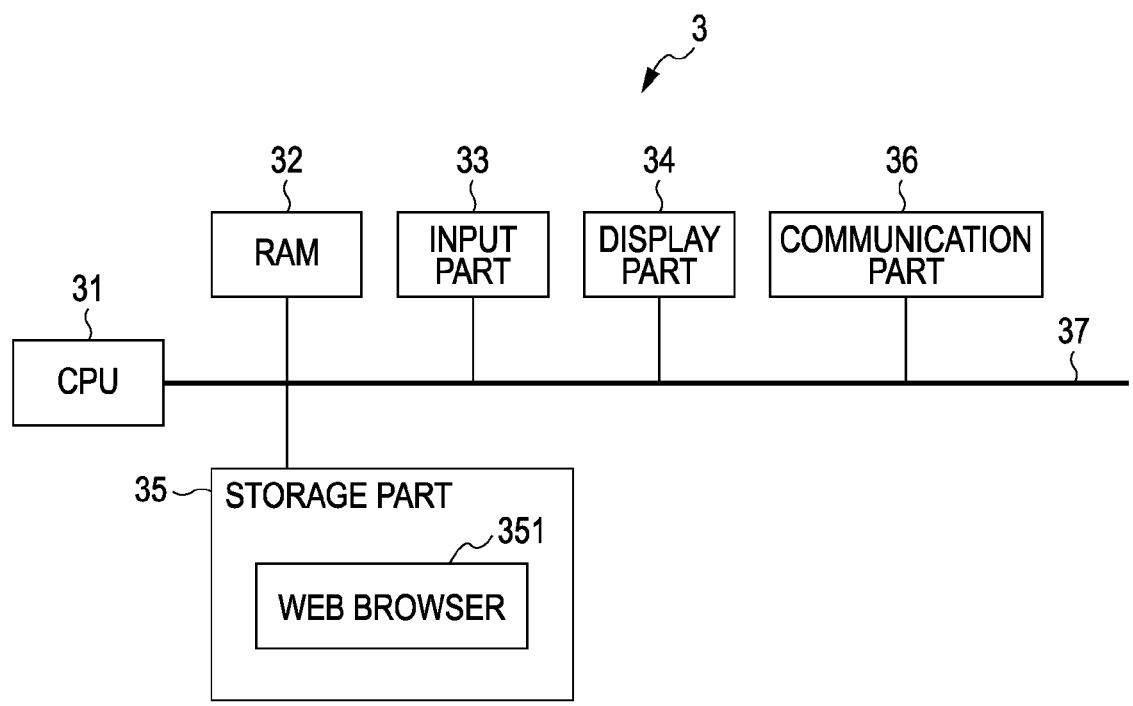
FIG. 7 illustrates a hardware structure of a blogger computer.

FIG. 7 is a block diagram illustrating a hardware structure of the blogger computer 3. The blogger computer 3 includes a CPU 31 as a control part, a RAM 32, an input part 33, a display part 34, a communication part 36, and a storage part 35. The CPU 31 is connected to the respective parts of the blogger computer 3 via a bus 37. A Web browser 351 for displaying a blog or the like transmitted from the blog server 4 on the display part 34 is stored in the storage part 35. Since the blogger computer 3 and the personal computer 2 are substantially the same, description of their details is omitted.

Figure 8:
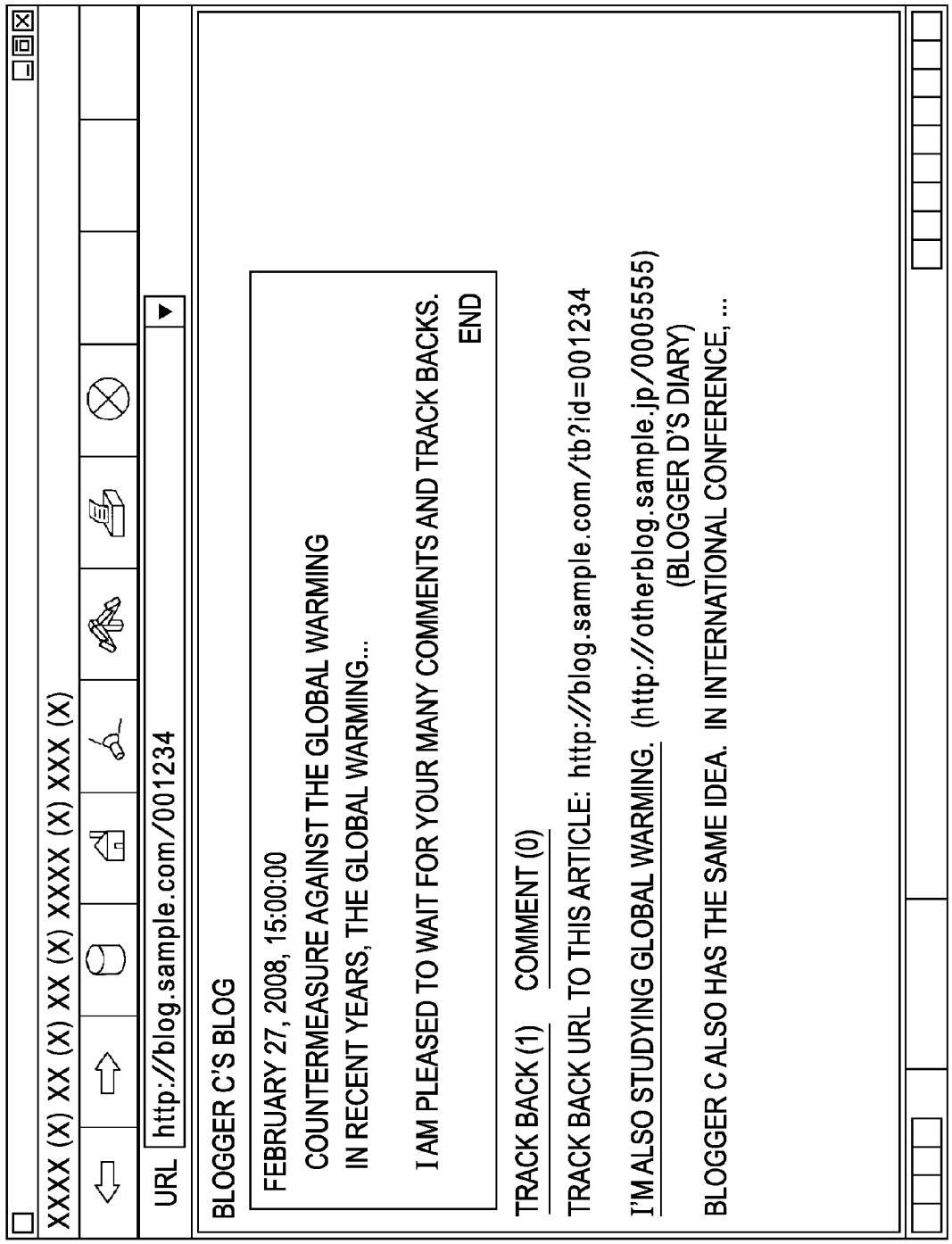
FIG. 8 illustrates an image of a blog.

FIG. 8 is an explanatory diagram illustrating an image of a blog. The blogger C creates a blog related to global warming. The URL of the blogger C's blog (hereinafter, blog URL) is "http://blog.sample.com/001234", and information related to the blog is stored in the blog file 451 of the blog server 4. The CPU 41 of the blog server 4 receives comments for the blog, and correlates the received comments with the blog URL so as to store the received comments in the blog file 451. When the CPU 41 creates a blog URL, the CPU 41 creates a trackback URL. The trackback URL is correlated with the blog URL so as to be stored in the blog file 451.

Figure 9:
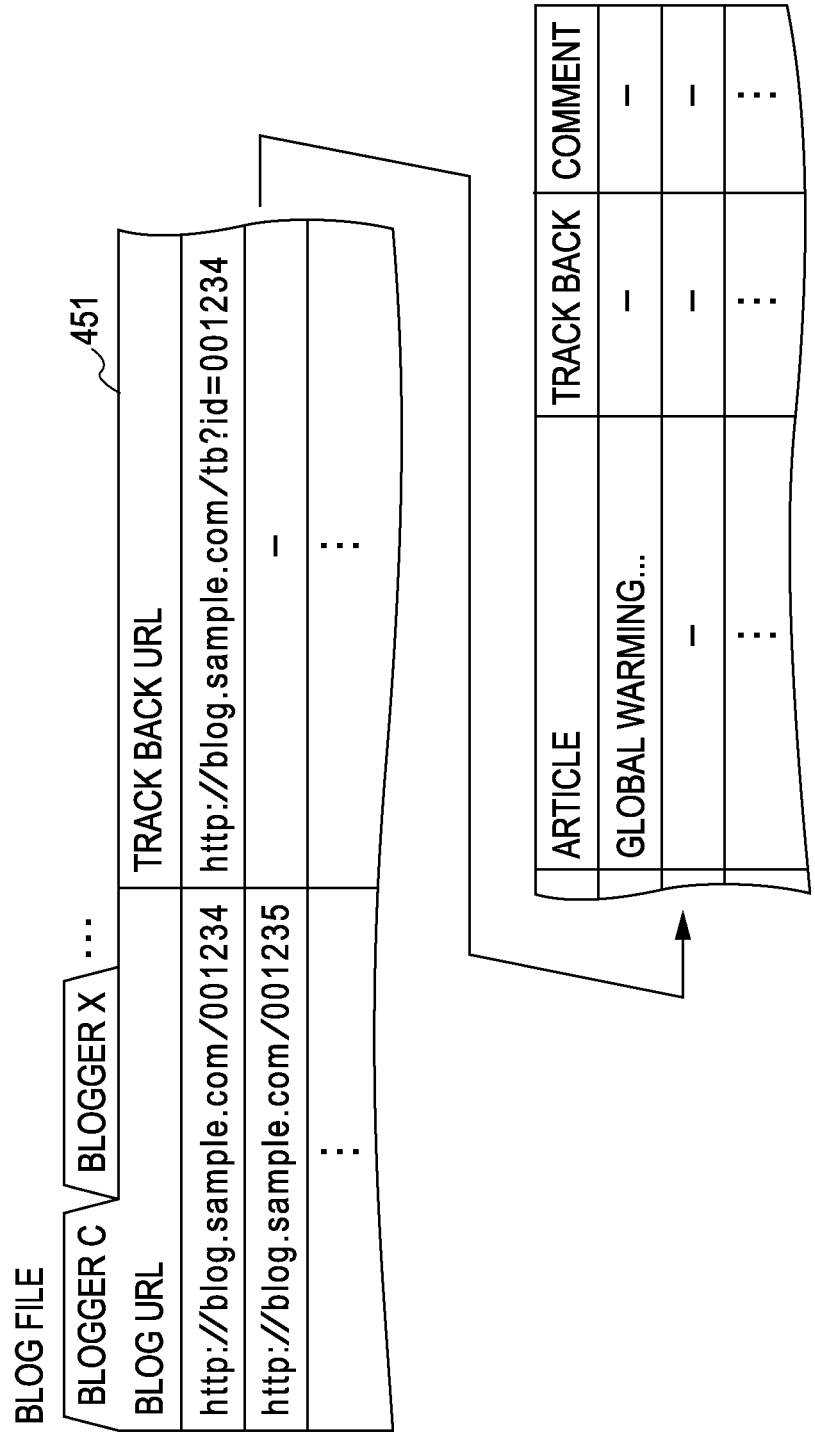
FIG. 9 illustrates a record layout of a blog file.

As shown in FIG. 8, the trackback URL "http://blog.sample.com/tb?id=001234" is displayed on the blog URL. At this stage, one trackback is created by a blogger D. FIG. 9 is an explanatory diagram illustrating a record layout of the blog file 451. The blog file 451 includes a blog URL field, a trackback URL field, an article field, a trackback field, and a comment field. The storage forms of data about various files described above and below are only examples and are not limited as such as long as a correspondence relation is clear.

Blog URLs to be given to users' daily blogs are stored in the blog URL field. The blog URL is created by the CPU 41 every time a new blog is created. Trackback URLs for when the trackback function of the blog URL is executed are correlated with respective blog URLs and are stored in the trackback URL field. Articles related to the blog are stored in the article field. Information at the time when the trackback URLs are used by blogs of other people through blog servers, not shown, is stored in the trackback field.

Specifically, blog URLs of other blogs, blogger names, blog titles, and blog summaries transmitted together with the trackback Ping are stored in the trackback field. The example of FIG. 8 shows that a trackback is performed for the blogger C's blog in the blogger D's blog "I am also studying Global warming". A hyper link, into which a blog URL (http://otherblog.sample.jp/0005555) for accessing the blogger D's blog is embedded, is set in this title. The blogger C clicks this hyper link through the input part 33 of the blogger computer 3, so as to be capable of browsing the blogger D's blog.

A process for acquiring the trackback URL in the chat server 1 will be described. When the CPU 11 of the chat server 1 detects a blog URL in a message as shown in FIGS. 4 and 5, the CPU 11 transmits the detected blog URL to the blog server 4, and requests acquisition of the trackback URL. The CPU 41 of the blog server 4 searches the blog file 451 based on the blog URL according to the acquisition request, and reads the corresponding trackback URL from the blog file 451. The CPU 41 of the blog server 4 transmits the read trackback URL to the chat server 1.

The acquisition of the trackback URL may be performed as follows. The CPU 11 of the chat server 1 transmits a head command for acquiring header information about HTTP to the blog server 4 based on the detected blog URL. For example, when the blog URL is "http://blog.sample.com/001234", a request of "HEAD/001234 HTTP/1.1 HOST: blog.sample.jp" is transmitted to the blog server 4. The CPU 41 of the blog server 4 accepts this request so as to transmit a response "HTTP/1.1 200 Ok Trackback: http://blog.sample.com/tb?id=001234" to the chat server 1. As an example, a header "Trackback" is extended. As a result, the CPU 11 of the chat server 1 can acquire the trackback URL. When the acquisition of the trackback URL is completed, the following process is executed.

The CPU 11 of the chat server 1 refers to the chat log file 153, and extracts a message. For example, the CPU 11 extracts a message within a given time before the time and date of the reception of the message related to the blog URL (for example, within 5 minutes) or a plurality of messages where the same keyword appears. The first embodiment describes an example in which the messages received in one chat room are extracted within 5 minutes before the time and date of the detection of the blog URL. In this example, messages having message IDs of M01 to M03 are extracted. The invention is not limited to this, and messages related to a plurality of user IDs that transmit many messages may be extracted, or messages that include a specific keyword (for example, "Global warming") may be extracted.

Figure 10:
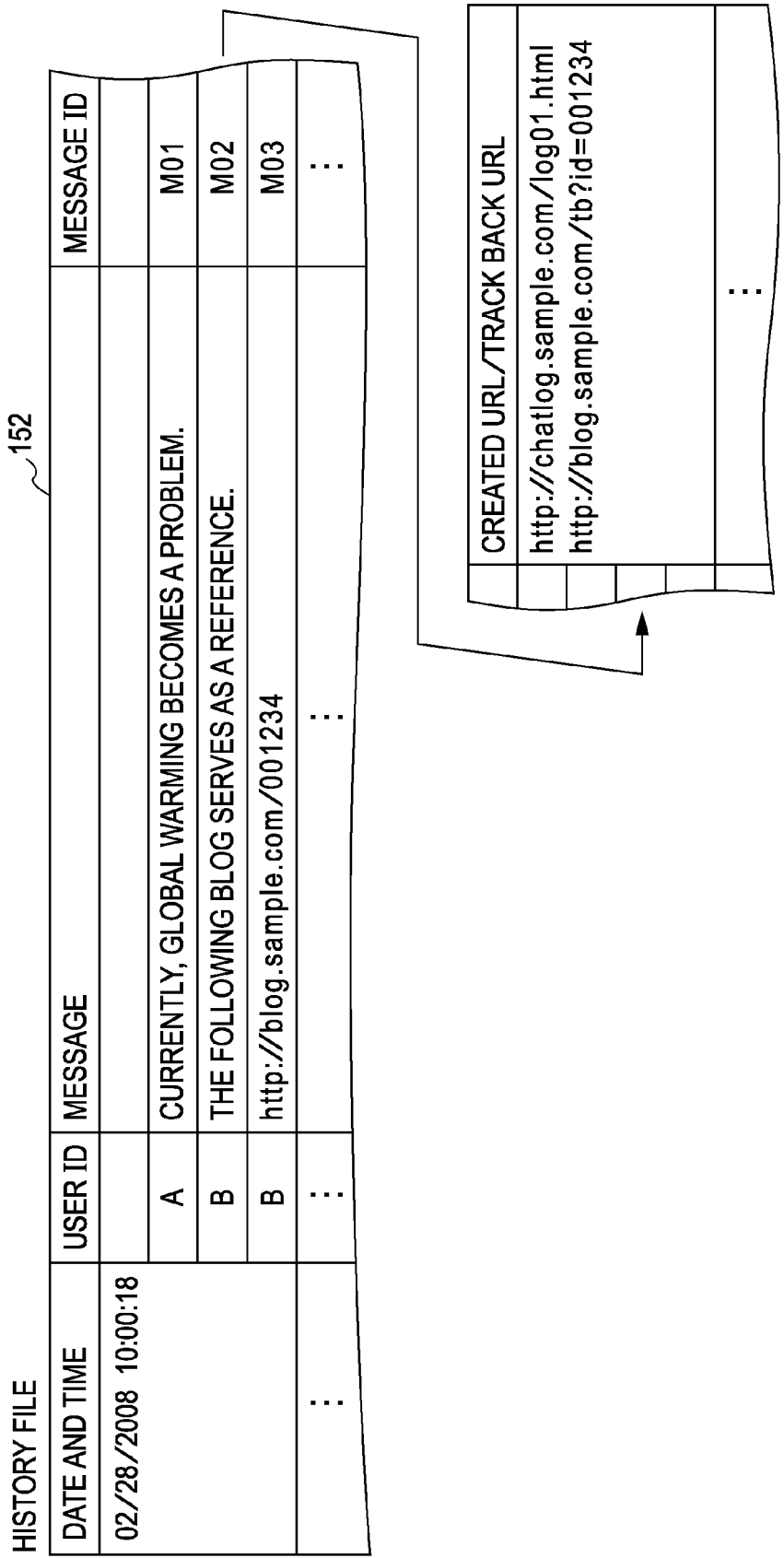
FIG. 10 illustrates a record layout of a history file.

The CPU 11 stores the time and date of the reception of the blog URL, the extracted messages, the message IDs, and the user IDs related to the users who transmit the messages in the history file 152. A chat room name (Global warming) is also stored. The CPU 11 creates a new URL in order to create a new Web page. For example, the CPU 11 creates URL "http://chatlog.sample.com/log01.html". FIG. 10 is an explanatory diagram illustrating a record layout of the history file 152. The history file 152 includes a time and date field, a user ID field, a message field, a message ID field, and a created URL/trackback URL field.

The CPU 11 stores the time and date at which the blog URL is extracted, the created URL, and the acquired trackback URL in the history file 152. The CPU 11 correlates the date and time, the created URL, and the acquired trackback URL, and stores an extracted user ID in the user ID field. The CPU 11 further stores extracted messages in the message field, and stores message IDs corresponding to the extracted messages in the message ID field. The CPU 11 reads the created URL, the chat room name, the user IDs, the messages, and the trackback URL stored in the history file 152 from the history file 152 at appropriate times, and transmits them to the Web server 5.

Figure 11:
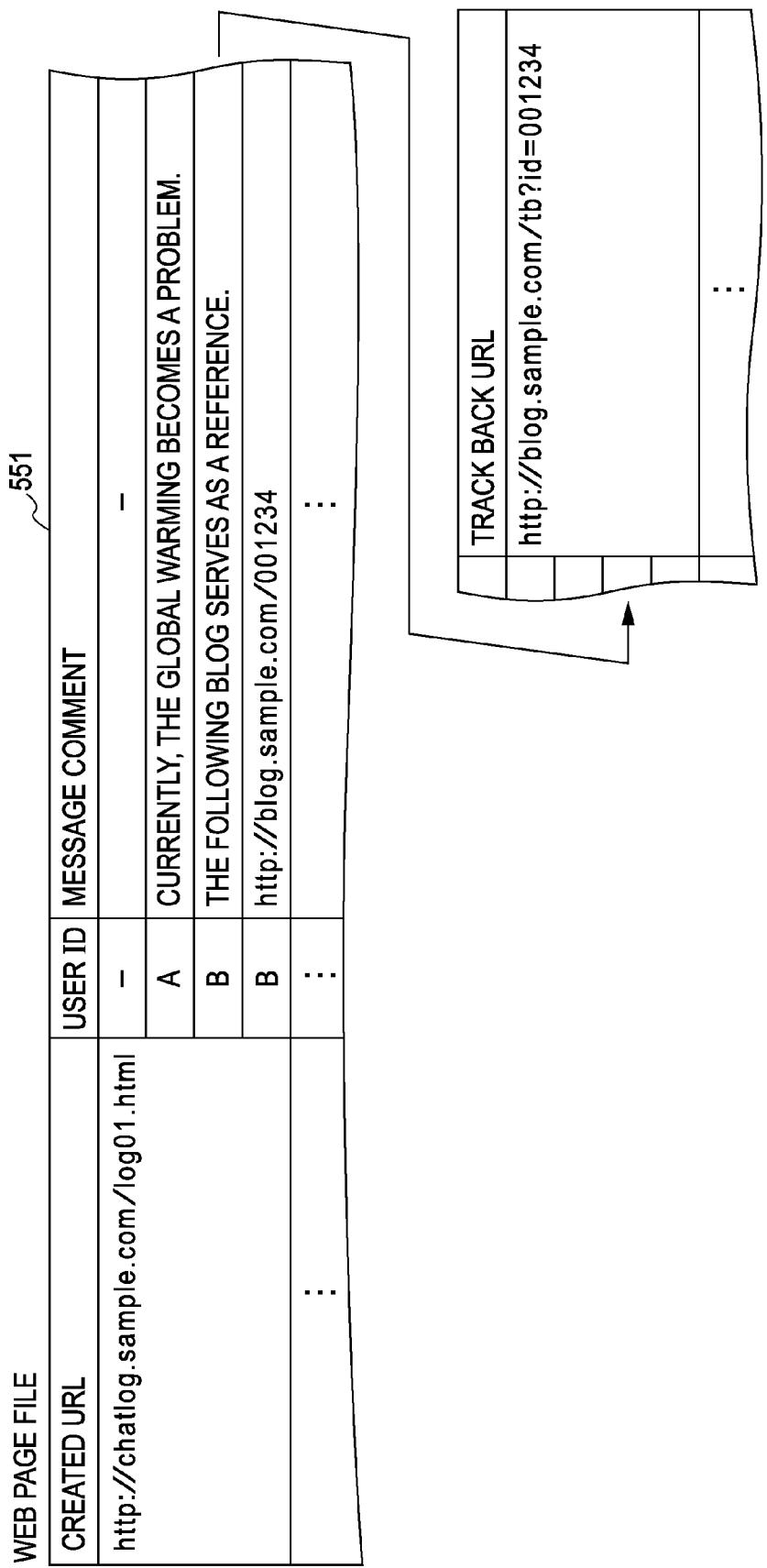
FIG. 11 illustrates a record layout of a Web page file.

The CPU 51 of the Web server 5 receives the created URL, the chat room name, the user IDs, the messages, and the trackback URL transmitted from the chat server 1 and stores them in the Web page file 551. FIG. 11 is an explanatory diagram illustrating a record layout of the Web page file 551. The Web page file 551 includes a created URL field, a user ID field, a message/comment field, and a trackback URL field. The created URL "http://chatlog.sample.com/log01.html" that is an address of a new Web site that correlates the chat users A and B and the blogger C is stored in the created URL field. Although not shown in the drawing, the chat room name is also correlated with the created URL and stored.

User IDs of users who transmit messages are stored in the user ID field. Messages, which are correlated with the user IDs and are transmitted, are stored in the message/comment field. As described later, comments can be written in this Web site. When a comment is transmitted, the CPU 51 stores the comment in the message/comment field. Trackback URL of the blogger C's blog is stored in the trackback URL field. The CPU 51 writes information stored in the Web page file 551 into an HTML text to be a template stored in the storage part 55 in advance. As a result, the CPU 51 creates a new Web page where the message is written.

Figure 12:
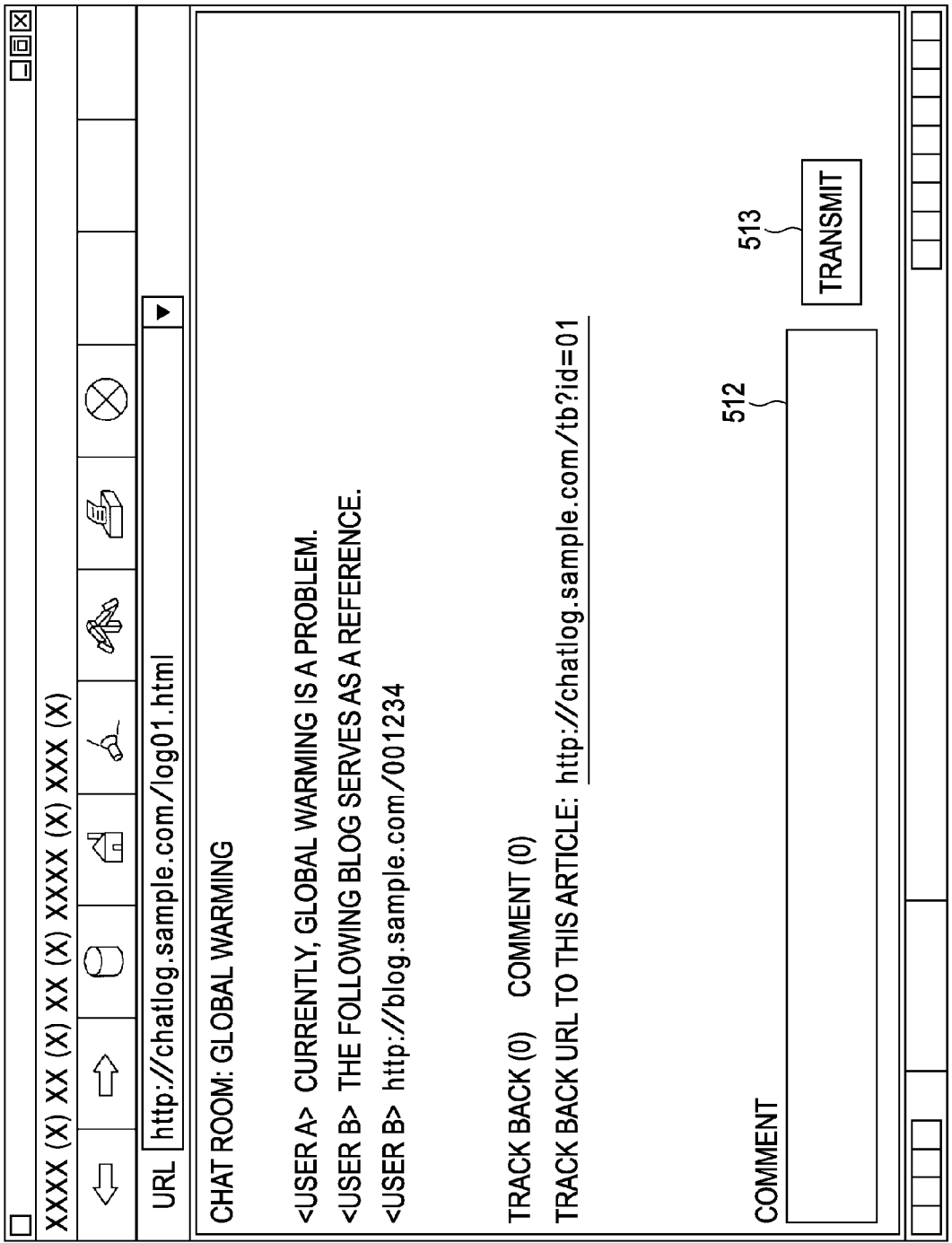
FIG. 12 illustrates an image of a created Web page.

FIG. 12 is an explanatory diagram illustrating an image of the created Web page. The URL is the created URL "http://chatlog.sample.com/log01.html" stored in the created URL field. The read chat room name, user ID, and the message are displayed in the created Web page. The Web server 5 has a comment input box 512 and a transmission button 513 on the created Web page similar to the blog server. Trackback URL "http://chatlog.sample.com/tb?id=01" is included in order to enable trackback. The newly created Web page is stored in the storage part 55.

When the trackback URL is stored in the Web page file 551, or when a Web page is created, the CPU 51 transmits a trackback Ping to the blog server 4 in order to post an execution of the trackback. Specifically, the CPU 51 transmits the created URL, the chat room name, and a part of the message to the trackback URL "http://blog.sample.com/tb?id=001234" as an address. When the CPU 41 of the blog server 4 receives the trackback Ping, the CPU 41 stores the trackback including the transmitted created URL and the message correlated with the trackback blog or the Web page into the blog file 451.

Figure 13:
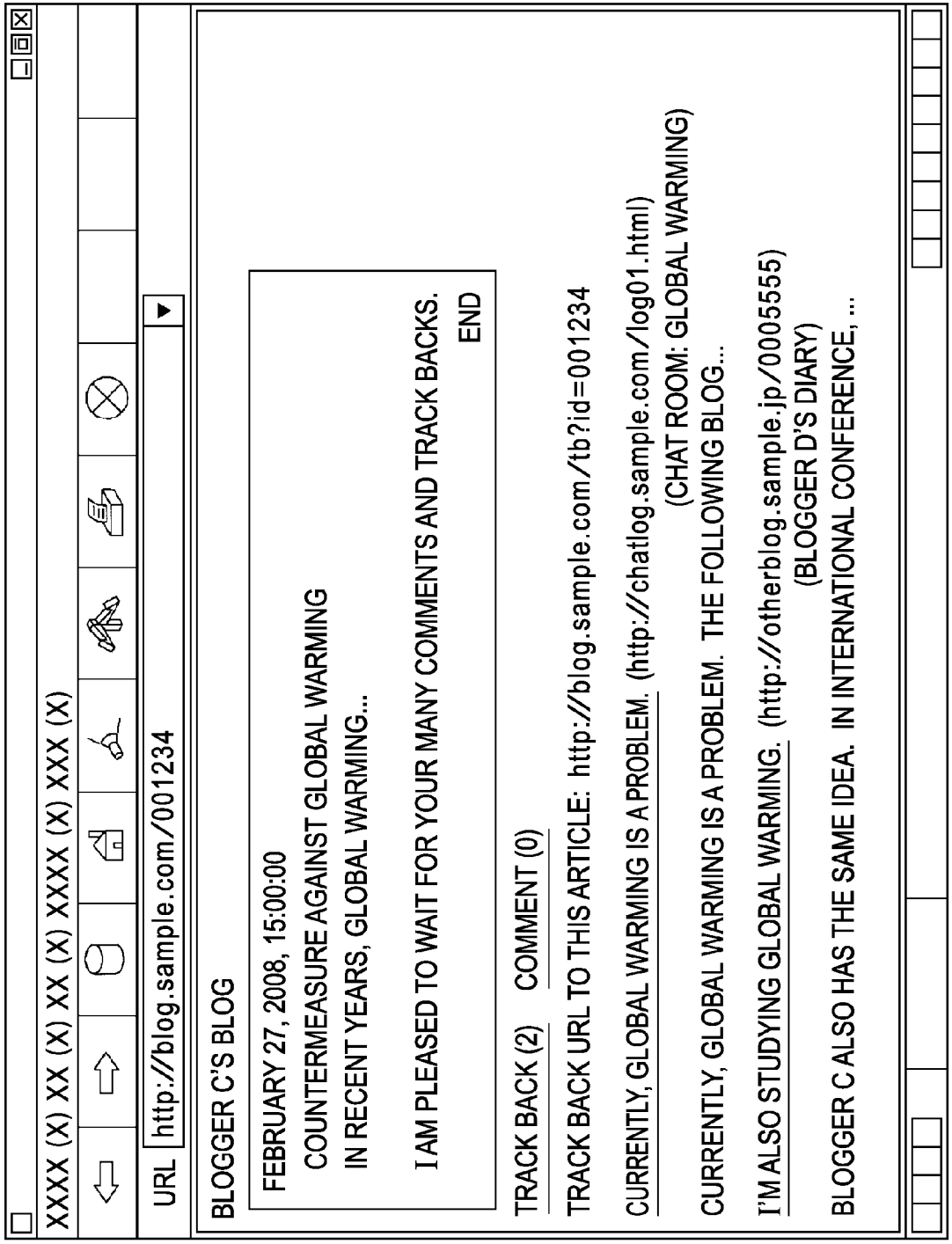
FIG. 13 illustrates an image of a blog after a trackback.

When the CPU 41 accepts the request for transmission of the blog from the blogger computer 3 of the blogger C, the CPU 41 describes information about the newly stored trackback into the blog and then transmits the information. FIG. 13 is an explanatory diagram illustrating an image of the blog after the trackback. A message text related to a hyper link that displays the chat room name "Global warming" and the created URL "http://chatlog.sample.com/log01.html" as links, and some of the transmitted messages are displayed as trackback. The bloggers including the blogger C may understand that the chat room covers the subject about the blog. The hyper link related to the created URL "http://chatlog.sample.com/log01.html" embedded into the message "Currently, Global warming is a problem" is clicked. As a result, the blogger computer 3 can download the Web page from the Web server 5.

The Web page shown in FIG. 12 is displayed on the Web browser 351 of the blogger C's blogger computer 3. The blogger C browses the Web page to see how an opinion stated in the blog is discussed in the chat room. The CPU 31 of the blogger computer 3 in FIG. 7 accepts an input of a comment from the input part 33. In this example, the blogger C inputs "I am C. Currently, the following solution . . . ". When the CPU 31 accepts an input of the transmission button 513 from the input part 33, the CPU 31 transmits the created URL and a comment input into the comment input box 512 to the Web site 5.

FIG. 14 illustrates a record layout of the Web page file 551 after comments are added. When the CPU 51 of the Web server 5 receives a transmitted comment as well as the created URL, the CPU 51 stores the comment transmitted to the Web page file 551 in association with the created URL into the message/comment field. When the CPU 51 again accepts the request for acquiring the Web page corresponding to the created URL from the personal computer 2 or the blogger computer 3, the CPU 51 creates an HTML text including information about the chat room name, the user ID, the messages, the comments, and the trackback URL. The CPU 51 stores the created HTML text in the storage part 55, and transmits the created HTML to the personal computer 2 and/or the blogger computer 3 as requested.

Figure 15:
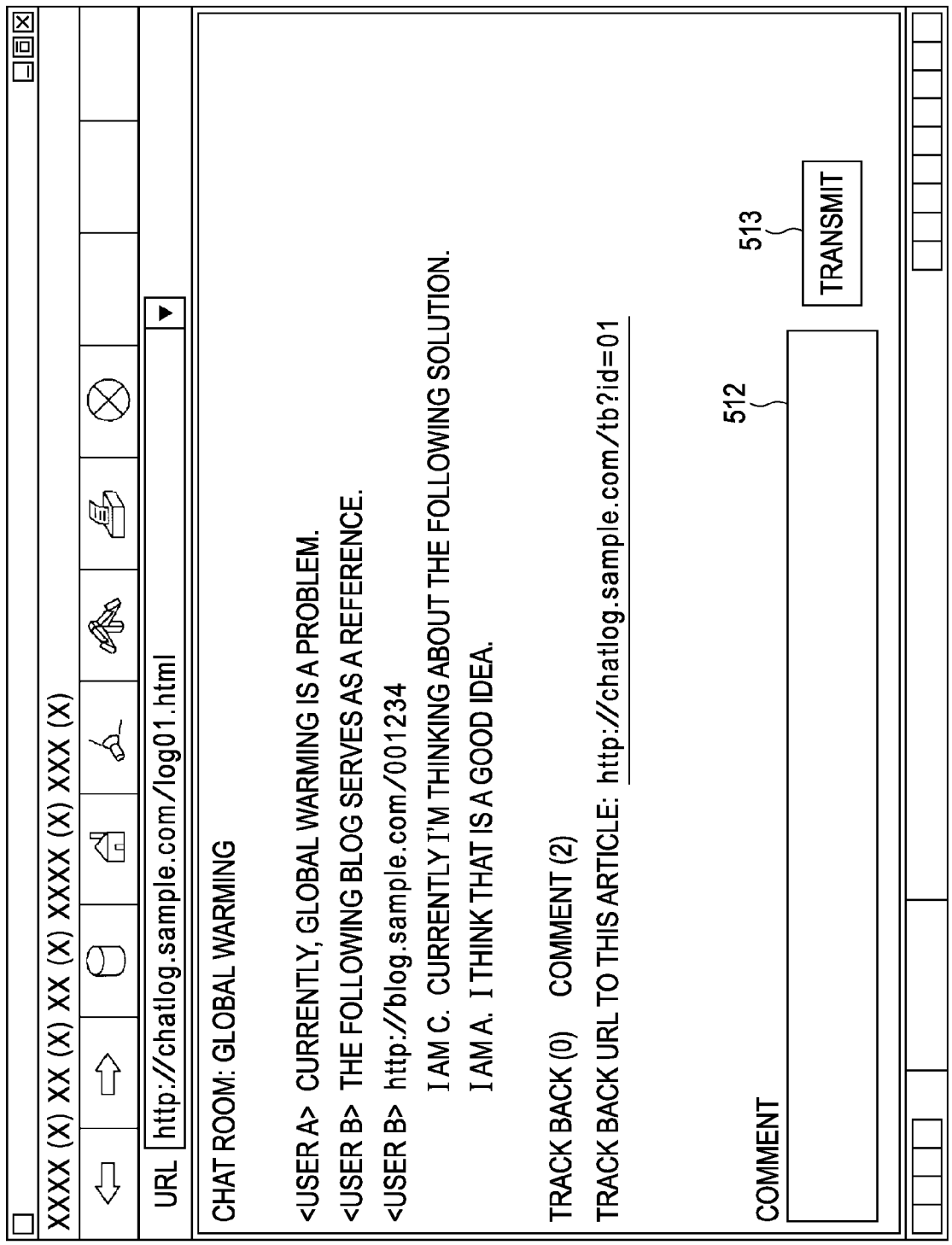
FIG. 15 illustrates an image displayed on a Web browser of a personal computer.

FIG. 15 is an explanatory diagram illustrating an image displayed on the Web browser 252 of the personal computer 2. In an example of FIG. 15, a blogger C's comment "I am C. Currently I'm thinking about the following solution" is displayed below the message. Furthermore, the chat users A and B input comments in the comment input box 512 so as to be capable of further discussion. In the example of FIG. 15, after the blogger C, the user A transmits a comment "I am A. I think that is a good idea . . . ".

Figure 16:
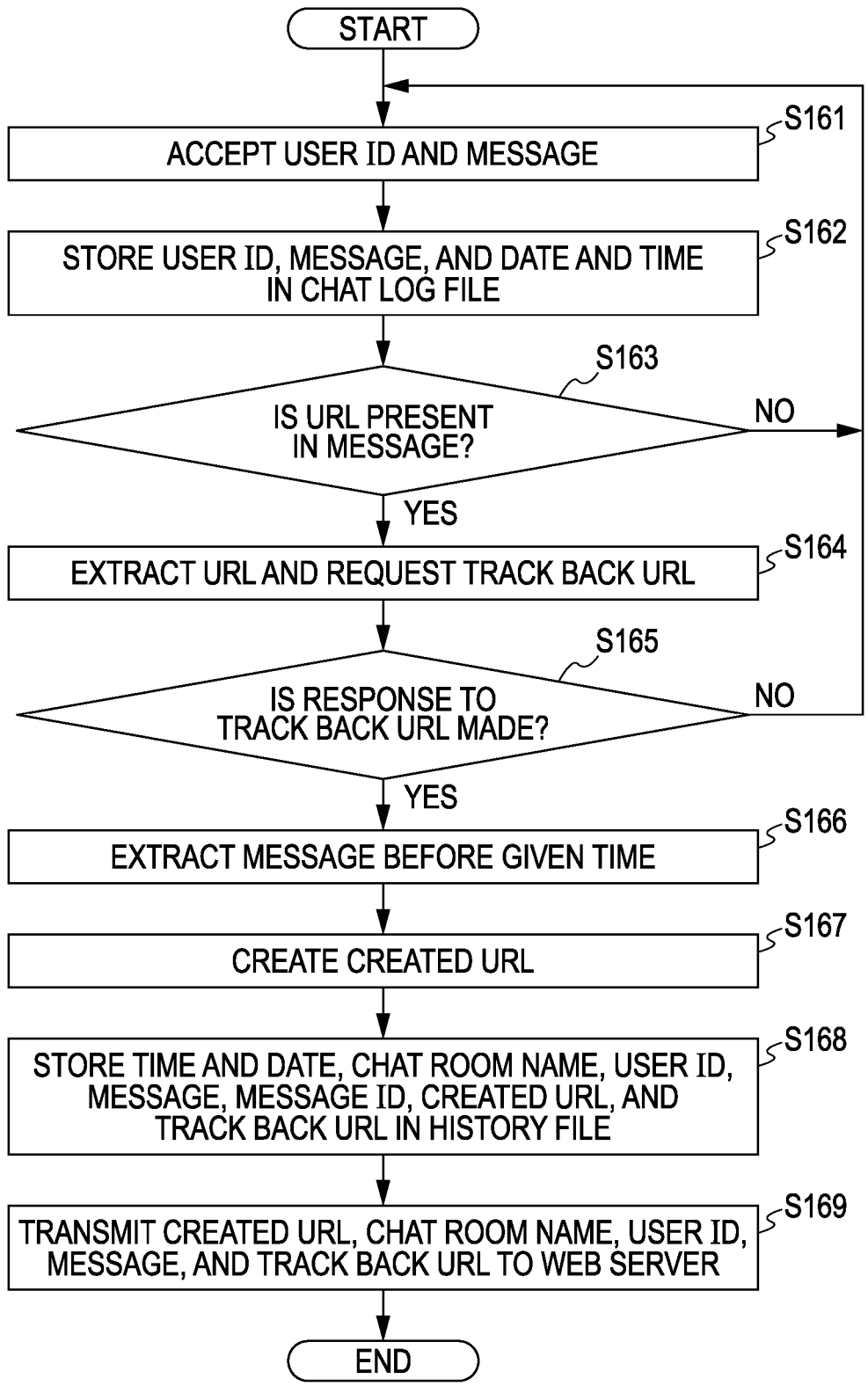
FIG. 16 illustrates a flow chart of a process for creating a URL in a chat server.

In the above hardware structure, the procedure of the software processes will be described below with reference to a flow chart. FIG. 16 is a flow chart illustrating the procedure of the process for creating created URL in the chat server. After the CPU 11 of the chat server 1 permits the personal computers 2A and 2B to enter the chat room "Global warming", the CPU 11 executes the following process according to the control program 15P. The CPU 11 accepts a user ID and a message transmitted from the personal computer 2 (step S161). The CPU 11 stores the accepted user ID, the message, and the time and date output from the time counting part 18 in the chat log file 153 (step S162).

The CPU 11 refers to the chat log file 153, and determines whether or not a URL is present in the message (step S163). For example, the CPU 11 determines whether characters such as "http" or "www" are present in the message. When the CPU 11 determines that a URL is not present (NO at step S163), the process returns to step S161. On the other hand, when the CPU 11 determines that a URL is present (YES at step S163), the CPU 11 extracts the URL and requests a trackback URL based on the extracted URL (Step S164).

The CPU 11 determines whether or not a response was made to the trackback URL regarding the request for the trackback URL (step S165). When a response for trackback is not made (NO at step S165), the extracted URL might not be a URL related to the blog, and thus the process returns to step S161. On the other hand, if the response of trackback is made (YES at step S165), the CPU 11 refers to the messages and the time and date stored in the chat log file 153 and extracts a messages before the given time from the time and date of the acceptance of the URL (step S166).

The CPU 11 creates a created URL for a new Web page (step S167). The CPU 11 correlates the time and date, the chat room name, the user ID corresponding to the message extracted at step S166, the message extracted at step S166, the message ID corresponding to the message extracted at step S166, the created URL created at step S167, and the trackback URL responded at step S165 with one another, and stores them in the history file 152 (step S168). Finally, the CPU 11 transmits the created URL, the chat room name, the user ID, the message, and the trackback URL stored in the history file 152 to the Web server 5 via the communication part 16 (step S169).

Figure 17:
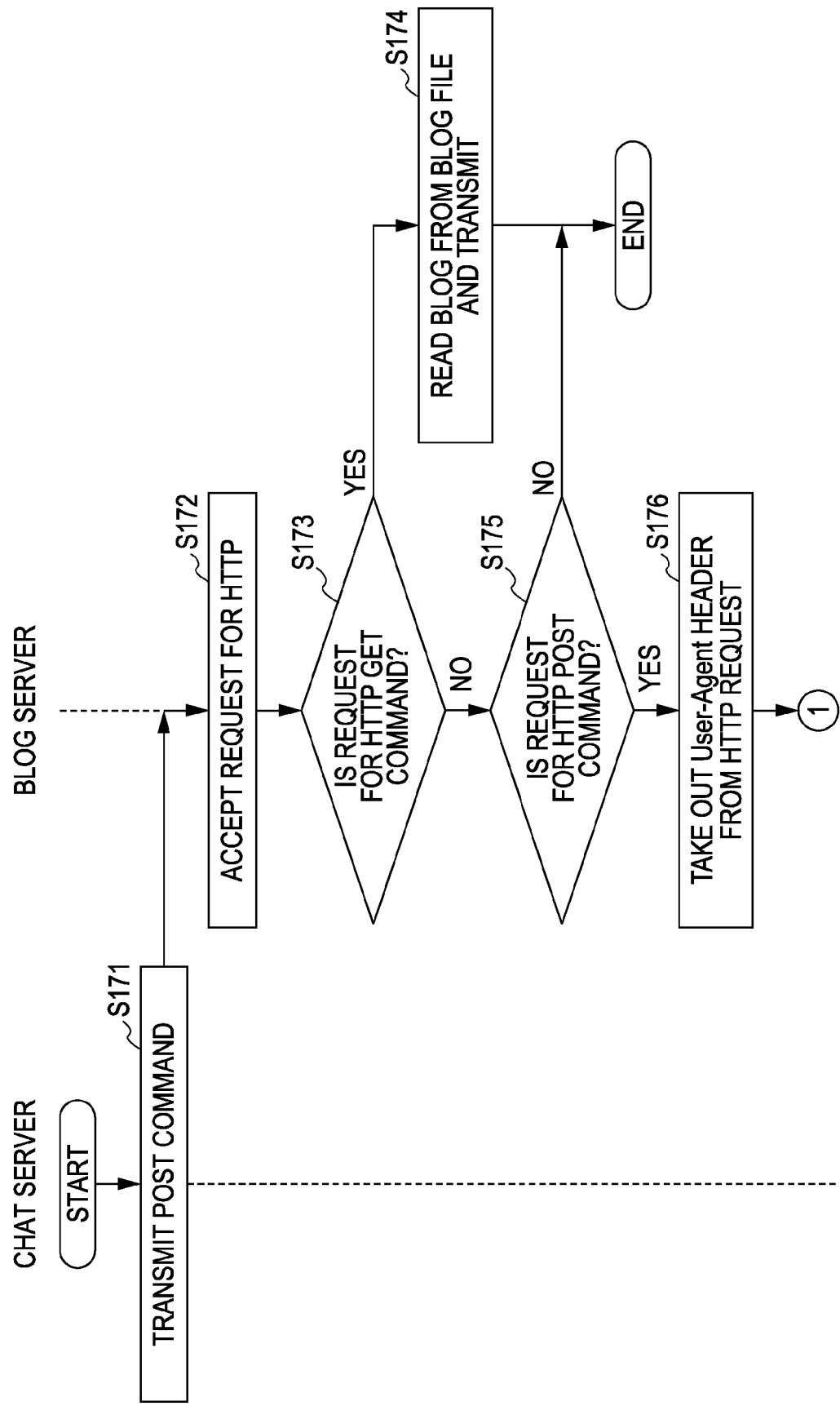
FIG. 17 illustrates a flow chart of an acquiring procedure related to another form of trackback URL.
Figure 18:
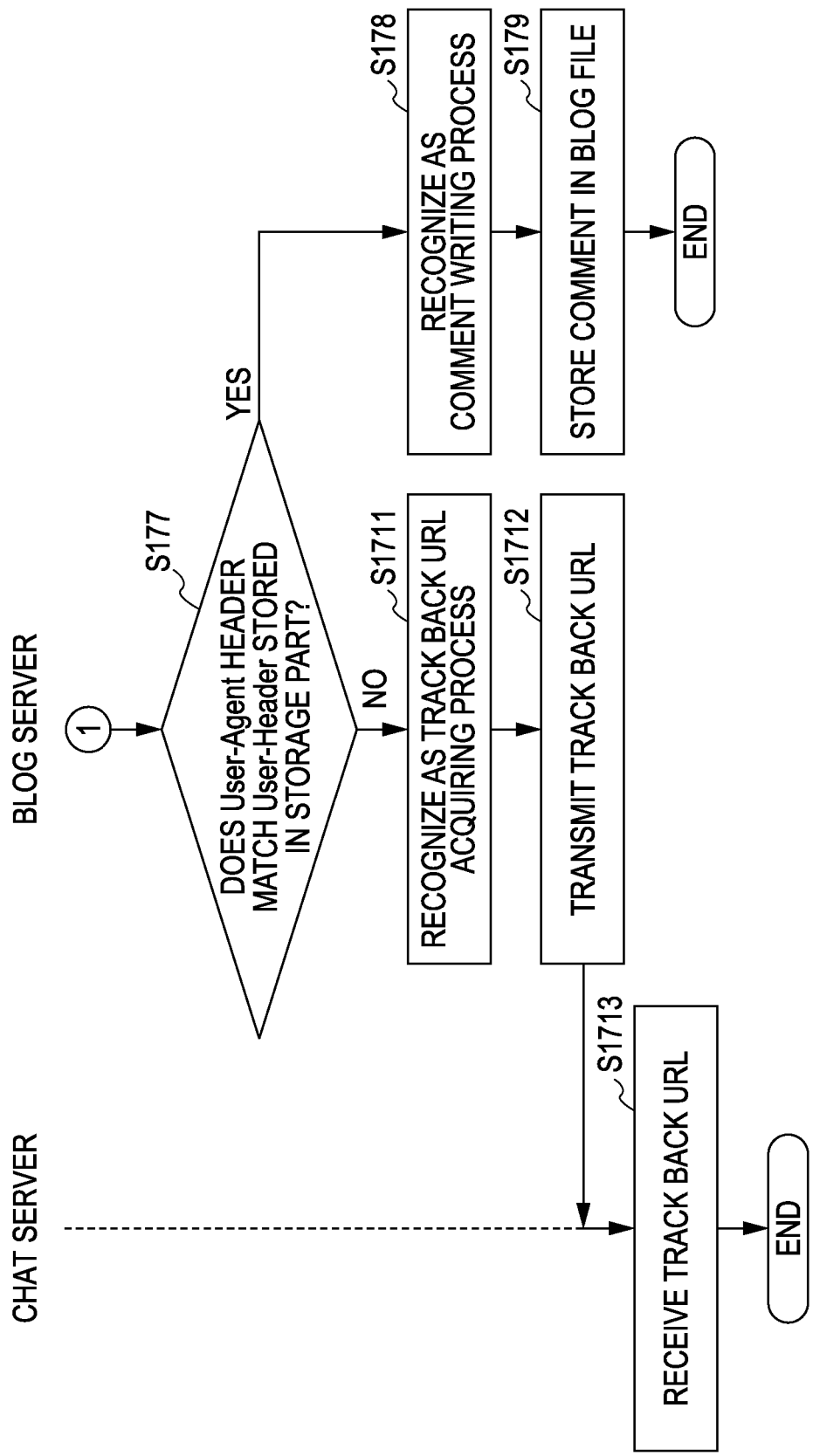
FIG. 18 illustrates a flow chart of an acquiring procedure related to another form of trackback URL.

The request and the response of the trackback URL may be performed in the following ways. FIGS. 17 and 18 are flow charts illustrating an acquiring procedure according to another mode of trackback URL. The CPU 11 of the chat server 1 may execute the following process after YES at step S163. The CPU 11 refers to the extracted URL, and transmits a POST command to the blog server 4 (step S171). The CPU 41 of the blog server 4 accepts an HTTP request that includes the POST command (step S172). The blog server 4 accepts the HTTP requests from the personal computer 2 and the blogger computer 3 as well as the chat server 1.

The CPU 41 of the blog server 4 determines whether or not the accepted HTTP request is a GET command (step S173). When the CPU 41 determines that the accepted HTTP request is the GET command (YES at step S173), the CPU 41 reads a corresponding blog from the blog file 451 and transmits the corresponding blog (step S174). On the other hand, when the CPU 41 determines that the accepted HTTP request is not the GET command (NO at step S173), the CPU 41 determines whether or not the HTTP request is the POST command (step S175). When the CPU 41 determines that the HTTP request is not the POST command (NO at step S175), the process ends.

On the other hand, when the CPU 41 determines that the HTTP request is the POST command (YES at step S175), the CPU 41 takes out a User-Agent header from the HTTP request (step S176). The CPU 41 determines whether the taken-out User-Agent header matches the User-Agent stored in the storage part 45 in advance (step S177). FIG. 19 is an explanatory diagram illustrating a list of User-Agents stored in the storage part 45 in advance. Information representing types of browsers such as Internet Explorer (registered trade name) is stored in the storage part 45.

When the CPU 41 determines that the User-Agent header matches the User-Agent stored in the storage part 45 (YES at step S177), the CPU 41 recognizes an access by the browser, for example, a comment writing process (step S178). The CPU 41 stores the received comment in the blog file 451 (step S179). On the other hand, when the CPU 41 determines that the User-Agent header does not match the User-Agent stored in the storage part 45 (NO at step S177), the CPU 41 recognizes the access by the browser as the process for acquiring a trackback URL by the chat server 1 (step S1711). The CPU 41 reads the trackback URL stored in the blog file 451 and transmits the trackback URL to the chat server 1 via the communication part 46 (step S1712). The CPU 11 of the chat server 1 receives the transmitted trackback URL (step S1713).

Figure 20:
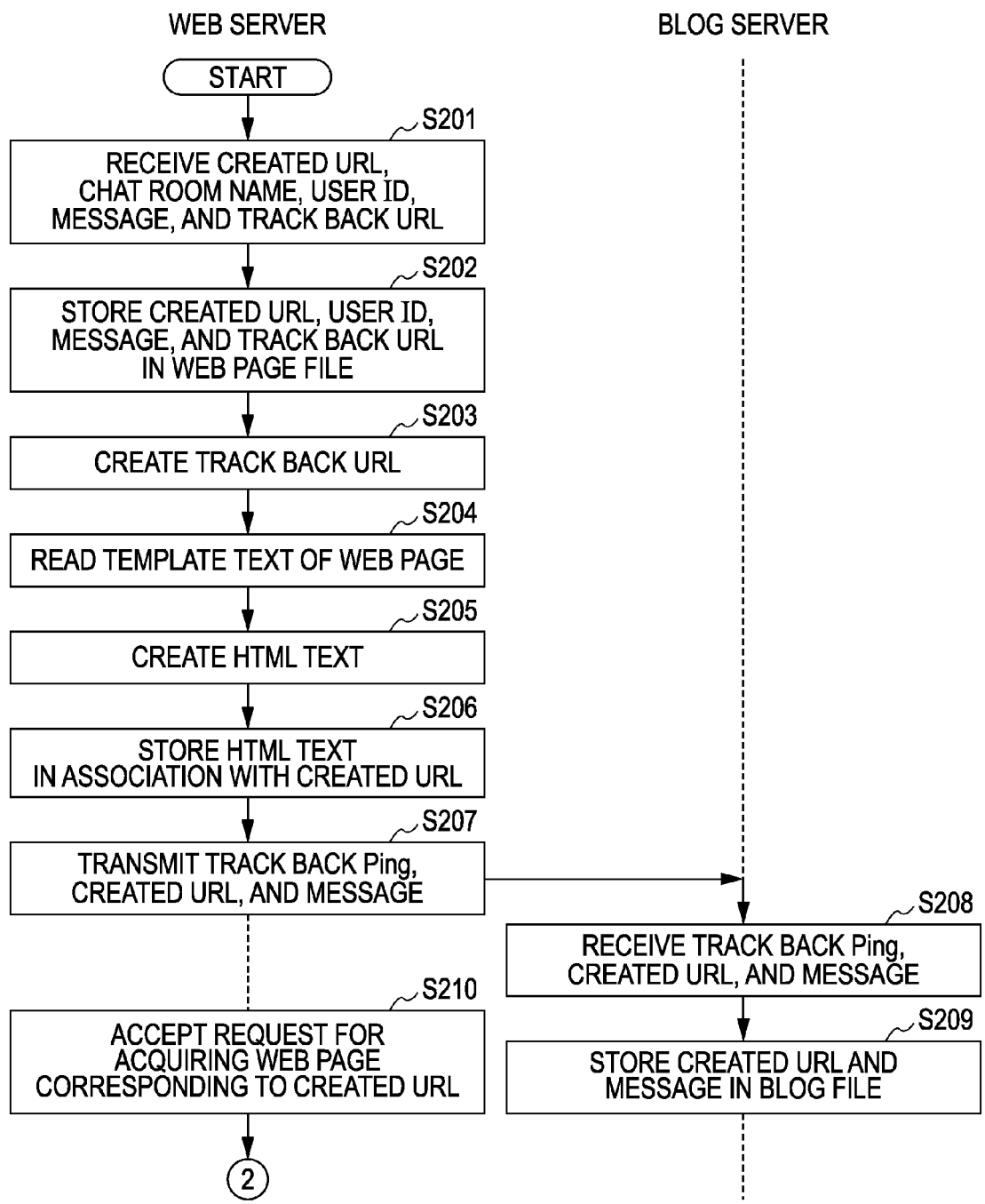
FIG. 20 illustrates a flow chart of a process for creating a Web page and a process for transmitting trackback Ping by the Web server.
Figure 21:
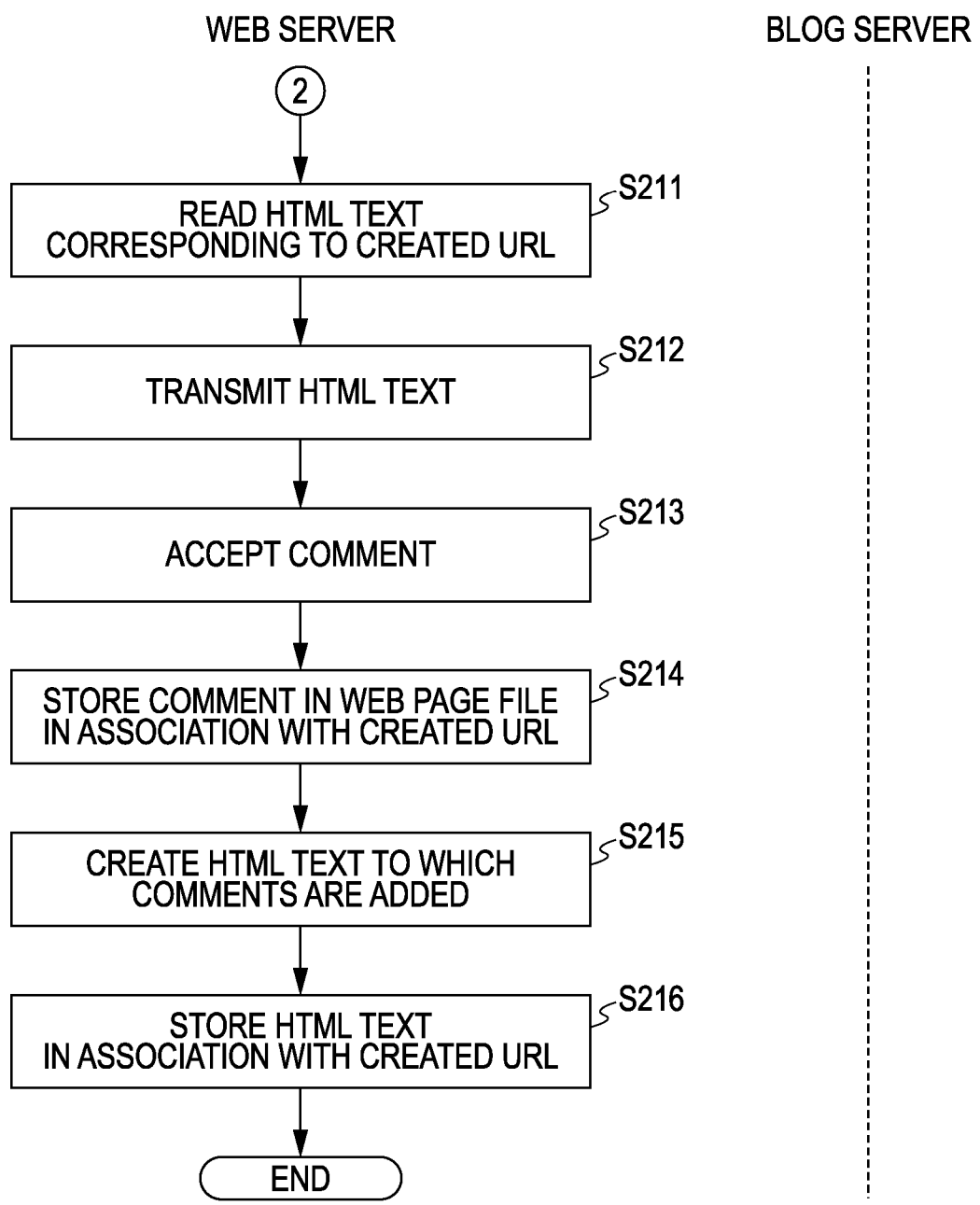
FIG. 21 illustrates a flow chart of a process for creating a Web page and a process for transmitting trackback Ping by the Web server.

FIGS. 20 and 21 are flow charts illustrating procedures of a process for creating a Web page in the Web server 5 and a process for transmitting trackback Ping. The CPU 51 of the Web server 5 receives the generated URL, the chat room name, the user ID, the messages, and the trackback URL transmitted at step S169 (step S201). The CPU 51 stores the created URL, the user ID, the messages, and the trackback URL in the Web page file 551 (step S202). The CPU 51 of the Web server 5 executes the control program 55P according to the storage of the information at step S202 as a trigger so as to execute the following process.

The CPU 51 creates a trackback URL for the Web page created by the Web server 5 as shown in FIG. 12 (step S203). The CPU 51 reads a template text stored in the storage part 55 in advance (step S204). The CPU 51 adds the created URL, the user ID, the messages, and the trackback URL stored in the Web page file 551, and the trackback URL created at step S203 to the read template text so as to create an HTML text related to the Web page (step S205).

The CPU 51 correlates the created HTML text with the created URL so as to store them in the storages part 55 (step S206). The CPU 51 refers to the trackback URL according to the reception or storage of the trackback URL in the storage part 55 as a trigger, and transmits the trackback Ping, the created URL, and the messages to the blog server 4 (step S207). The CPU 11 of the chat server 1 may transmit the trackback Ping, the created URL, and the messages directly to the blog server 4 according to the storage of the trackback URL in the storage part 15 of the chat server 1 as a trigger.

The CPU 41 of the blog server 4 receives the trackback Ping, the created URL, and the messages (step S208). The CPU 41 stores the created URL and the messages in the blog file 451 (step S209). A hyper link for accessing to the Web page related to the created URL (trackback) is created in the blog of the blogger C by the trackback Ping as shown in FIG. 13. Thereafter, when the personal computer 2 and/or the blogger computer 3 requests the Web server 5 to acquire the Web page corresponding to the created URL, the CPU 41 accepts the request (step S210). An example in which the acquisition is requested from the personal computer 2 will be described below.

The CPU 51 reads the HTML text corresponding to the created URL from the storage part 55 (step S211), and transmits the read HTML text to the personal computer 2 (step S212). The CPU 21 of the personal computer 2 transmits a comment input into the comment input box 512 to the Web server 5 according to an operation of the transmission button 513. The CPU 51 of the Web server 5 accepts the transmitted comment (step S213). The CPU 51 stores the transmitted comment in association with the created URL into the Web page file 551 (step S214).

The CPU 51 creates the HTML text to which the comment stored in the Web page file 551 is added together with the message similarly to step S205 (step S215). The CPU 51 stores the HTML text in the storage part 55 in association with the created URL (step S216). As a result, a new blog or Web page where chat and blog are combined is formed. Comments are written into the Web page so that new conversation among many parties is enabled. As a result, a new communication site can be provided.

Second Embodiment

A second embodiment relates to a form of posting a login state of a chat user at the time when a blogger accesses the Web server 5. FIG. 22 is an explanatory diagram illustrating a record layout of the Web page file 551 according to the second embodiment. When the CPU 51 of the Web server 5 accepts the transmission request of the Web page related to the created URL, the CPU 51 transmits a request signal indicating presence of the transmission request to the chat server 1. When the CPU 11 of the chat server 1 receives the request signal, the CPU 51 detects that the transmission of a message corresponding to the created URL is requested from the blogger computer 3. The CPU 11 of the chat server 1 refers to the history file 152, extracts the user ID corresponding to the created URL, and detects a current login state of a user related to an extracted user ID.

As the login state, for example, the number of user IDs of users who are currently logged in may be obtained in the following manner. The number of user IDs of users who are currently logged in is divided by the total number of the extracted user IDs, and the obtained value is multiplied by 100 (hereinafter, login rate). In another manner, the number of users who are currently logged in may be set as the number of IDs. An example where the login rate is used as the login state will be described below.

The CPU 11 transmits the detected login rate to the Web server 5. The Web server 5 stores the login rate in the Web page file 551. As shown in FIG. 22, the current login rate is correlated with the created URL and stored. In this example, since the total number of user IDs is two, "A" and "B", and both the users with ID "A" and "B" are logged in, "100%" is stored. The CPU 51 of the Web server 5 writes the login rate, for example "100%", together with a message into the Web page.

Figure 23:
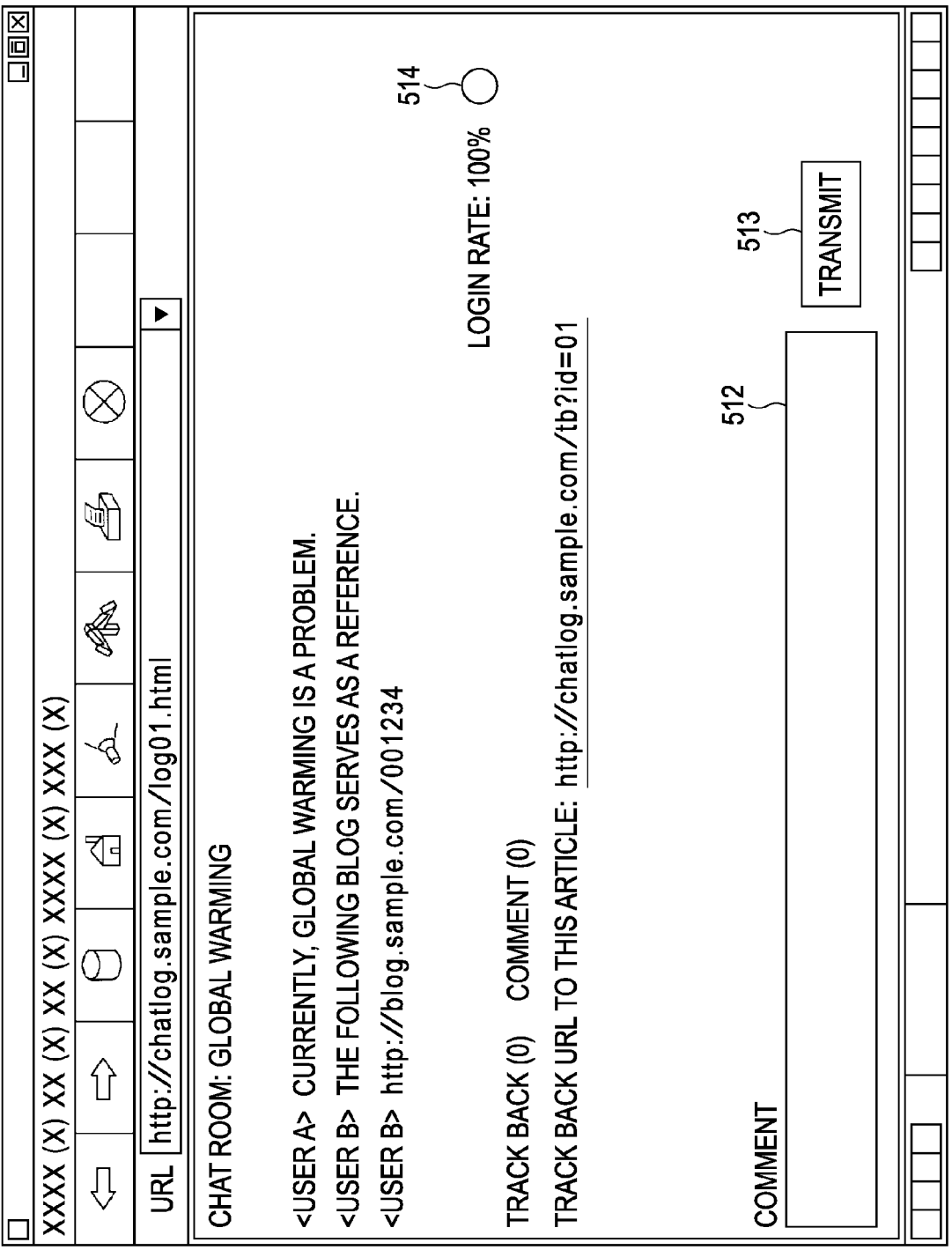
FIG. 23 illustrates an image of a created Web page.

FIG. 23 is an explanatory diagram illustrating an image of the created Web page. The CPU 51 writes the login rate stored in the Web page file 551 into the HTML text. The CPU 51 reads an icon 514 according to the login rate from the storage part 55 and writes it into the HTML text so that the login rate can be visually recognized. For example, an icon "×" may be stored as a login rate of 0% to less than 30% and is stored in the storage part 55, and an icon "Δ" may be stored as the login rate from 30% to less than 70%. Furthermore, an icon "O" may be set as the login rate from 70% and over and is stored in the storage part 55. In an example of FIG. 23, the login rate "100%" is displayed, and the icon "O" is displayed as the corresponding icon 514.

Figure 24:
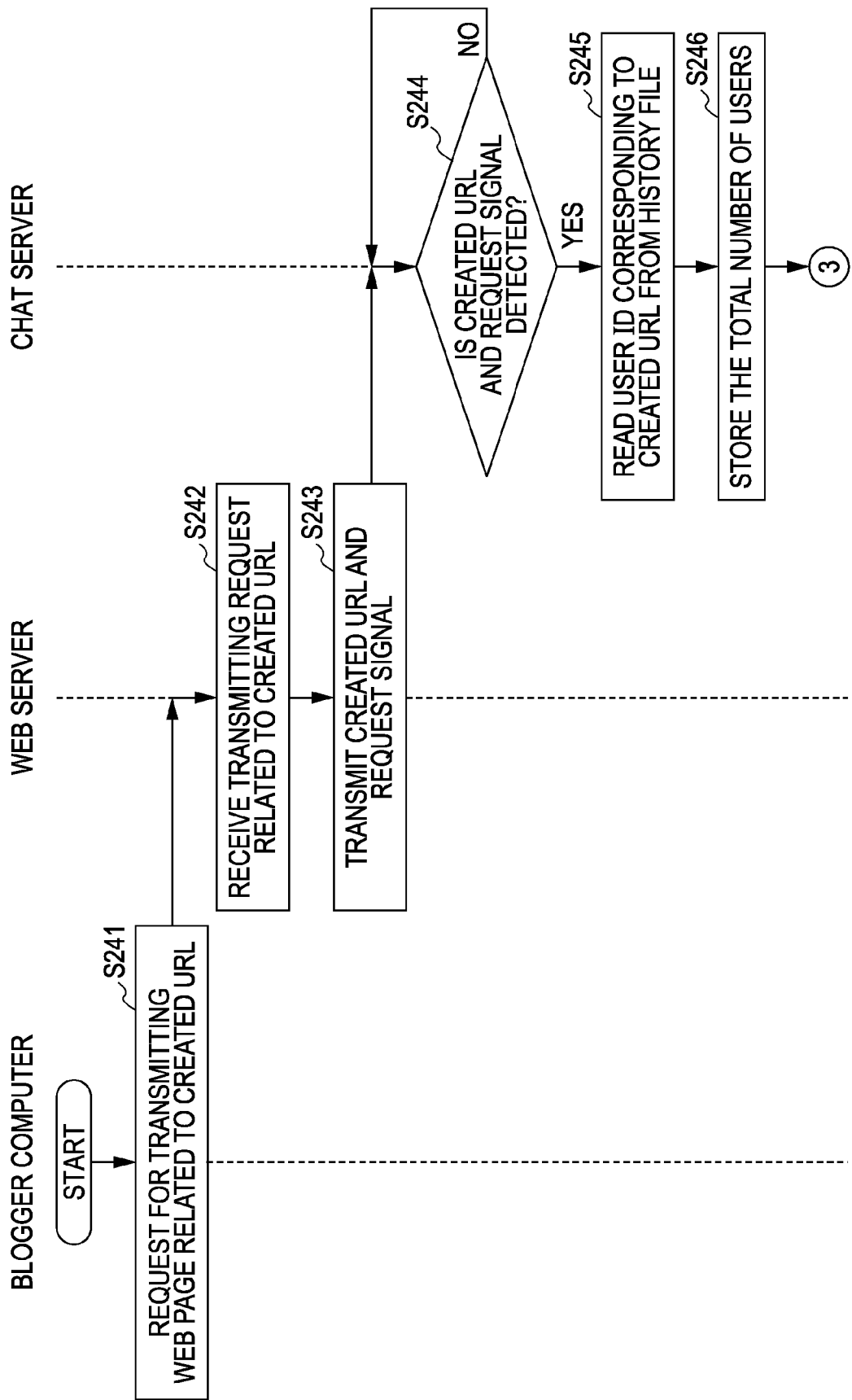
FIG. 24 illustrates a flow chart of a process for storing a login rate.
Figure 25:
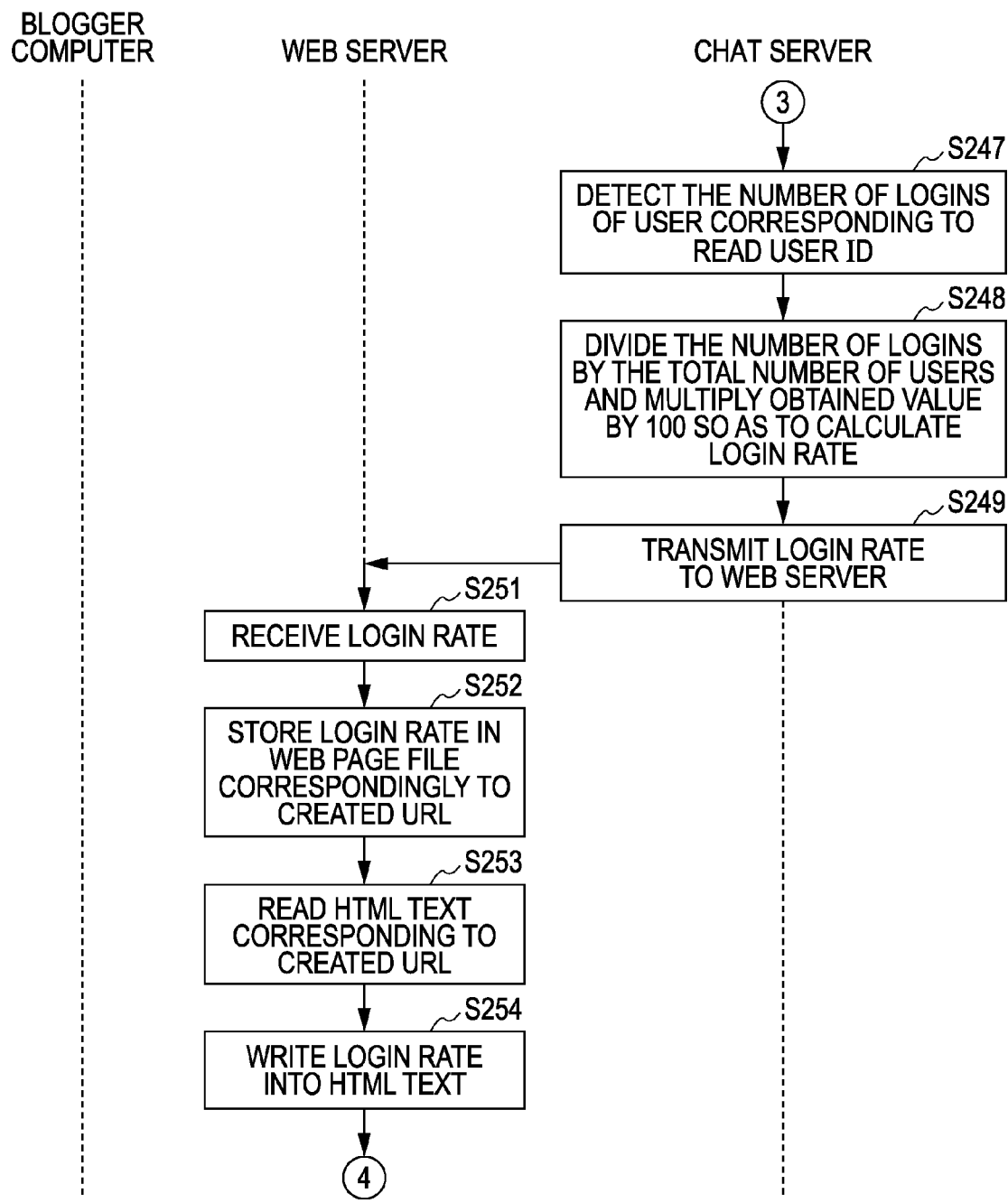
FIG. 25 illustrates a flow chart of a process for storing a login rate.
Figure 26:
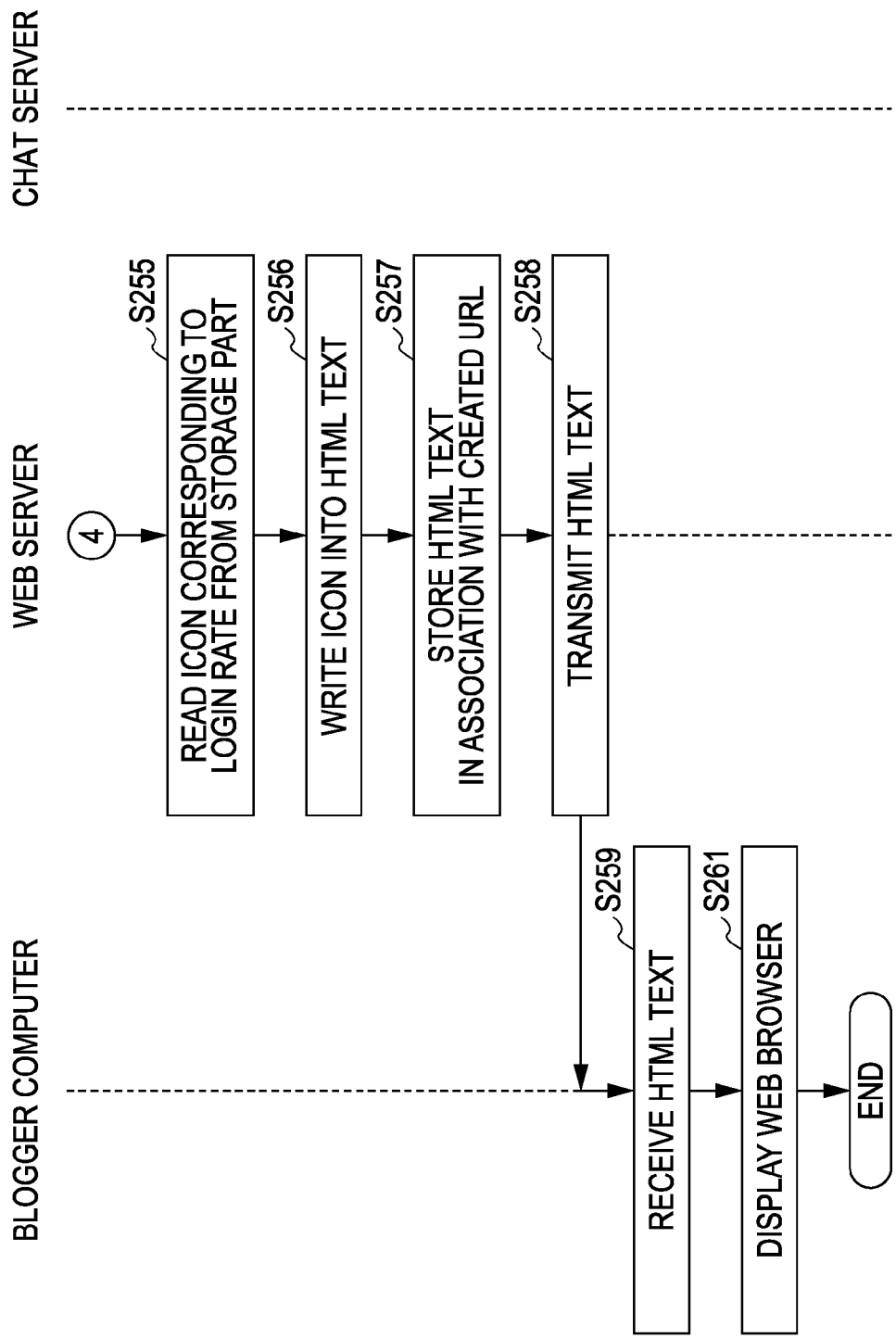
FIG. 26 illustrates a flow chart of a process for storing a login rate.

FIGS. 24, 25, and 26 are flow charts illustrating a process for storing the login rate. The second embodiment also describes a form in which the chat server 1 and the Web server 5 are separated. However, the Web page file 551 is stored as the storage part in the chat server 1, and the CPU 11 of the chat server 1 may execute all the following processes to be executed by the CPU 51 of the Web server 5. The CPU 31 of the blogger computer 3 requests the Web server 5 to transmit the Web page related to the created URL according to clicking of the created URL using the input part 33 (step S241). The CPU 51 of the Web server 5 receives the transmitted request for transmitting the created URL (step S242).

The CPU 51 transmits the created URL and the request signal to the chat server 1 so as to post the transmission request to the chat server 1 (step S243). The CPU 11 of the chat server 1 determines whether or not the created URL and the request signal are detected (step S244). Specifically, the CPU 11 determines whether the created URL and the request signal are received via the communication part 16. When the CPU 11 determines that the created URL and the request signal are not detected (NO at step S244), the above process is repeated. On the other hand, when the CPU 11 determines that created URL and the request signal are detected (YES at step S244), the CPU 11 reads the user ID corresponding to the created URL from the history file 152 (step S245).

The CPU 11 stores the total number of users based on the read user IDs into the storage part 15 (step S246). The CPU 11 detects the current number of logins of the users corresponding to the read user IDs (step S247). Specifically, the CPU 11 reads the user IDs of the users who log into the chat room corresponding to the created URL. The CPU 11 counts the number of the read user IDs and the user IDs read at step S245 which are matched with each other. The CPU 11 divides the counted number of logins by the total number of users stored at step S246, and multiplies the obtained value by 100 to calculate the login rate (step S248).

The CPU 11 transmits the calculated login rate to the Web server 5 (step S249). The CPU 51 of the Web server 5 receives the transmitted login rate (step S251). The CPU 51 stores the login rate in the Web page file 551 in association with the created URL (step S252). The CPU 51 reads the HTML text corresponding to the created URL stored at step S206 or S216 (step S253). The CPU 51 writes the login rate into the HTML text (step S254).

The CPU 51 reads the icon 514 corresponding to the login rate from the storage part 55 (step S255). The CPU 51 writes the read icon 514 into the HTML text (step S256). The CPU 51 stores the HTML text, into which the login rate and the icon 514 based on the login rate are written, in the storage part 55 in association with the created URL (step S257). The CPU 51 transmits the HTML text to the blogger computer 3 (step S258). The CPU 31 receives the transmitted HTML text (step S259). The CPU 31 analyzes the HTML text, and displays the Web page related to the created URL on the Web browser 351 as shown in FIG. 23 (step S261). As a result, every time a blogger or the like accesses the Web page related to the created URL, the current login state of a chat user having a discussion can be acquired. As a result, a comment is input quickly according to the login state so that information can be exchanged substantially in real time between the chat user and the blogger.

The second embodiment has the above structure, and the other parts of the structure and function are similar to those in the first embodiment. For this reason, like parts are denoted by like reference numerals, and the detailed description thereof is omitted.

Third Embodiment

Figure 27:
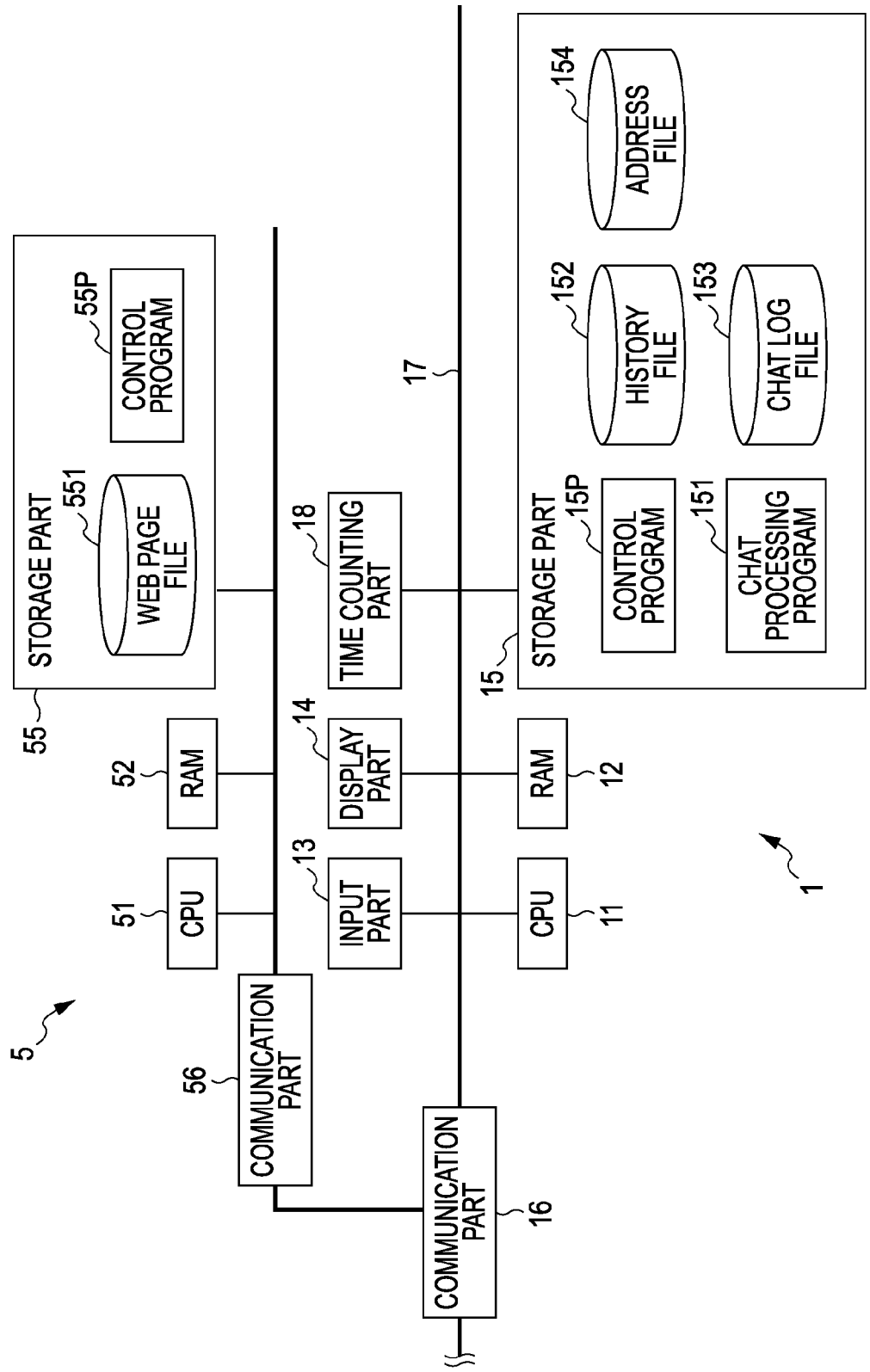
FIG. 27 illustrates a hardware structure of the chat server and the Web server according to a third embodiment.

A third embodiment relates to a posting process in the case where contents of the Web page related to the created URL are updated. A process at the time of posting to a chat user will be described. FIG. 27 is a block diagram illustrating a hardware structure of the chat server 1 and the Web server 5 according to the third embodiment. In addition to the structure of the first embodiment, an address file 154 is provided in the storage part 15. FIG. 28 is an explanatory diagram illustrating a record layout of the address file 154. The address file 154 includes a user ID field, an e-mail address field, an IP (Internet Protocol) address field, and a state field.

User IDs of chat users are stored in the user ID field. E-mail addresses of the respective users correlated with the user IDs are stored in the e-mail address field. At the time of user registration of a chat user, when the personal computer 2 transmits the user IDs and the e-mail addresses, the CPU 11 stores the transmitted e-mail addresses correlated with the user IDs into the e-mail address field. IP addresses, which are correlated with the user IDs of the users who are logged into the chat and are given to the personal computers 2 are stored in the IP address field. When the personal computer 2 logs out, the stored IP address is erased.

States about the current chat of chat users correlated with the IP addresses are stored in the state field. The state includes information about login, logout, and entrance into a chat room. When the CPU 11 accepts a login request from the personal computer 2, the CPU 11 stores the login in the state field in association with a user ID. Further, when a request for entering a chat room as well as the user ID is accepted from the personal computer 2, the CPU 11 stores information about a corresponding chat room in the state field. For example, a user of a user ID "E" is now logged into the chat, but the state may show that the user has not entered any chat room.

On the other hand, after a user with a user ID "A" and a user with a user ID "B" log in, they enter the chat room "Global warming". When the CPU 11 accepts a logout request from the personal computer 2, the CPU 11 stores information about the logout correlated with the user IDs into the state field. A state indicating that a user with a user ID "D" is logged out is stored in the state field.

Figure 29:
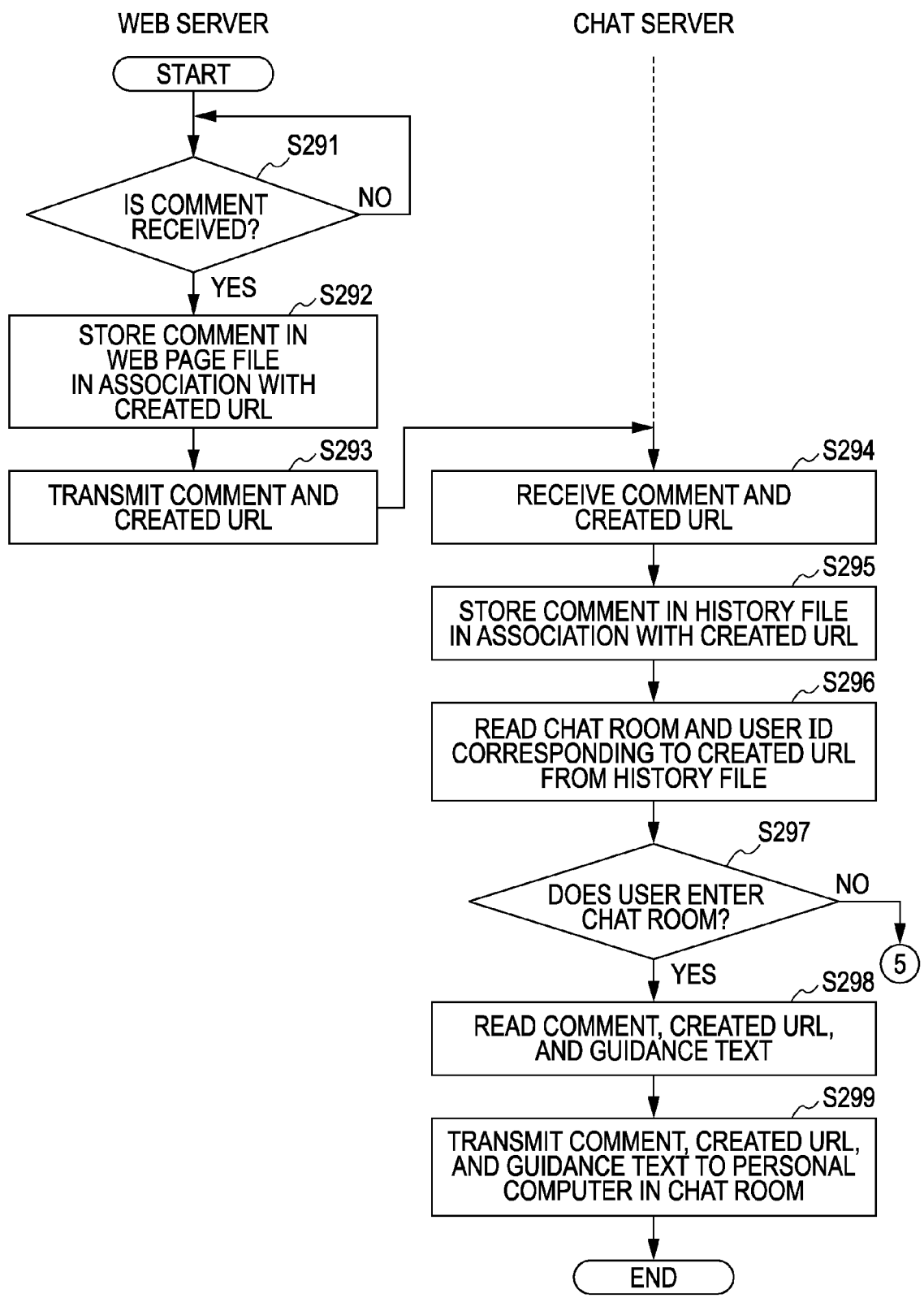
FIG. 29 illustrates a flow chart of a posting process.
Figure 30:
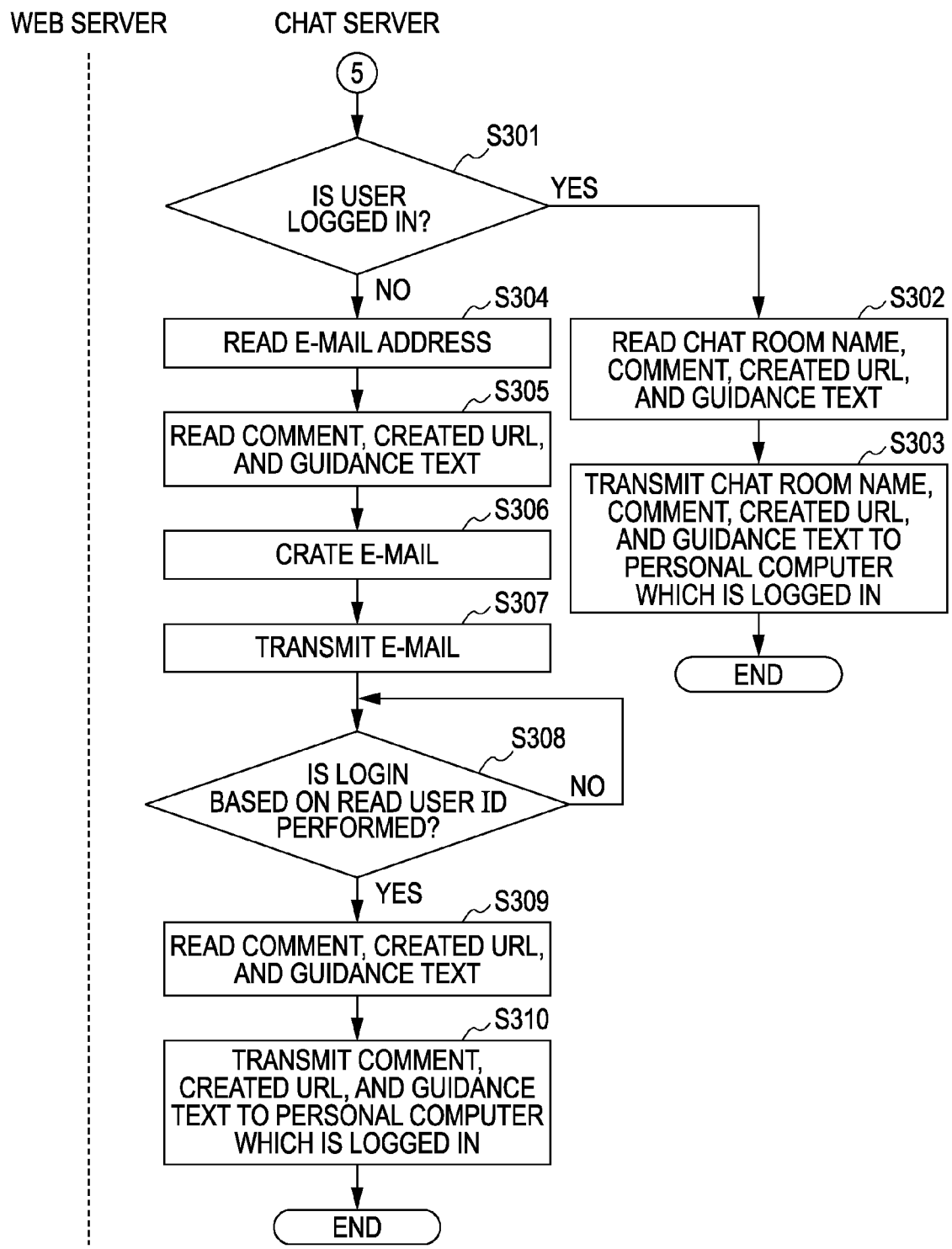
FIG. 30 illustrates a flow chart of the posting process.

FIGS. 29 and 30 are flow charts illustrating the posting process. The CPU 51 of the Web server 5 determines whether or not a comment about the Web page related to the created URL shown in FIG. 12 is received (step S291). When the CPU 51 determines that the comment is not received (NO at step S291), the CPU 11 repeats the above process. On the other hand, when the CPU 51 determines that the comment is received (YES at step S291), the CPU 11 correlates the received comment with the created URL and stores them in the Web page file 551 shown in FIG. 14 (step S292).

The CPU 51 transmits the comment and the created URL to the chat server 1 (step S293). The CPU 11 of the chat server 1 receives the comment and the created URL (step S294). The CPU 11 correlates the comment with the created URL and stores them in the history file 152 (step S295). The CPU 11 reads the chat room and the user ID corresponding to the created URL from the history file 152 (step S296). Thereafter, the process goes to a process for determining a state of the user related to the read user ID.

The CPU 11 refers to the address file 154 shown in FIG. 28 to determine whether the user related to the read user ID enters the read chat room (step S297). When the CPU 11 determines that the user enters the chat room (YES at step S297), the CPU 11 reads the comments, the created URL, and the guidance text stored in the history file 152 (step S298). The guidance text is stored in the storage part 15, and is a text sentence such as "added comment". The CPU 11 reads the IP address of the personal computer 2 which is now in the chat room from the address file 154 in order to post the addition of the comment to the chat user currently in the chat room. The CPU 11 then transmits the comment, the created URL, and the guidance text to the personal computer 2 related to the read IP address via the communication part 16 (step S299).

Figure 31:
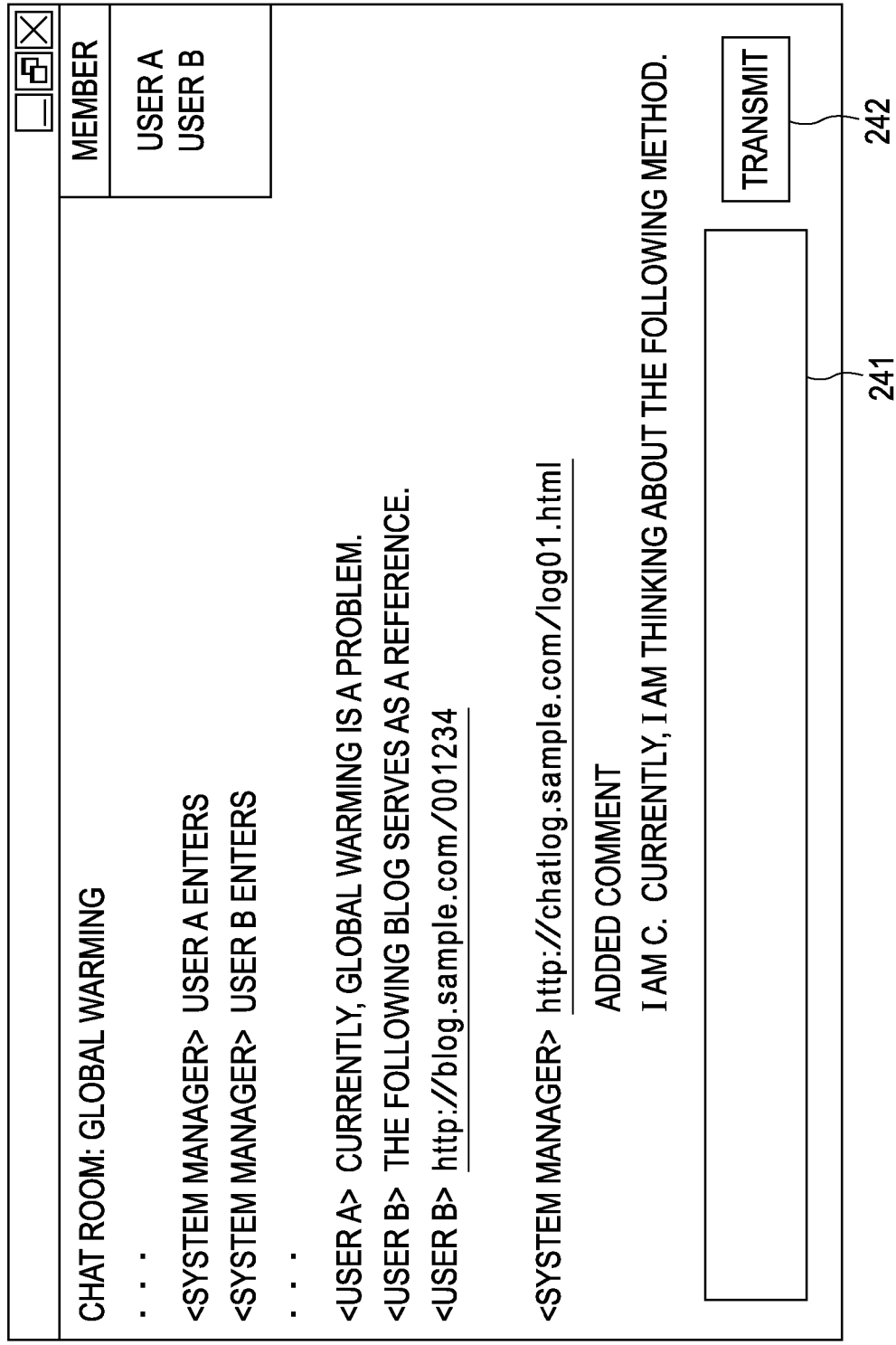
FIG. 31 illustrates an explanatory diagram illustrating an image of a chat.

FIG. 31 is an explanatory diagram illustrating an image of chat. In an example of FIG. 31, while the users A and B are logged in, a comment is written into the Web page of the created URL by the blogger C, and this comment is posted. The created URL, the guidance text, and the comment of the blogger C are displayed as a message of the system manager on the display part 24 of the personal computer 2. The hyper link for accessing the Web page is set in the created URL. As a result, new communication between the blogger and the chat user can be established instantly.

When the CPU 11 determines in step S297 that the user is not in the chat room (NO at step S297), the CPU 11 refers to the address file 154 to determine whether the user related to the user ID read at step S296 is logged into the chat room (step S301). When the CPU 11 determines that the user is logged in (YES at step S301), the CPU 11 reads the chat room name, the comment, the created URL, and the guidance text stored in the history file 152 (step S302). The CPU 11 reads the IP address of the personal computer 2 in the chat room from the address file 154, and transmits the chat room name, the comments, the created URL, and the guidance text to the personal computer 2 related to the read IP address via the communication part 16 in order to invite a chat user currently logged in to come into the chat room (step S303). The guidance text read at step S302 may be a text sentence such as "Would you come into the chat room?"

The CPU 11 transmits a text where the chat room name and the guidance text are combined as a participation request to the personal computer 2. For example, the text such as "Would you like to participate in the chat room "Global warming"?" is transmitted. As a result, conversation in the chat can be encouraged. Since the created URL is transmitted, the user can browse also the Web page related to the created URL. When the CPU 11 determines that the user is not logged in at step S301 (NO at step S301), the CPU 11 then reads an e-mail address from the address file 154 (step S304) because the user is logged out.

The CPU 11 reads the comments, the created URL, and the guidance text stored in the history file 152 (step S305). The CPU 11 reads the text sentence to be a template stored in the storage part 15 in advance, and describes the read comments, the created URL, and the guidance text and creates an e-mail (step S306). The CPU 11 transmits the e-mail created to the e-mail address read at step S304 (step S307). Thereafter, the CPU 11 executes the following process in order to post information about the comments to a new user who is logged in. The CPU 11 determines whether or not a login based on the user ID read at step S296 is performed (step S308).

For example, the CPU 11 determines whether the user ID read at step S296 matches the new user ID which is logged in.

When the login based on the read user ID is not performed (NO at step S308), the CPU 11 repeats the process at step S308. On the other hand, when the login is performed (YES at step S308), the CPU 11 reads the comments, the created URL, and the guidance text stored in the history file 152 (step S309). This guidance text is a text sentence such as "New comment is made". The CPU 11 stores the IP address of the user who is logged in into the address file 154. The CPU 11 refers to the IP address stored in the address file 154 so as to transmit the read comments, created URL, and guidance text to the personal computer 2 related to the IP address (step S310).

Figure 32:
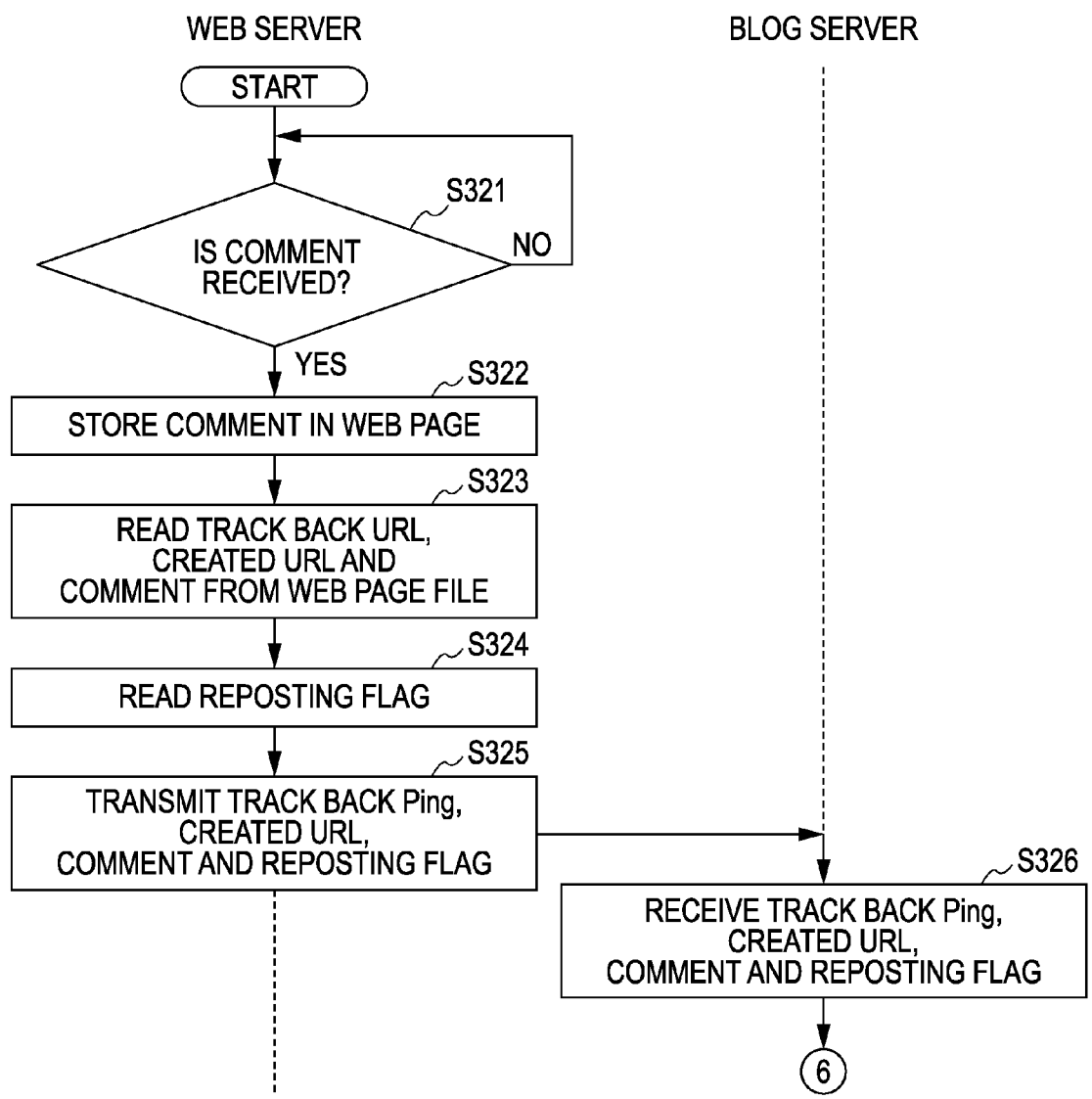
FIG. 32 illustrates a flow chart of a process for posting to a blogger.
Figure 33:
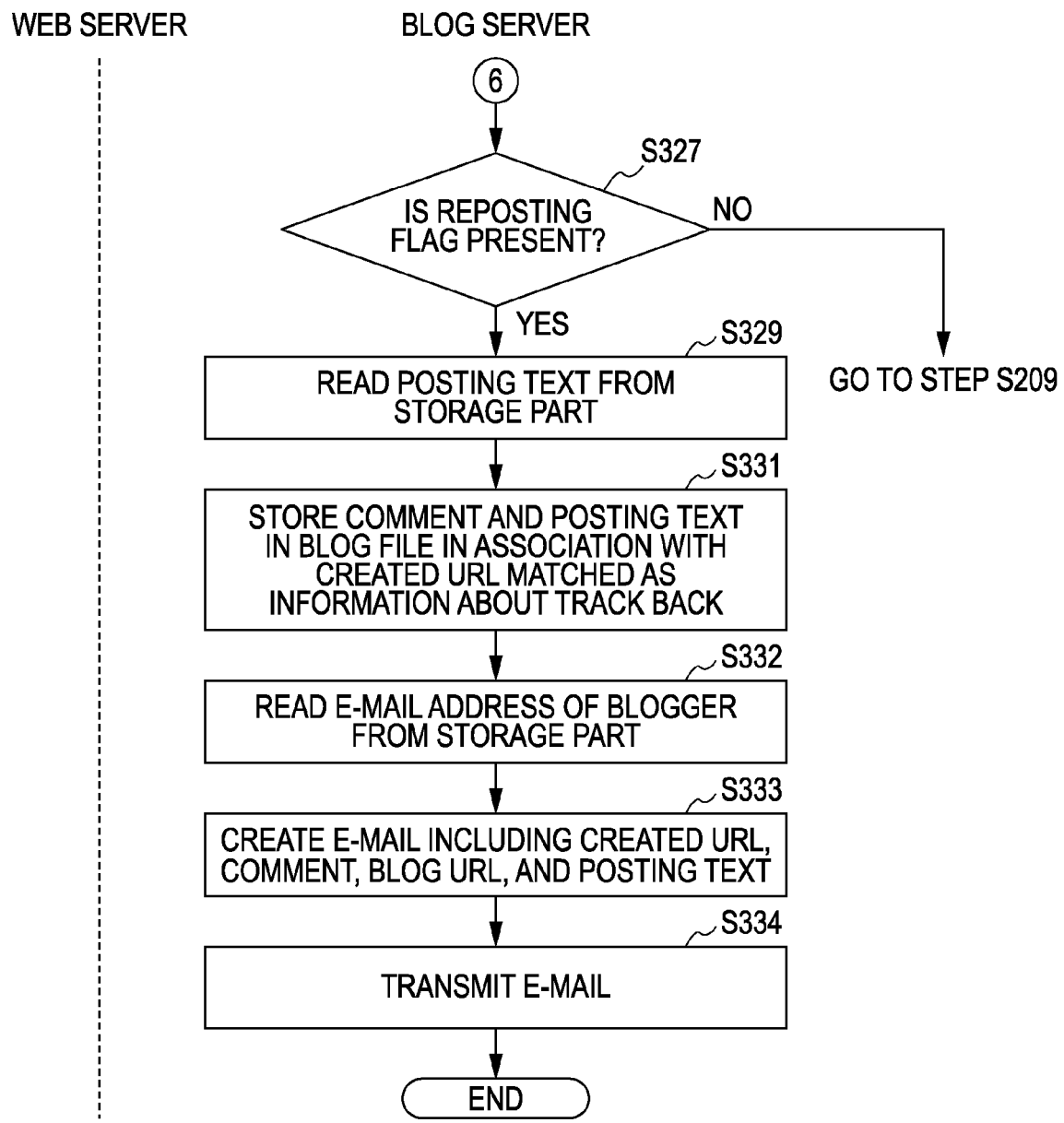
FIG. 33 illustrates a flow chart of the process for posting to a blogger.

A process for posting to the blogger at the time when a comment is added will be described below. When the Web server 5 receives comments from the personal computer 2, the following process is executed in order to post the addition of the comments to the blogger C. FIGS. 32 and 33 are flow charts illustrating a process for posting to the blogger. The CPU 51 of the Web server 5 determines whether or not a comment for the Web page corresponding to the created URL is received from the personal computer 2 (step S321). When the CPU 51 determines that a comment is not received (NO at step S321), the CPU 51 repeats the above process. On the other hand, when the CPU 51 determines that a comment is received (YES at step S321), the CPU 51 correlates the comment with the created URL so as to store the comment in the Web page file 551 (step S322).

The CPU 51 reads the created URL, the comment, and trackback URL from the Web page file 551 (step S323). Since the state that the comment has been received means that first transmission of a trackback Ping is already ended as described at step S207 in FIG. 20, the CPU 51 reads a reposting flag indicating a second or later transmission from the storage part 55 (step S324). The CPU 51 transmits the trackback Ping, the created URL, the comment, and the reposting flag to the blog server 4 (step S325). The CPU 41 of the blog server 4 receives the trackback Ping, the created URL, the comment, and the reposting flag (step S326).

The CPU 41 determines whether or not the reposting flag is present in the received information (step S327). When the reposting flag is not present in the received information (NO at step S327), the CPU 41 determines that the transmission is the first transmission of the trackback Ping, and goes to step S209. Specifically, the CPU 41 stores the created URL and the message (comment) in association with the trackback URL in the blog file 451. When the CPU 41 accepts the request for transmitting the blog from the personal computer 2 and/or the blogger computer 3, the CPU 41 refers to the blog file 451, and transmits articles and information about the trackback including a hyper link to the created URL and the comment to the personal computer 2 and/or the blogger computer 3. As a result, as shown in FIG. 13, the trackback is displayed in the blog.

When the CPU 41 determines that the reposting flag is present in the received information (YES at step S327), the CPU 41 reads a posting text stored in the storage part 45 in advance (step S329). The posting text is a text indicating the addition of comments, and/or a text sentence such as "added comment". The CPU 41 correlates the comments and the posting text with the created URL matching the created URL received at step S326 and stores the comment and the posting text into the blog file 451 as information about the trackback (step S331). In the example of FIG. 13, since "http://chatlog.sample.com/log01.html" is present as the matched created URL, the comments and the posting text are correlated with the created URL in the trackback field of the blog file 451 and stored.

Figure 34:
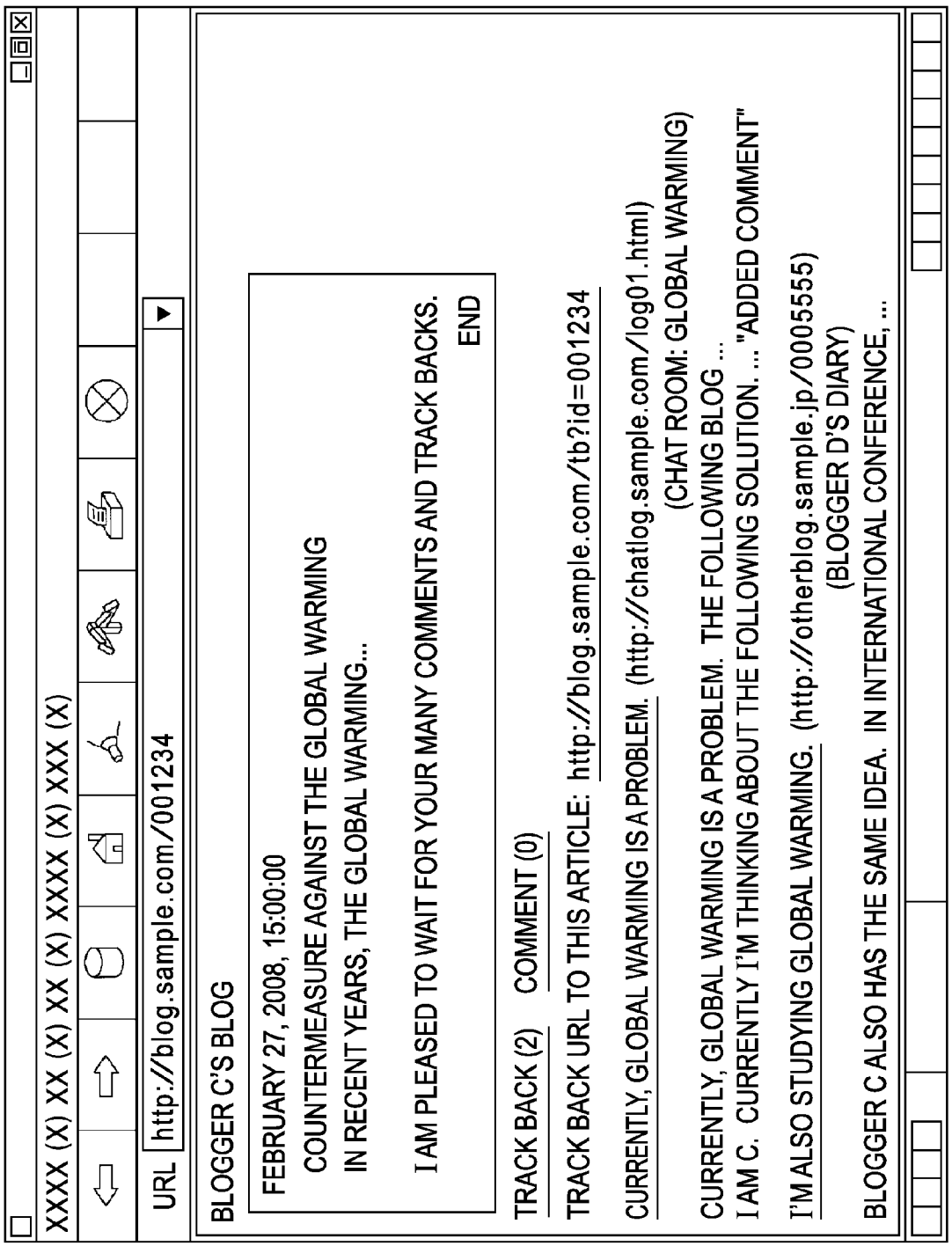
FIG. 34 illustrates an image of a blog in the case where comments are added.

When the CPU 41 accepts the request for transmitting the blog from the personal computer 2 and/or the blogger computer 3, the CPU 41 refers to the blog file 451, and transmits the articles and the information about the trackback including the hyper link to the created URL and the comment to the personal computer 2 and/or the blogger computer 3. FIG. 34 is an explanatory diagram illustrating an image of the blog at the time when a comment is added. One trackback in FIG. 34 is "Currently, Global warming is a problem" in which the hyper link to the created URL "http://chatlog.sample.com/log01.html" is set. An added new comment "I am C. Currently, I am thinking about the following solution . . . " is displayed on the trackback. Furthermore, a posting text "comment added" is displayed in order to report the addition. As a result, the conversation between the chat user and the blogger can be activated more quickly.

The CPU 41 reads an e-mail address of the blogger corresponding to the blog from the storage part 45 (step S332). The e-mail address is transmitted at the time of initial blogger registration. The CPU 41 correlates the e-mail address transmitted from the blogger computer 3 with the blogger ID and the blog URL and stores them in the storage part 45 in advance. The CPU 41 reads the blog URL corresponding to the trackback Ping at step S326 from the blog file 451. The CPU 41 creates an e-mail including the posting text read at step S329, the created URL, and the comments received at step S326, and the blog URL read from the blog file 451 (step S333). The CPU 41 transmits the created e-mail to the e-mail address read at step S332 (step S334).

The third embodiment has the above structure, and the other parts of the structure and the function are similar to those in the first and second embodiments. For this reason, like parts are denoted by like reference numerals, and the detailed description thereof is omitted.

Fourth Embodiment

Figure 35:
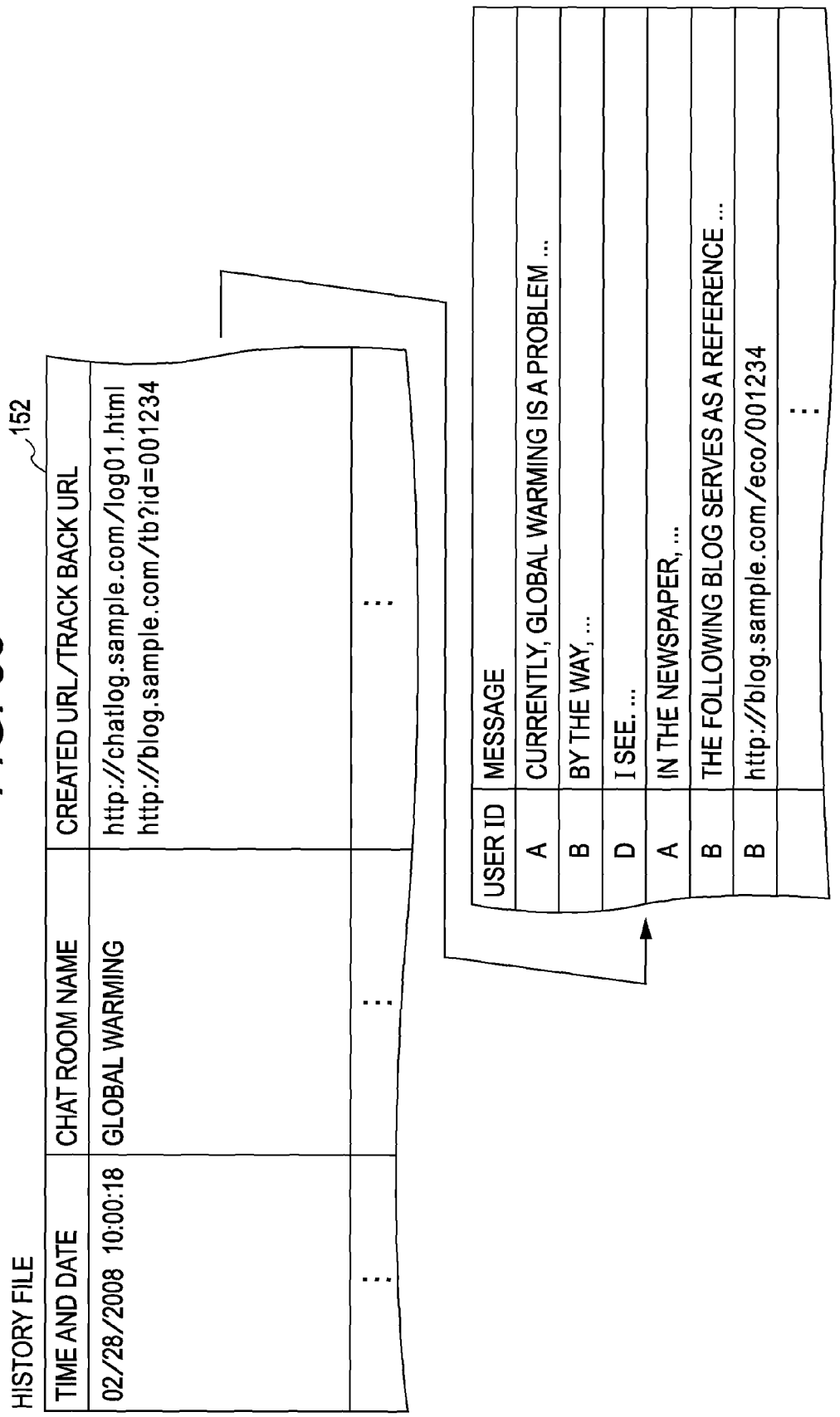
FIG. 35 illustrates a record layout of a history file according to a fourth embodiment.

A fourth embodiment relates to a form for specifying a key person. FIG. 35 is an explanatory diagram illustrating a record layout of the history file 152 according to a fourth embodiment. The history file 152 includes the time and date field, the chat room name field, the created URL/trackback URL field, the user ID field, and the message field. The time and data at which the CPU 11 detects that the blog URL "http://blog.sample.com/001234" is present in a message is stored in the time and date field. The chat room name to which the blog URL detected by the CPU 11 is transmitted is stored in the chat room name field. In this example, "Global warming" is stored.

As described in the first embodiment, the created URL "http://chatlog.sample.com/log01.html" and the trackback URL "http://blog.sample.com/tb?id=001234" corresponding to the acquired blog URL are stored in the created URL/trackback URL field. The user ID of the user who transmits a message is stored in the user ID field. The message transmitted together with the user ID is correlated with the user ID and is stored in the message field. In this example, the three users with user IDs "A", "B", and "D" chat with one another.

In the fourth embodiment, the CPU 11 refers to the history file 152, and selects representative transmitter identification information (hereinafter, key person ID) from a plurality of user IDs. As the process for selecting the key person ID, for example, a user ID related to a user who transmits many messages is selected (for example, the user B who transmits messages three times). In another way, a user with a user ID who transmits a message including the blog URL is selected (for example, the user B). Alternatively, a user with a user ID who transmits a message including a keyword related to the chat room name is selected (for example, the user who often transmits the word "Global warming" as the chat room name (for example, the user A). The number of user IDs to be selected is at least one, and a plurality of user IDs may be selected. The following describes an example of the selecting process to select one user ID corresponding to a user who transmits messages the largest number of times.

Figure 36:
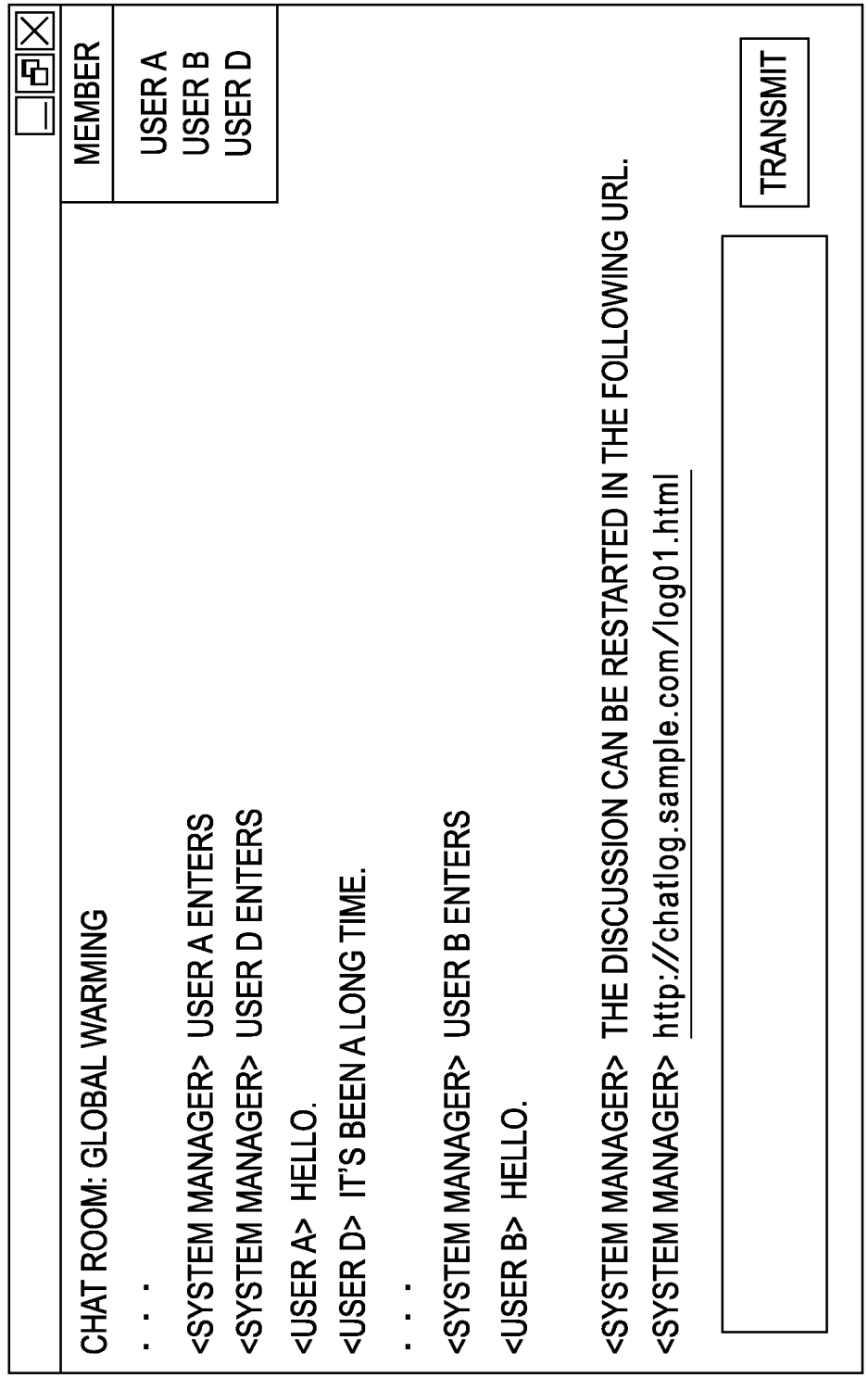
FIG. 36 illustrates an image of a chat where a guidance text indicating restart of discussion is displayed.

When the CPU 11 refers to the address file 154 and the user with the selected user ID enters the corresponding chat room, the CPU 11 reads the created URL stored in the history file 152 and the guidance text stored in the storage part 15 and transmits the created URL and the guidance text to the personal computer 2. This guidance text is a text sentence such as "the discussion can be restarted at the following created URL" which restarts the former discussion to be led by the key person. FIG. 36 is an explanatory diagram illustrating an image of chat displaying the guidance text showing the restart of the discussion. In an example of FIG. 36, the users with user IDs A and D chat about the chat room "Global warming" at a later date. Thereafter, the user with user ID B enters the chat room. In this case, since the user with user ID B is the key person, the CPU 11 reads the IP addresses related to all the user IDs in the chat room from the address file 154. The CPU 11 transmits the guidance text and the corresponding created URL to the personal computer 2 with the read IP address.

Figure 37:
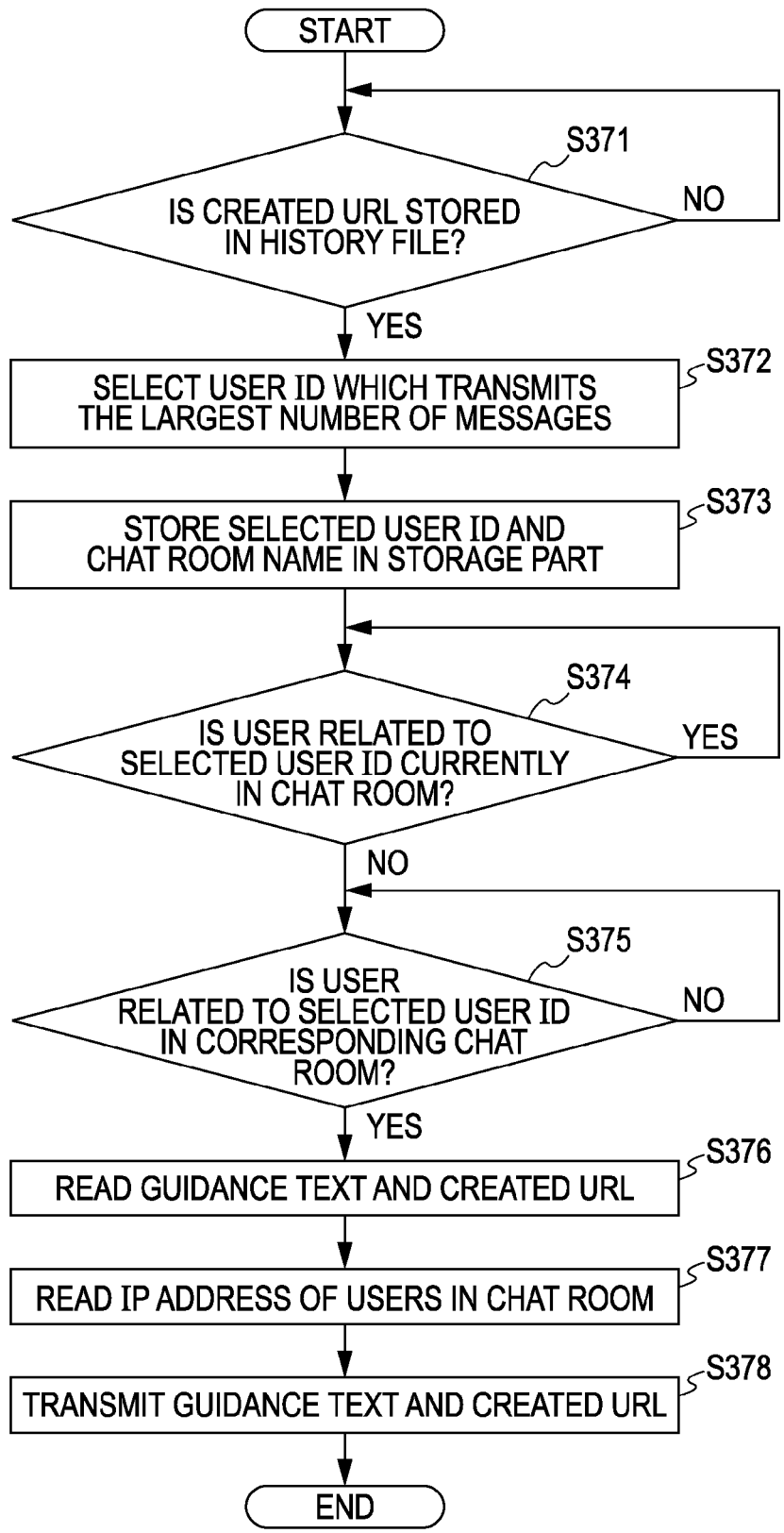
FIG. 37 illustrates a flow chart of a process for specifying a key person and a process for restarting a discussion.

FIG. 37 is a flow chart illustrating a procedure of a key person specifying process and a discussion restarting process. The CPU 11 of the chat server 1 determines whether the created URL is stored in the history file 152 based on the process at step S168 (step S371). When the CPU 11 determines that the created URL is not stored in the history file 152 (NO at step S371), the CPU 11 repeats the above process. On the other hand, when the CPU 11 determines that the created URL is stored in the history file 152 (YES at step S371), the CPU 11 refers to the history file 152, and selects a user of a user ID which is stored in relation to the created URL and which transmits messages the largest number of times as the key person (step S372).

The CPU 11 stores the selected user ID and the chat room name corresponding to the created URL in the storage part 15 (step S373). The CPU 11 refers to the chat log file 153 to determine whether the user with the selected user ID is currently in the chat room in order to monitor whether the user with the selected user ID logs out (step S374). When the CPU 11 determines that the user is in the chat room (YES at step S374), the CPU 11 repeats the process at step S374. On the other hand, when the CPU 11 determines that the user is not in the chat room (NO at step S374), the CPU 11 goes to a subsequent process. The chat server 1 monitors whether the key person enters the chat room again at a later time.

The CPU 11 refers to the chat log file 153 to determine whether the user with the selected user ID stored in the storage part 15 enters the corresponding chat room stored in the storage part 15 (step S375). When the CPU 11 determines that the user of the selected ID does not enter the chat room (NO at step S375), the CPU 11 repeats the process at step S375. On the other hand, when the CPU 11 determines that the user of the selected ID enters the chat room (YES at step S375), the CPU 11 reads the guidance text stored in the storage part 15, and refers to the history file 152 so as to read the created URL based on the chat room name and the user ID (step S376).

The CPU 11 refers to the chat log file 153 and reads the IP addresses of users currently in the chat room (step S377). The CPU 11 transmits the guidance text and the created URL as a message to the personal computers 2 with the read IP addresses (step S378). As a result, as illustrated in FIG. 36, the created URL and the sentence which leads are displayed on the display part 24. The chat is restarted later, and when the user to be the key person in the chat enters the chat room, the CPU 11 transmits the created URL in order to restart the past discussion. As a result, the number of accesses the Web page created as a bridge between the chat users and the blogger is increased, and thus the discussion can be further activated.

The fourth embodiment has the above structure, and the other parts of the structure and the function in the above-mentioned fourth embodiment are similar to those in the first to third embodiments. Like parts are denoted by like reference numerals and the detailed description thereof is omitted.

Fifth Embodiment

Figure 38:
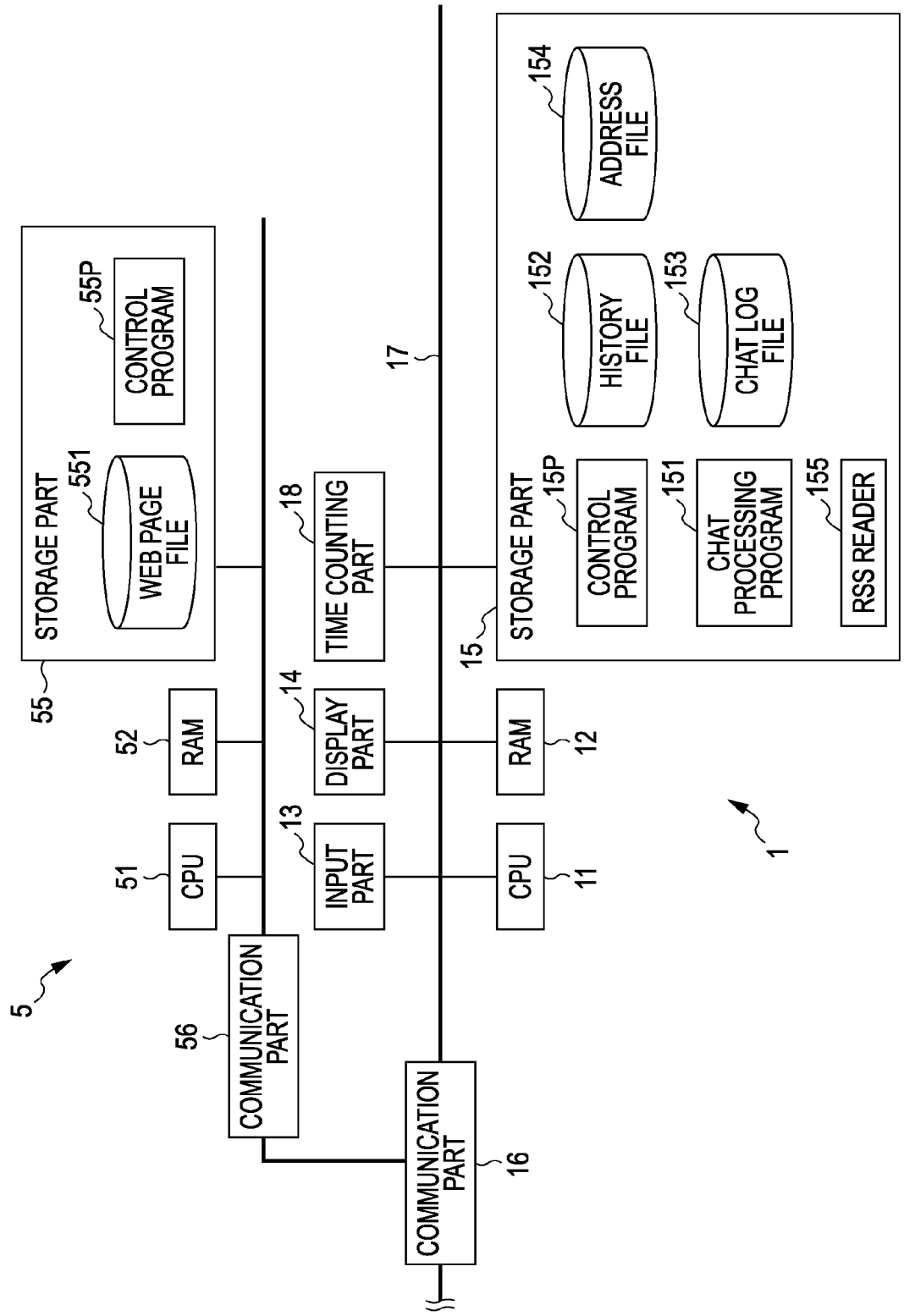
FIG. 38 illustrates a hardware structure of the chart server and the Web server according to a fifth embodiment.

A fifth embodiment relates to a form in which when a blog is updated, the updating is posted to a chat user. FIG. 38 is a block diagram illustrating a hardware structure of the chat server 1 and the Web server 5 according to the fifth embodiment. An RSS (Rich Site Summary) reader 155 is further stored in the storage part 15. As the RSS reader 155, for example, software such as "RSS clip" may be installed into the storage part 15 in advance.

Figure 39:
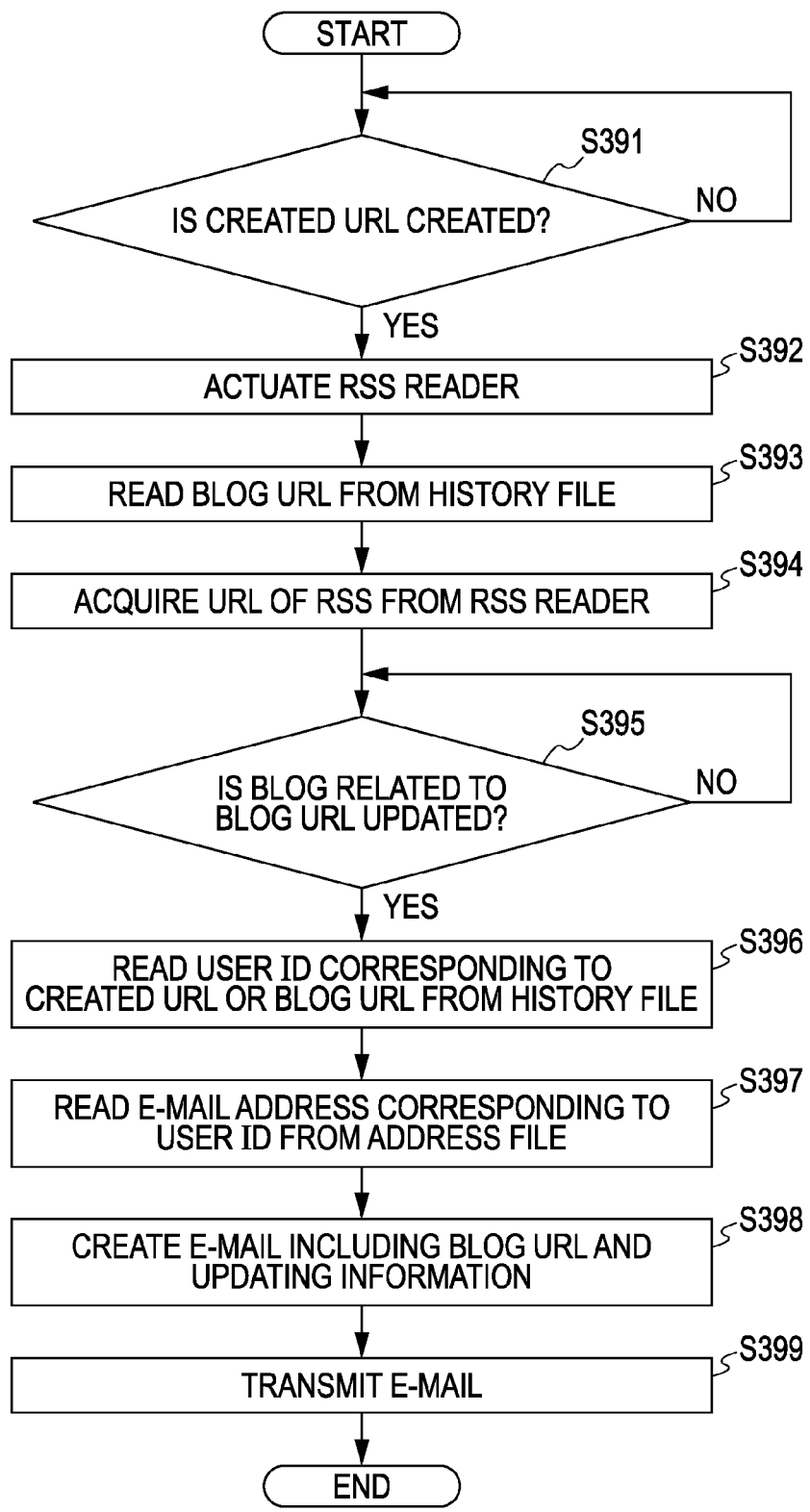
FIG. 39 illustrates a flow chart of the posting process.

FIG. 39 is a flow chart illustrating a procedure of the posting process. The CPU 11 of the chat server 1 determines whether or not the created URL described at step S167 in the first embodiment is created (step S391). When the CPU 11 determines that the created URL is not created (NO at step S391), the CPU 11 repeats the above process. On the other hand, when the CPU 11 determines that the created URL is created (YES at step S391), the CPU 11 actuates the RSS reader 155 (step S392). The CPU 11 reads the blog URL stored in association with the created URL from the history file 152 (step S393).

The CPU 11 acquires a URL related to the RSS of the blog URL using the RSS reader 155 (step S394). For example, the CPU 11 transmits an RSS request for acquiring a URL to the blog server 4 according to an instruction from the RSS reader 155. The CPU 41 of the blog server 4 transmits the URL of RSS to the chat server 1 in response to the acquiring request. Hereinafter, the CPU 11 accesses the blog server 4 periodically using the RSS reader 155 to determine whether the blog related to the blog URL is updated (step S395). When the blog related to the blog URL is not updated (NO at step S395), the CPU 11 repeats the process at step S395.

On the other hand, when the CPU 11 determines that the blog related to the blog URL is updated (YES at step S395), the CPU 11 reads a user ID corresponding to the created URL at step S391 or the blog URL at step S393 from the history file 152 in order to post the updating to the chat user (step S396). The CPU 11 reads an e-mail address corresponding to the user ID read from the address file 154 (step S397). The CPU 11 then creates an e-mail including the blog URL and the updating information stored in the storage part 15 in advance (step S398).

The updating information is text which reports an update, and a text sentence such as "The target blog is updated". The CPU 11 transmits the created e-mail to the e-mail address read at step S397 (step S399). As a result, when the blog corresponding to the blog URL in the message transmitted by the chat user is updated, the chat user can easily recognize the updating. As a result, the communication between the chat user and the blogger can be further encouraged.

The fifth embodiment has the above structure, and the other parts of the structure and the function are similar to those in the first to fourth embodiments. For this reason, like parts are denoted by like reference numerals and the detailed description thereof is omitted.

Sixth Embodiment

A sixth embodiment relates to a correlation between the created URL and the Web page. FIG. 40 is an explanatory diagram illustrating a record layout of the history file 152 according to the sixth embodiment. In an example of FIG. 40, a created URL and extracted messages are stored in the history file 152 according to the detection of the blog URL "http://blog.sample.com/eco/001234" on Feb. 28, 2008. Further, according to the detection of the blog URL "http://blog.sample.com/eco/001235" on March 12, the created URL and the messages are stored in the history file 152.

When a newly created URL is stored in the history file 152, the CPU 11 of the chat server 1 detects another blog URL related to the stored new blog URL from the message field of the history file 152. The determination may be made that one blog URL and another blog URL are related to each other in the following cases: when the URLs match each other, or when the schemes of the URLs and the host names match each other. In another case, schemes of URLs or host names and directories surrounded by slashes (/) next to the host names match each other. The sixth embodiment describes an example in which when the schemes, the host names, and the directories surrounded by slashes (/) next to the host names of one blog URL and another blog URL match each other, the determination is made that the URLs are related to each other. In the example, since the schemes "http" are the same, the host names "blog.sample.com" are the same, and the directories "eco" are the same, the blog URLs are determined to be two blog URLs of the blogger C.

The CPU 11 reads one blog URL "http://blog.sample.com/eco/001235" and the corresponding created URL "http://chatlog.sample.com/log02.html" from the history file 152. Furthermore, the CPU 11 reads another blog URL "http://blog.sample.com/eco/001234", which is correlated to the one blog, and the corresponding created URL "http://chatlog.sample.com/log01.html" from the history file 152. The CPU 11 transmits the above information to the Web server 5. The CPU 11 transmits the messages related to the other created URL correlated to the one blog, such as the first message "Currently, Global warming is a problem . . . ", as well as the above information. The CPU 51 of the Web server 5 correlates the other created URL and the transmitted messages with the created URL corresponding to the one blog, and stores them in the transmitted Web page file 551.

Figure 41:
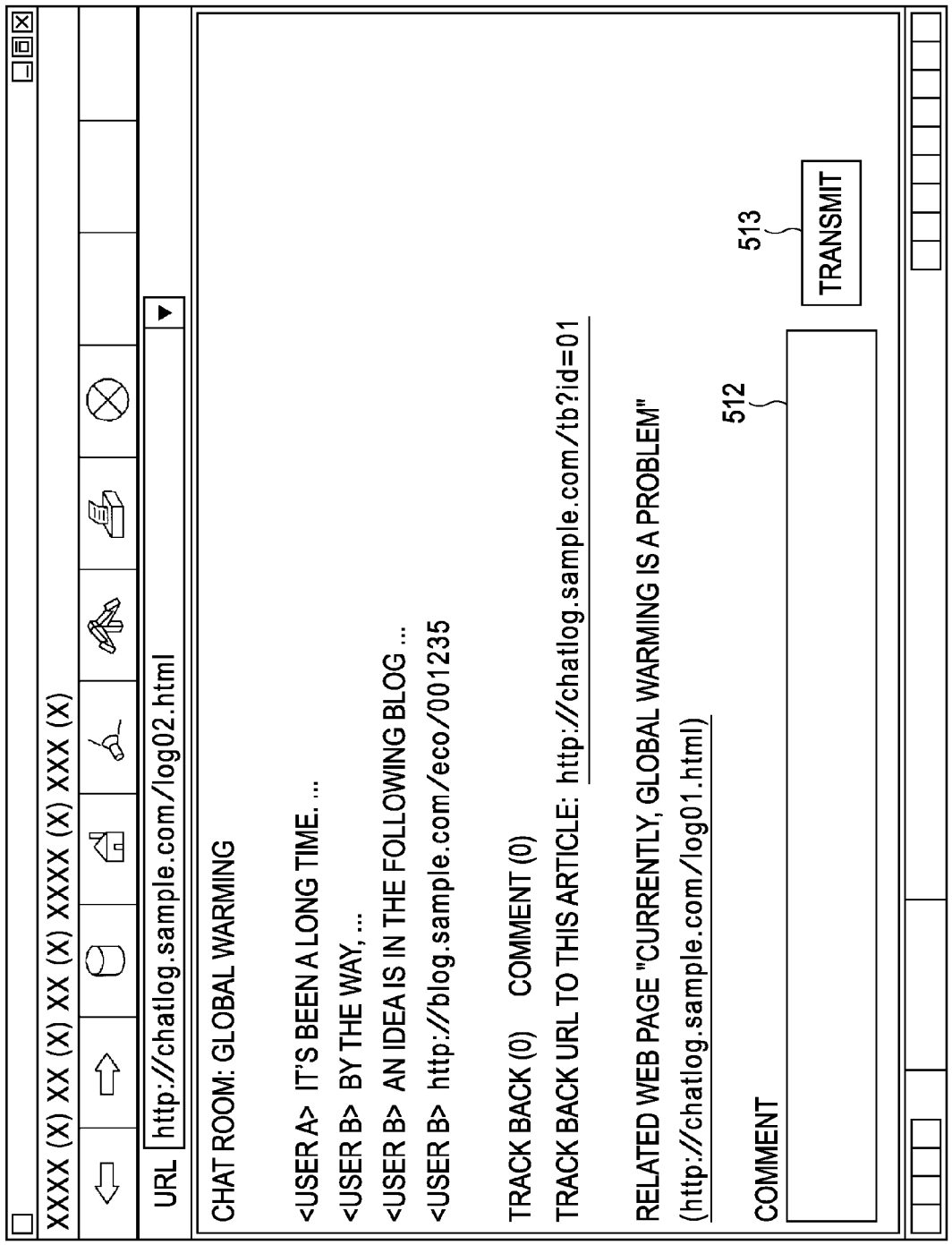
FIG. 41 illustrates an image of a Web page related to one created URL.

When the Web page related to the one created URL is transmitted, the CPU 51 transmits the other created URL and the other messages stored correspondingly from the Web page file 551 to the personal computers 2. FIG. 41 is an explanatory diagram illustrating an image of the Web page related to the one created URL. As shown in FIG. 41, another message "Currently, Global warming is a problem . . . " and the other created URL "http://chatlog.sample.com/log01.html" are displayed as information related to the Web page. As a result, since a link is established between the created URL and the Web page, the communication between the chat user and the blogger can be further activated.

Figure 42:
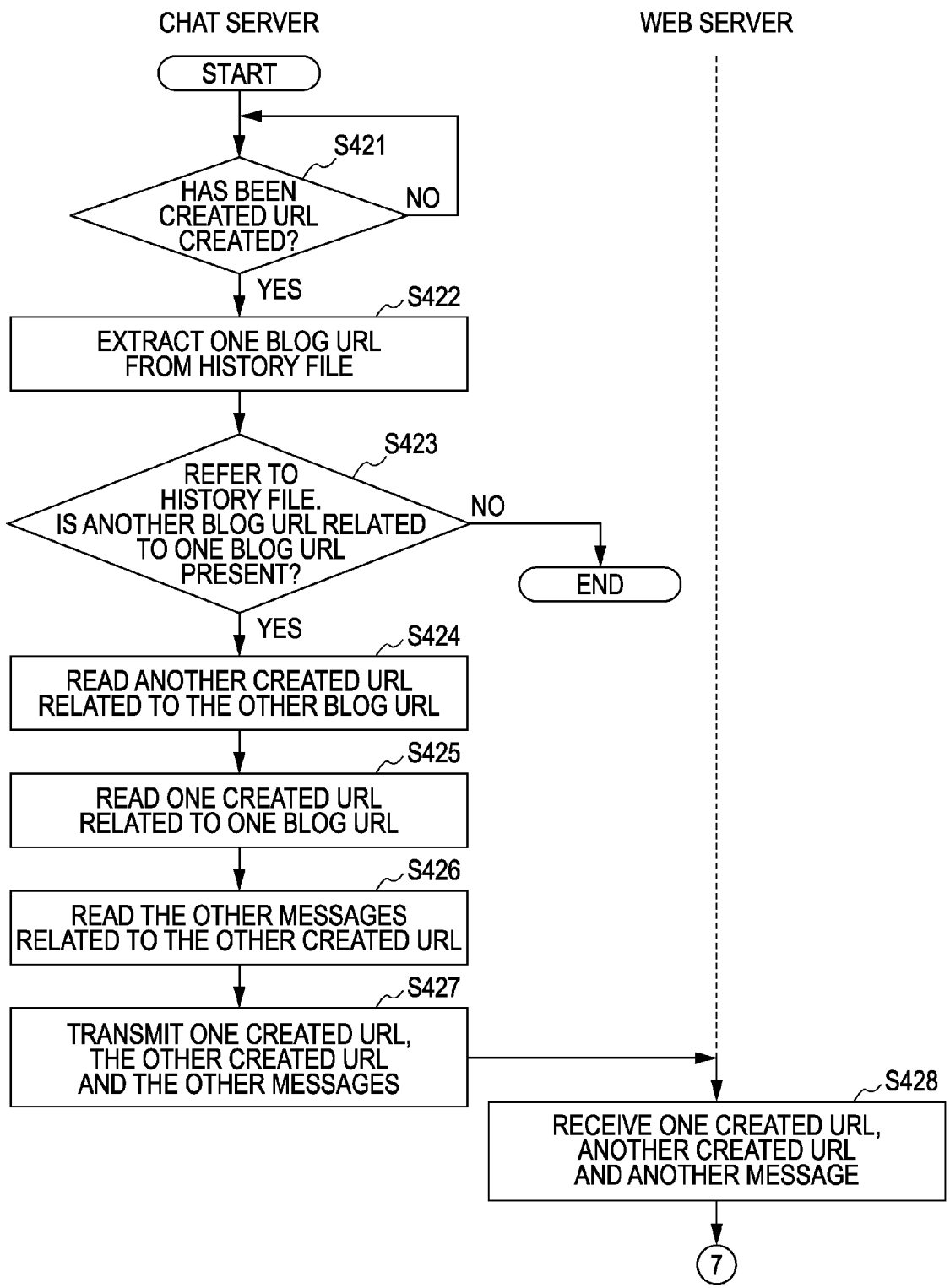
FIG. 42 illustrates a flow chart of a correlating process.
Figure 43:
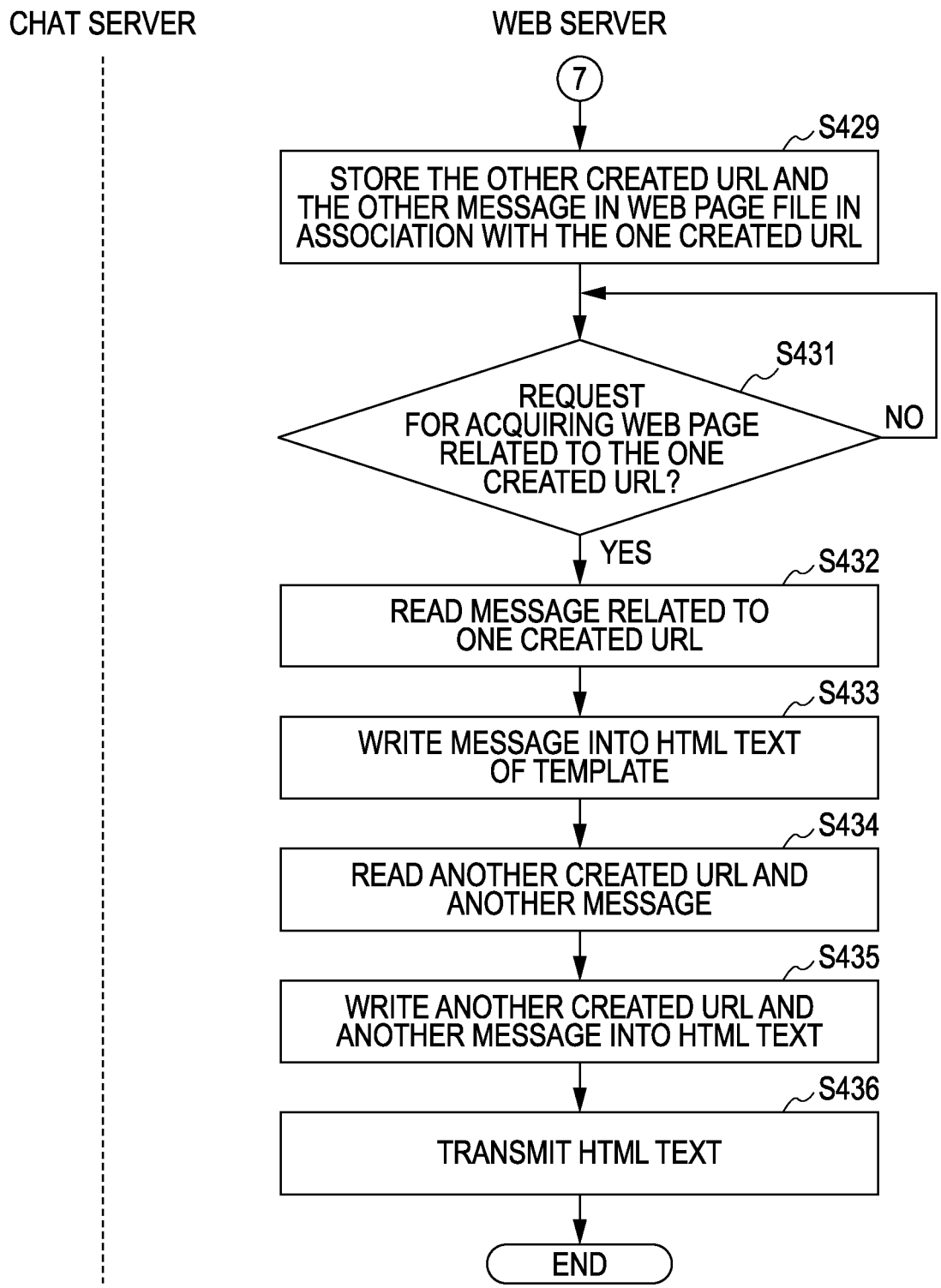
FIG. 43 illustrates a flow chart of the correlating process.

FIGS. 42 and 43 are flow charts illustrating a procedure of a correlating process. The CPU 11 of the chat server 1 determines whether or not a created URL has been newly created (step S421). When the CPU 11 determines that no created URL has been created (NO at step S421), the CPU 11 repeats the above process. On the other hand, when the CPU 11 determines that a created URL has been created (YES at step S421), the CPU 11 extracts one blog URL corresponding to the created URL from the history file 152 (step S422). The CPU 11 refers to the history file 152, and determines whether another blog URL related to the one blog URL is present (step S423).

When the CPU 11 determines that another blog URL is not present (NO at step S423), the process is ended. On the other hand, when the above relationship is satisfied, when the blog URLs match each other, or when a given number of characters of the URL from the first character stored in the storage part 15 in advance match each other, the CPU 11 determines that another related blog URL is present (YES at step S423), and then the CPU 11 reads the other created URL related to the other detected blog URL (step S424). The CPU 11 reads the one created URL related to the one blog URL extracted at step S422 (step S425).

The CPU 11 reads the other messages related to the other created URL from the message field of the history file 152 (step S426). The CPU 11 transmits the one created URL, the other created URL, and the other messages to the Web server 5 (step S427). The CPU 51 receives the one created URL, the other created URL and the other message (step S428). The CPU 51 stores the received other created URL and other messages in the Web page file 551 together with the messages related to the one created URL in association with the one created URL (step S429).

The CPU 11 determines whether acquisition of the WEB page related to the one created URL is requested (step S431). When the acquisition of the Web page related to the one created URL is not requested (NO at step S431), the CPU 51 repeats the process at step S431. On the other hand, when the CPU 51 determines that the acquisition of the Web page related to the one created URL is requested (YES at step S431), the CPU 51 reads a message related to the one created URL from the Web page file 551 (step S432). The CPU 51 reads an HTML text to be the template from the storage part 55 and writes the read message related to the one created URL into the HTML text (step S433).

As shown in FIG. 41, the CPU 51 reads the other created URL and the other messages from the Web page file 551 based on the one created URL in order to include the related other created URL in the Web page (step S434). The CPU 51 writes the other created URL and the other messages into the HTML text into which the message related to the one created URL is written at step S433 (step S435). The CPU 51 transmits the created HTML text in response to the request for acquiring the Web page related to the one created URL (step S436).

The sixth embodiment has the above structure, and the other parts of the structure and the function are similar to those in the first to fifth embodiments. For this reason, like parts are denoted by like reference numerals, and the detailed description thereof is omitted.

Seventh Embodiment

Figure 44:
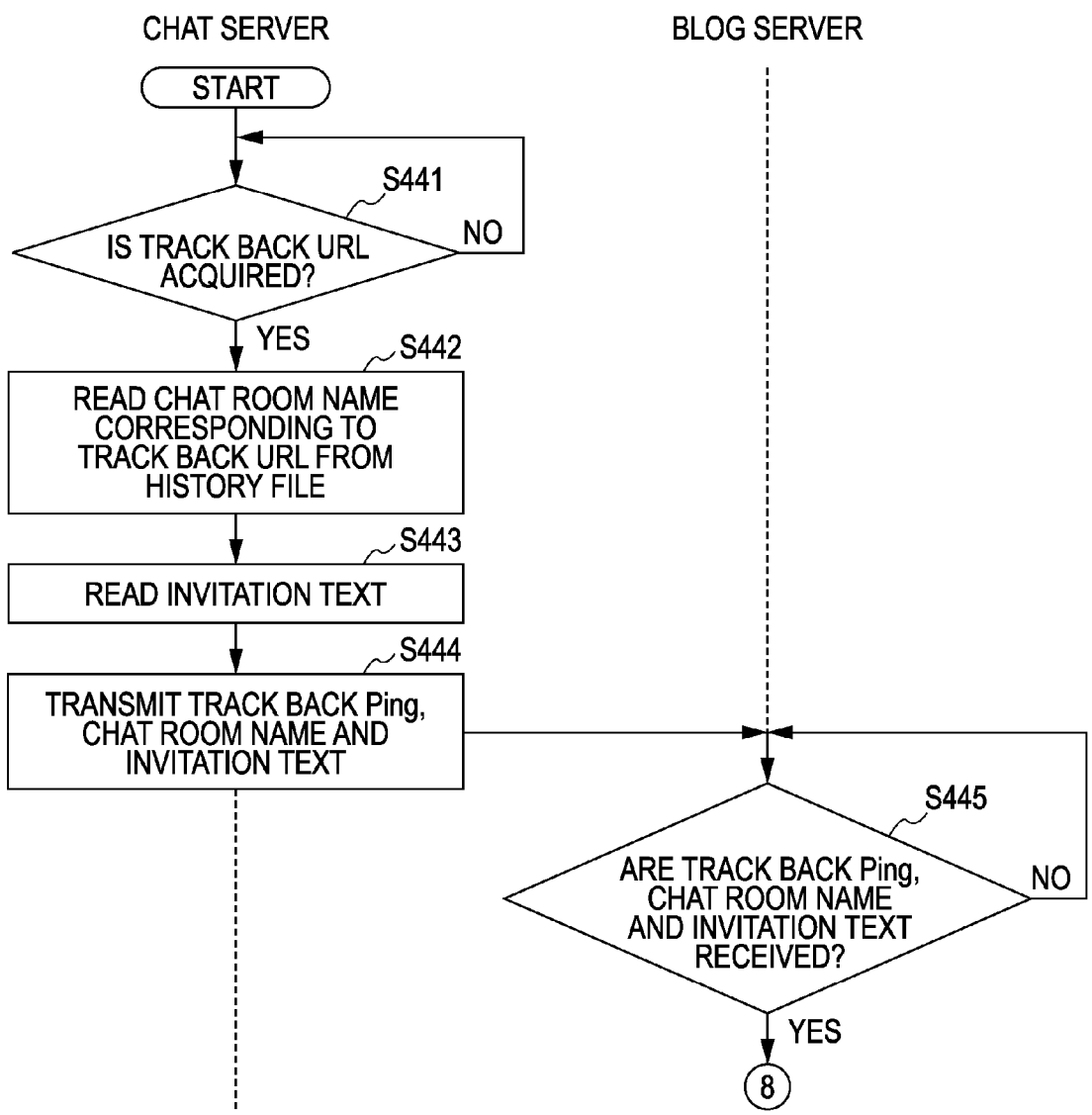
FIG. 44 illustrates a flow chart of an inviting process.

A seventh embodiment relates to a form which invites a blogger to chat. FIGS. 44 and 45 are flow charts illustrating a procedure of an inviting process. The CPU 11 of the chat server 1 determines, according to a process at step S1713, whether the trackback URL is acquired from the blog server 4 (step S441). When the CPU 11 determines that the trackback URL is not acquired (NO at step S441), the CPU 11 repeats the above process. On the other hand, when the CPU 11 determines that the trackback URL is acquired (YES at step S441), the CPU 11 reads the chat room name corresponding to the trackback URL acquired at step S441 from the history file 152 (step S442).

The CPU 11 reads an invitation text stored in advance from the storage part 15 (step S443). The invitation text includes information for accessing the chat server 1. For example, the invitation text may say "Your blog is being discussed. URL is http:// . . . ", and may include the URL of the chat server 1 and a text for inviting a user to the URL. The chat room name read at step S442 is posted to the blogger. After the acquisition of the trackback URL, the CPU 11 transmits the trackback Ping, the chat room name, and the invitation text related to the trackback URL to the blog server 4 (step S444).

The CPU 41 of the blog server 4 determines whether the trackback Ping, the chat room name, and the invitation text are received (step S445). When the CPU 41 determines that the three pieces of information are not received (NO at step S445), the CPU 41 repeats the process at step S445. On the other hand, when the CPU 41 determines that the three pieces of information are received (YES at step S445), the CPU 41 determines whether or not the blogger of the blog corresponding to the trackback Ping is currently logged in (step S446).

When the blogger is currently logged into the blog server 4 for creation of a diary for example (YES at step S446) and the CPU 41 accepts a request from the blogger computer 3 to the blog server 4, the CPU 41 refers to an IP address so as to transmit the chat room name and the invitation text to the blogger computer 3 related to the IP address (step S447). For example, when the CPU 41 accepts the request for acquiring the blog page or the Web page from the blogger computer 3, the CPU 41 transmits the blog page or the Web page and also creates an HTML text including the chat room name and the invitation text and transmits the Web page composed of the created HTML text.

As a result, the invitation text including the chat room name and the URL is displayed on the Web browser 351 of the blogger computer 3. As a result, entrance to the chat room may be encouraged. On the other hand, when the CPU 41 determines that the blogger is not logged into the blog server 4 (NO at step S446), the CPU 41 reads an e-mail address of the blogger stored in advance from the storage part 45 (step S448). The CPU 41 creates an e-mail including the chat room name and the invitation text (step S449). The CPU 41 transmits the e-mail to the read e-mail address (step S451).

The seventh embodiment has the above structure, and the other parts of the structure and the function are similar to those in the first to sixth embodiments. For this reason, like parts are denoted by like reference numerals, and the detailed description thereof is omitted.

Eighth Embodiment

FIG. 46 is a block diagram illustrating a structure of the chat server 1 according to an eighth embodiment. The program which operates the chat server 1 according to the first to seventh embodiments can be read from a recording medium 1A such as CD-ROM by a recording medium reading apparatus (not shown) and stored in the storage part 15 like the eighth embodiment. Alternatively, the program can be downloaded from another computer (not shown) to be connected via the communication network N. The contents of the program will be described below.

The chat server 1 shown in FIG. 46 detects a URL and downloads a program for extracting messages from the recording medium 1A or from another computer (not shown) via the communication part 16. This program is installed as the control program 15P of the storage part 15. The program is loaded into the RAM 12 and executed. As a result, the program functions as the chat server 1 of the present invention.

The eighth embodiment has the above structure, and the other parts and the function are similar to those in the first to seventh embodiments. For this reason, like parts are denoted by like reference numerals and the detailed description thereof is omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A cooperating system comprising:
   a chat server to execute a procedure including,
      an extracting process that, when detecting a URL related to a blog in a message received from outside the chat server, extracts the received message, and
      an acquiring process that acquires a trackback URL from a blog server based on the detected URL;
   the chat server also includes,
      a storage to store a message and the trackback URL extracted by the extracting part in association with a newly created URL, and
      a history file to store the message extracted by the extracting process, transmitter identification information corresponding to the message, and the created URL created related to the message; and
   the chat server to execute the procedure that further includes:
      a detecting process that, when detecting a request for transmitting the message corresponding to the created URL stored in the storage, detects a login state based on the message transmitter identification information stored in the history file related to the created URL,
      wherein the storage further stores, in association with the created URL, the login state detected by the detecting process; and
   a blog server to execute a procedure including a receiving, from the storage, the created URL transmitted based on storage of the trackback URL in the storage part.

2. The cooperating system according to claim 1, wherein when a comment related to the created URL is received from the outside, the storage stores the received comment in association with the created URL.

3. A chat server that transmits a received message to outside the chat server, comprising:
   the chat server to execute a procedure including,
      a URL detecting process that detects a URL in the received message,
      an extracting process that, when the URL detecting part detects the URL, extracts the received message, and
      an acquiring process that acquires a trackback URL corresponding to the URL detected by the URL detecting process; and
   the chat server also includes,
      a storage to store the trackback URL acquired by the acquiring process and the message extracted by the extracting process in association with a newly created URL,
      a history file to store the message extracted by the extracting process, transmitter identification information corresponding to the message, and the created URL created related to the message; and the chat server to execute the procedure that further includes:

a login detecting process that, when detecting a request for transmitting the message corresponding to the created URL stored in the storage, detects a login state based on the message transmitter identification information stored in the history file related to the created URL, wherein the storage further stores, in association with the created URL, the login state detected by the detecting process.

4. A non-transitory computer-readable storage medium storing a program that is used by a chat server, the program causing the chat server to execute a process including:

detecting a URL in a received message;

extracting the received message when the URL is detected in the received message;

acquiring a trackback URL corresponding to the URL detected in the received message;

storing, in association with a newly created URL, the acquired trackback URL and the extracted message in a storage part;

storing the extracted message, the transmitter identification information corresponding to the message, and the created URL created related to the message in a history file;

when a request for transmitting the message corresponding to the created URL is detected, detecting a login state based on the message transmitter identification information stored in the history file related to the created URL; and storing, in association with the created URL, the detected login state in the storage part.

5. The non-transitory computer-readable storage medium according to claim 4, further comprising transmitting the created URL stored in the storage part to outside the chat server based on the corresponding trackback URL.

6. The non-transitory computer-readable storage medium according to claim 4, the process that the chat server to execute further comprising:

when the contents stored in the storage part related to the created URL are updated, referring to the message transmitter identification information stored in the history file related to the created URL to transmit updated information including the created URL to outside the chat server.

7. The non-transitory computer-readable storage medium according to claim 4, the process that the chat server to execute further comprising:

storing, in the history file in association with the created URL, at least one representative transmitter identification information selected from the transmitter identification information to be stored in association with the created URL; and when the transmitter identification information which matches the representative transmitter identification information stored in the history file is received, referring to the transmitter identification information and transmitting the created URL to a remote destination.

8. The non-transitory computer-readable storage medium according to claim 4, the process that the chat server to execute further comprising:

detecting another URL related to one URL in the message stored in the history file;

reading, from the history file, another created URL corresponding to the detected another URL and one created URL corresponding to the one URL; and storing the another created URL in association with the one created URL.

9. The non-transitory computer-readable storage medium according to claim 4, the process that the chat server to execute further comprising:

transmitting, based on the acquired trackback URL, information about a chat room to which the extracted message is transmitted and information for inviting entrance to the chat room.

10. A cooperating method for coordinating a blog server with a chat server, the cooperating method comprising:

when the chat server detects a URL related to a blog in a message received from outside the chat server, extracting the received message with the chat server;

acquiring a trackback URL from the blog server with the chat server based on the detected URL;

storing the extracted message and trackback URL in a storage part in the chat server in association with a newly created URL;

receiving the transmitted created URL with the blog server based on the storage of the trackback URL in the storage part;

storing the extracted message, the transmitter identification information corresponding to the message, and the created URL created related to the message in a history file;

when a request for transmitting the message corresponding to the created URL is detected, detecting a login state based on the message transmitter identification information stored in the history file related to the created URL; and storing, in association with the created URL, the detected login state in the storage part.

* * * * *